United States Patent
Piersiak et al.

(10) Patent No.: US 12,271,098 B1
(45) Date of Patent: Apr. 8, 2025

(54) DEVICE WITH ROTATABLE PRIVACY COVER

(71) Applicant: Amazon Technologies, Inc., Seattle, WA (US)

(72) Inventors: Rafal Piersiak, Belmont, CA (US); John Roos, Los Gatos, CA (US); Matthew J. England, Santa Monica, CA (US); Mikhail Donskoi, Brovary (UA); Maksym Yemelin, Gdansk (PL); Chung-Sen Huang, Taipei (TW); Chi-Yuan Wang, New Taipei (TW); Hsiu-Fen Yeh, Taipei (TW); Bartlomiej Pawlik, Singapore (SG); Samuel Taeyoung Lee, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/112,266

(22) Filed: Feb. 21, 2023

(51) Int. Cl.
*G03B 11/04* (2021.01)

(52) U.S. Cl.
CPC .................. *G03B 11/043* (2013.01)

(58) Field of Classification Search
None
See application file for complete search history.

(56) References Cited

U.S. PATENT DOCUMENTS

| | | | |
|---|---|---|---|
| 5,428,388 A | 6/1995 | von Bauer et al. | |
| 11,809,063 B1* | 11/2023 | Pan | H04N 23/65 |
| 2007/0008081 A1 | 1/2007 | Tylicki et al. | |
| 2010/0225455 A1 | 9/2010 | Claiborne et al. | |
| 2013/0222609 A1* | 8/2013 | Soffer | G06F 21/81 |
| | | | 348/207.1 |
| 2014/0267716 A1 | 9/2014 | Child et al. | |
| 2015/0163463 A1 | 6/2015 | Hwang et al. | |
| 2021/0081003 A1* | 3/2021 | Bristol | G06F 21/83 |
| 2021/0149272 A1* | 5/2021 | Li | H04N 23/55 |

FOREIGN PATENT DOCUMENTS

CN 215734490 U * 2/2022

* cited by examiner

*Primary Examiner* — Clayton E. LaBalle
*Assistant Examiner* — Diana Hancock
(74) *Attorney, Agent, or Firm* — Eversheds Sutherland (US) LLP

(57) ABSTRACT

A device includes a housing, a camera at least partially disposed within the housing, one or more microphones at least partially disposed within the housing, and a printed circuit board (PCB) including a switch. The switch has a lever that is transitionable between a displaced position and a non-displaced position. A privacy cover couple to the housing and includes a rib disposed on an interior surface of the privacy cover. The privacy cover is transitionable between a first position in which the camera is obstructed and the rib is engaged with the lever to transition the lever to the displaced position, and a second position in which the camera is unobstructed and the rib is disengaged with the lever such that the lever is permitted to transition to the non-displaced position.

25 Claims, 43 Drawing Sheets

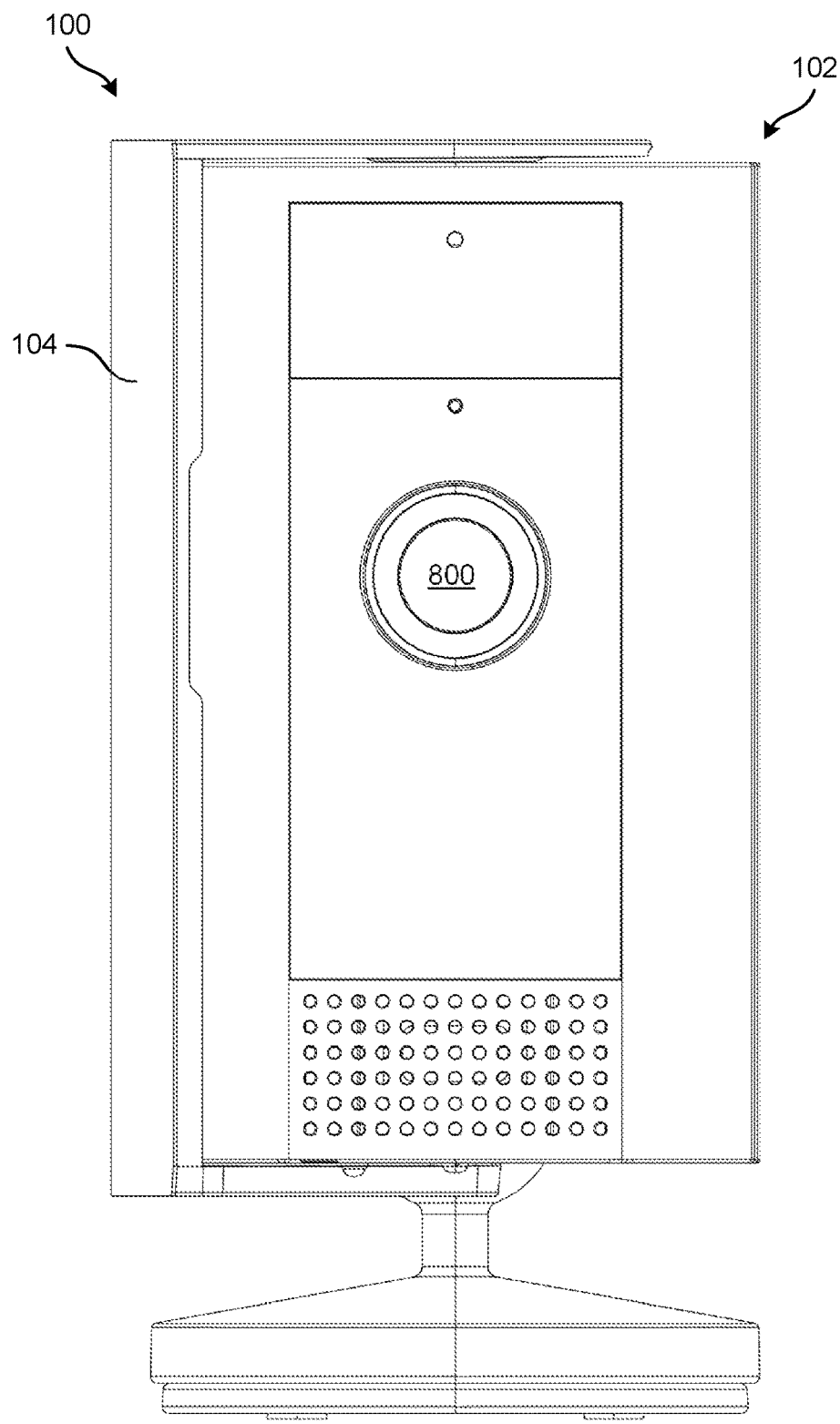
FIG. 8B
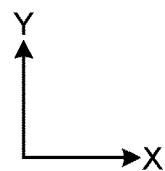

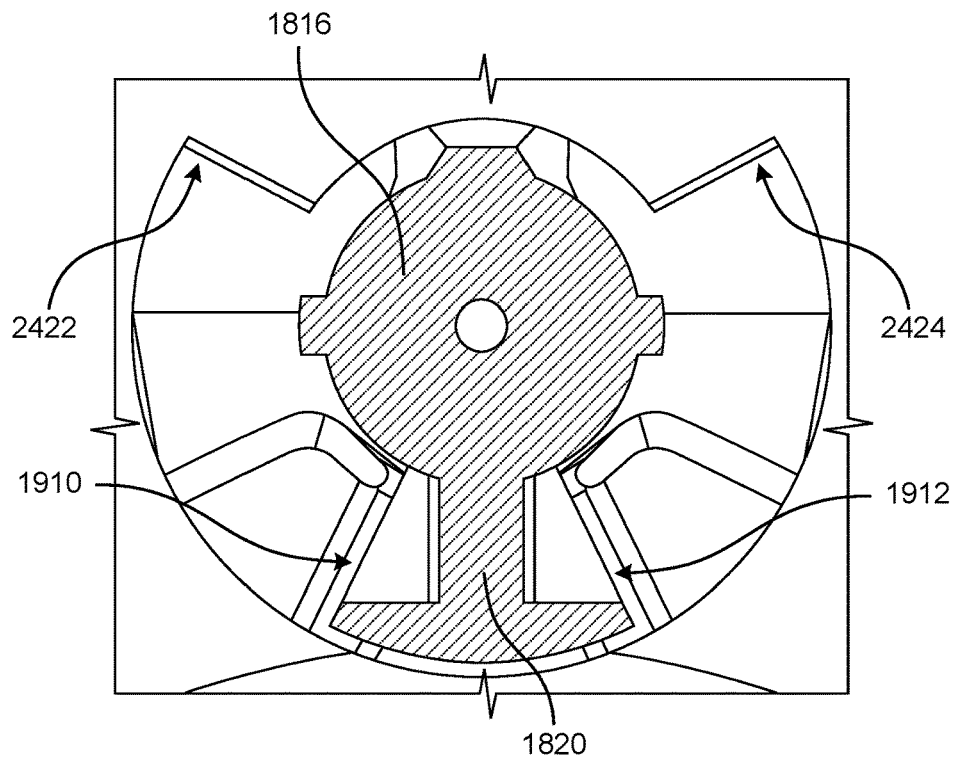
FIG. 25E
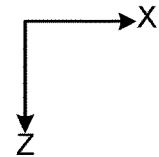
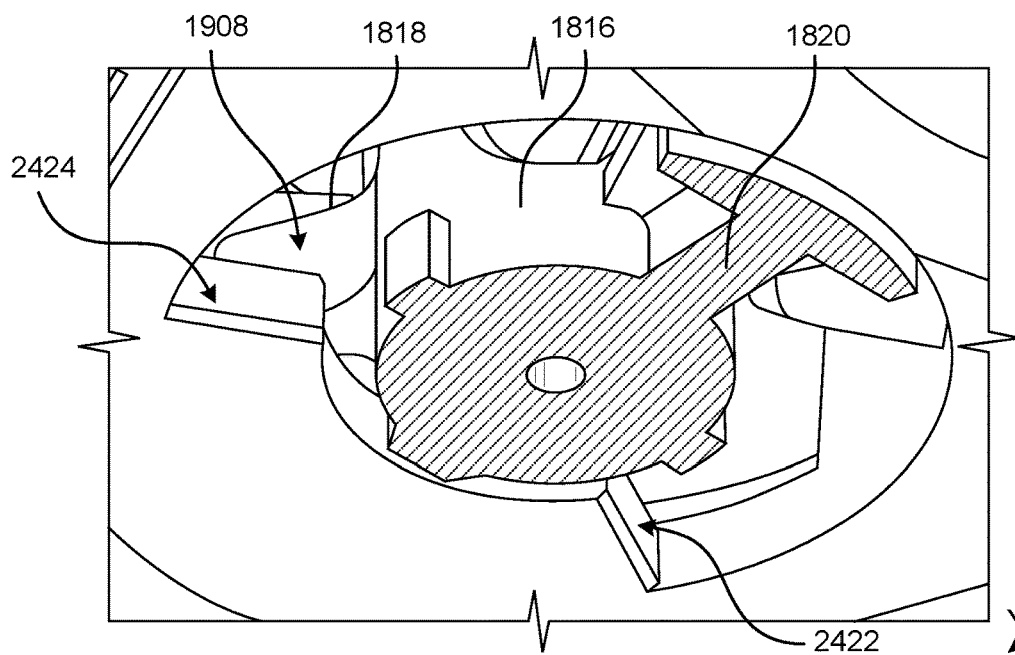
FIG. 25F
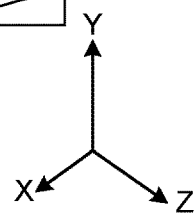

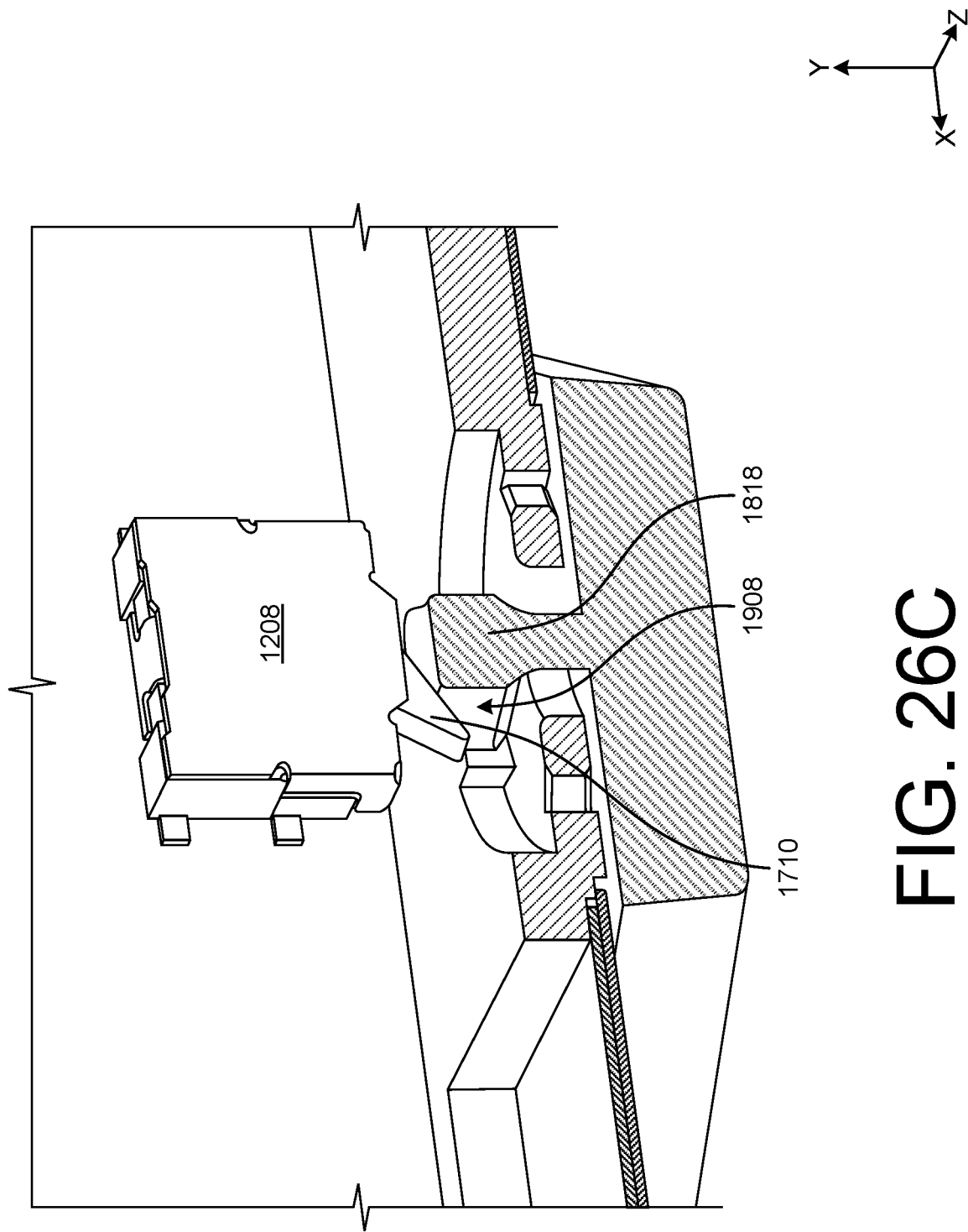

DEVICE WITH ROTATABLE PRIVACY COVER

BACKGROUND

Security is a concern for many homeowners, businesses, and the like. In some examples, those seeking to protect or monitor their homes or place of business may wish to have video and audio communications. However, conventional devices may be unaesthetically appealing, have large form factors, and/or have suboptimal audio and/or video characteristics. Additionally, current devices may not be conveniently deactivated to provide privacy.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The components, devices, and/or apparatuses depicted in the accompanying figures are not to scale and components within the figures may be depicted not to scale with each other.

FIGS. 8A and 8B illustrate a rotational movement of the privacy cover of FIG. 1, showing the privacy cover in a second position, according to an example of the present disclosure.

FIGS. 25A-25F illustrate an engagement between the privacy cover of FIG. 1 with the receptacle of FIGS. 24A-24E, according to an example of the present disclosure.

FIGS. 26A-26C illustrate an example engagement between an example switch of the device of FIG. 1 and the privacy cover of FIG. 1 when the privacy cover is in the first position, according to an example of the present disclosure.

DETAILED DESCRIPTION

Figure 1:
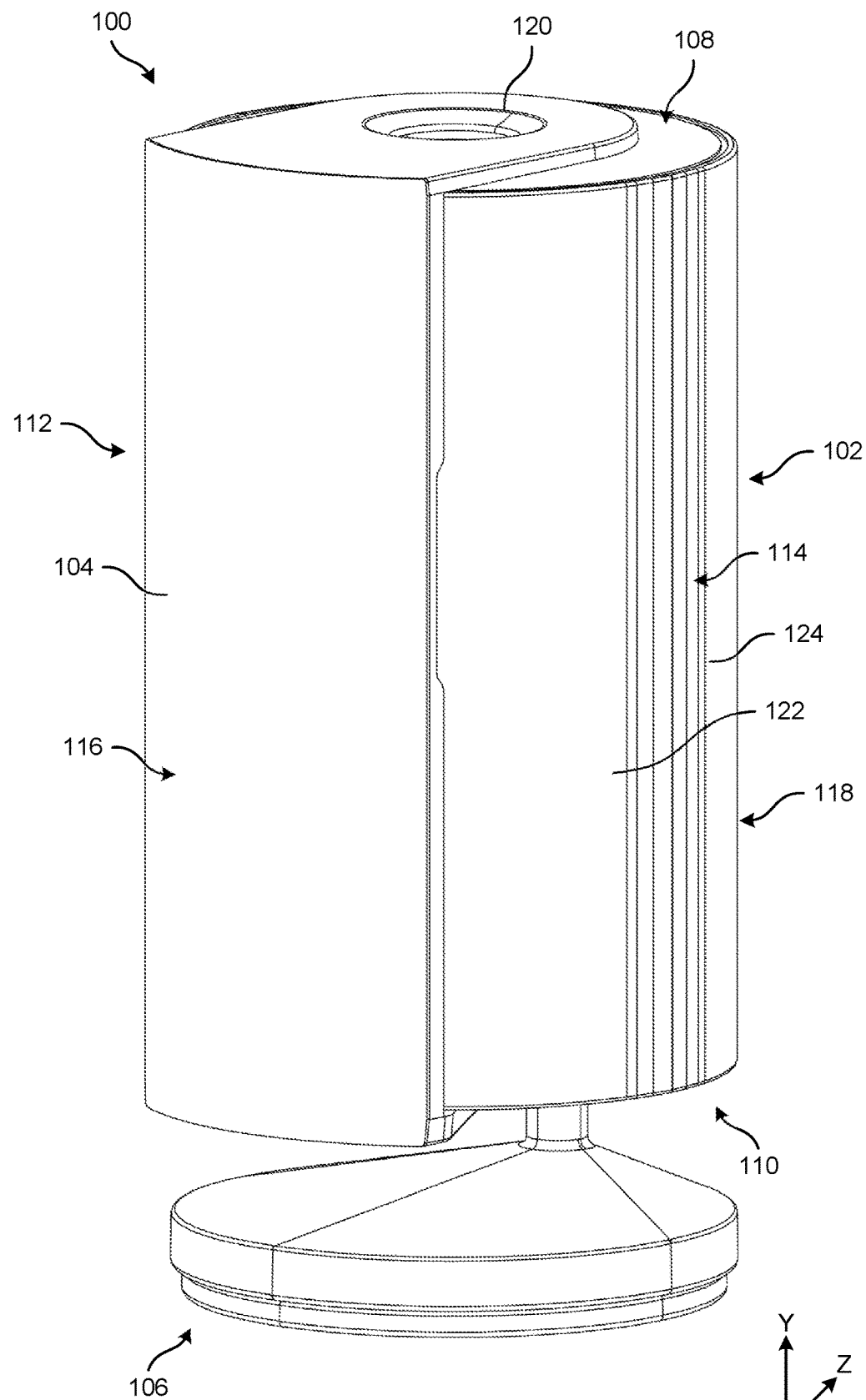
FIG. 1 illustrates a front perspective view of an example device, showing an example privacy cover of the device in a first position to obstruct a camera of the device, according to an example of the present disclosure.

This application is directed, at least in part, to a device having a privacy cover that is configured to rotate between positions for obstructing and unobstructing a camera of the device. In some instances, the privacy cover is rotatable between a first position, a second position, and a third position. At the first position, the privacy cover may be disposed over a front of the device and obstruct the camera. When obstructed, the camera may be restricted from capturing image and/or video data within an environment of the device. At the second position and the third position, the privacy cover may be disposed alongside/over a first side and a second side of the device, respectively, and may not obstruct the camera. When unobstructed, the camera may be permitted to capture image and/or video data within an environment of the device. As such, the privacy cover may transition to obstruct the camera for privacy and unobstruct the camera to monitor the environment.

In some instances, the device includes a camera housing and the privacy cover may rotatably couple to the camera housing. Additionally, the device may include a front, a back, a top, a bottom, and adjacent lateral sides. In some instances, the privacy cover rotatably couples to the camera housing at the top and the bottom. The privacy cover may rotate between the first position, the second position, and the third position given the rotational coupling with the camera housing.

In some instances, movement of the privacy cover may correspondingly engage and disengage a switch that actives and deactivates components of the device, such as the camera. For example, in the first position, a feature of the privacy cover, such as a rib, notch, and the like, may engage with a lever of the switch disposed in the camera housing. In some instances, the engagement between the rib and the lever may cause the lever to be displaced and, as a result, the switch may deactivate the camera. Alternatively, when the privacy cover is rotated to either the second position or the third position, the rib may not displace the lever of the switch and, as a result, the camera may be activated (or permitted to be activated). In some instances, the rib of the cover may be disposed internally to the camera housing in order to engage the lever of the switch.

In some instances, the camera housing (or frames, covers, etc. thereof) may define a receptacle into which the rib of the privacy cover is disposed. The receptacle, for example, may be disposed at or proximate to the bottom of the device. The rib is rotatable within the receptacle in order to permit the privacy cover to transition between the first position, the second position, and the third position. In some instances, the receptacle includes a surface that is engaged by a prong of the privacy cover. The engagement between the prong and the surface may secure the privacy cover in the first position, the second position, and the third position, respectively. For example, the prong may translate along, over, or about the surface during rotation of the privacy cover. In some instances, the surface includes different contours to secure the privacy cover in the first position, the second position, and the third position, respectively. In this sense, the engagement between the prong and the surface may lock the privacy cover in the first position, the second position, and the third position. However, upon application of a certain amount of force, the privacy cover may be rotated to another of the first position, the second position, or the third position. During this instance, the prong may translate or move along the surface.

In addition to including the camera, the camera housing may include additional computing components that carry out an operation of the device. For example, the device may include infrared (IR) light emitting elements (e.g., (LEDs)), a radar sensor, passive infrared (PIR) sensor(s) for detecting motion, microphones recording audio and/or video, speaker(s) (e.g., mid-range speaker, tweeter speaker, subwoofer speaker) for outputting sound, ambient light sensor(s), white light lighting element(s), status indicator(s), and so forth disposed within the camera housing. In some instances, activation of the switch may deactivate one or more components of the device in addition to the camera, such as microphones, speakers, and so forth. However, when the privacy cover moves to the second position and/or the third position, the rib of the privacy cover may no longer engage with the switch and correspondingly, the camera (as well as other components of the device) may be activated. Additionally, the device may include network interfaces (e.g., antenna(s)) to wirelessly couple the device to one or more remote devices (e.g., mobile device, laptop, etc.) over one or more networks (e.g., Cellular, Wi-Fi, BLE, Bluetooth, etc.).

The device may include a button that at least partially controls an operation of the device. In some instances, the button may correspond to a mute button, a synchronization button, a reset button, a volume button, and so forth. In some instances, the button is disposed on the top of the device, and may be accessible via a passageway of the privacy cover. For example, the privacy cover may include a passageway through which the button of the device is disposed. The button may be depressed via the passageway. For example, a user of the device may press the button via disposing a finger through the passageway.

The computing components of the device may be disposed on one or more printed circuit boards (PCBs) or printed circuit board assemblies (PCBAs). In some instances, the device includes a first PCB and a second PCB communicatively coupled together via a flexible printed circuit (FPC). In some instances, the status indicator, the microphone(s), and/or the ambient light sensor are disposed on the first PCB. The camera, as well as other computing components of the device, such as network interfaces, the switch for deactivating the camera, power modules, and so forth are disposed on the second PCB. The components may be communicatively coupled together, or to the PCBs, respectively, via one or more flex circuits, wires, connectors, and so forth. For example, the PCBs may be communicatively coupled for distributing power to components of the device.

In some instances, the second PCB includes a connector. In some instances, the connector is disposed at or proximate to the bottom of the device. In some instances, a cap (e.g., plug, cover, plate, etc.) is disposed over a port defined through the camera housing. The cap may be removable to permit access to the connector, for example, to permit a cable or other connector to connect (e.g., slide over, attached, etc.) to the connector. In some instances, the connector may be used to provide updates to the device, to download data from the device (e.g., debugging), and so forth. Moreover, in some instances, the connector on the second PCB may be a male portion of a connection with the cable or other connector that communicatively connects to the second PCB.

In some instances, the camera, microphone(s), ambient light sensor, IR light elements(s), speaker, and status indicator are oriented towards the front of the device. In some instances, the microphone(s) may be located between (e.g., interposed) the camera and the top of the device. As such, the microphone(s) may be located closer to the top of the device than the camera(s). In some instances, the speaker may be located closer to the bottom of the device than the camera(s). In some instances, the status indicator and/or the IR lighting element(s) may be located between the microphone(s) and the camera(s). In some instances, the microphone(s), the IR lighting element(s), the camera(s), and the speaker may be vertically aligned on the device, or within the camera housing.

In some instances, a stand may couple to the camera housing to dispose the device on a vertical surface (e.g., wall) or a horizontal surface (e.g., shelf). In some instances, the stand may couple to the camera housing, at a bottom and/or back of the device. In some instances, the stand and the camera housing couple together via a ball and socket joint. For example, the camera housing may define a socket, while the stand may include a ball received within the socket. As such, the stand may be pivotable, for example, to dispose the device on the vertical surface or the horizontal surface. In the former, the stand may fasten (e.g., using fasteners) to the vertical surface, while in the latter, the stand may prop the device on the horizontal surface. As such, when the stand couples to the vertical surface, the device may hang, and when the stand rests on or couples to the horizontal surface, the device may stand on the horizontal surface (via the stand). In some instances, the stand permits the device to be reoriented, such as for changing a field of view (FoV) of the device.

In some instances, the camera housing may be formed via one or more covers coupled together. For example, a first cover may be disposed along the front, sides, and/or the bottom of the device. A second cover may be disposed along the back, sides, and/or a top of the device. In some instances, the first cover and the second cover may couple together via fasteners, adhesives, and so forth. The first cover and the second cover may define an interior cavity within which the components of the device are disposed. In some instances, the first cover defines orifices through which the speaker(s) are oriented to emit sound. The first cover may also define the socket within which the ball of the stand is received.

The device may include one or more windows or lenses disposed over one or more of the component(s). For example, a camera lens may be disposed over the camera, a first window may be disposed over the microphone(s), the IR lighting element(s), and/or the ambient light sensor, and a second window may be disposed over the status indicator. In some instances, the first window may define an opening (e.g., microphone port) for channeling sound to the microphone(s). Additionally, in some instances, the second window may define a first opening for emitting light from the status indicator and a second opening for receiving the camera lens (or more generally, the camera). For example, the camera lens may reside within the second opening of the second window, or may be received within the second window. The lenses and windows may couple to one or more covers of the camera housing. In some instances, the lenses and windows may couple to the camera housing, at the front of the device. In some instances, the lenses and windows may conceal the components of the device from view, respectively. The lenses and windows may include a material that is transparent or translucent to permit the PIR sensor(s) and/or IR lighting element(s) to detect motion, for example. Example materials may include glass, germanium, high density polyethylene (HDPE), polycarbonate, and so forth.

In some instances, the device may include indicators that provide notifications regarding an operational state of the device. For example, when the privacy cover is in the first position, visual elements or visual notifications may indicate that the camera is obstructed. Additionally, when the privacy cover is in the second position and the third position, visual notifications may indicate that the camera is unobstructed. In some instances, the visual indications may be visible through the privacy cover and/or on other portions of the device, such as the camera housing. In some instances, the visual indications may be visible on the front of the device, the top of the device, and/or the side(s) of the device. In some instances, the visual indications may be a graphic (e.g., sticker), decal, and the like, or in some instances, a status indicator (e.g., red-green-blue (RGB) light emitting diode (LED)) may provide the visual indication and illuminate to different colors of light, different patterns of light, and so forth depending on operations being performed by the device (e.g., capturing audio, sensing motion, etc.).

The device may also include heat dissipating elements are included to disperse heat generated by components of the device. By way of example and not limitation, the camera(s), LEDs, power supply, network interfaces, and so forth generate heat during use. Without effectively dispersing or dissipating this heat, the internal components, such as the camera, may be adversely affected and become incapable of performing its intended function. To efficiently dissipate heat generated by the components, heat dissipating elements may be included within the housing to transmit heat away from generating sources toward an exterior of the device.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates a front perspective view of an example device 100, according to an example of the present disclosure. In some instances, the device 100 may represent an electronic device, audio/video (A/V) device, and so forth. In some instances, the device 100 includes a camera housing 102, a privacy cover 104 rotatably coupled to the camera housing 102, and a stand 106 coupled to the camera housing 102.

As shown, and in some instances, the device 100 may generally include a cylindrical shape. However, other shapes are envisioned (e.g., square, hexagonal, etc.). The device 100 may include a top 108, a bottom 110 opposite the top 108 (e.g., spaced apart in the Y-direction), a first side 112, a second side 114 opposite the first side 112 (e.g., spaced apart in the X-direction), a front 116, and a back 118 opposite the front 116 (e.g., spaced apart in the Z-direction). In some instances, the privacy cover 104 rotatably couples to the camera housing 102 proximate to the top 108 and/or the bottom 110. In some instances, the stand 106 may couple to the camera housing 102 at the bottom 110 and/or the back 118.

The privacy cover 104 is configured to rotate (e.g., swing, swivel, etc. about the Y-axis) between the first side 112, the front 116, and the second side 114. In FIG. 1, the privacy cover 104 is shown being disposed alongside or over the front 116. At this position, which may be considered a first position of the privacy cover 104, the privacy cover 104 may prevent a camera of the device 100 capturing images and/or videos within an environment of the device 100. For example, in the first position in which the privacy cover 104 is disposed alongside the front 116 of the device 100, the privacy cover 104 may obstruct the camera. Additionally, and as will be explained in detail herein, in the first position, features (e.g., rib, notch, protrusion, etc.) of the privacy cover 104 may engage a switch of the device 100 to cause the camera and/or other components of the device 100 (e.g., microphones) to be disabled. As such, when in the first position, the privacy cover 104 may not only physically obstruct the camera, but a switch of the device 100 may be activated to disable the camera and/or other components of the device 100.

From the first position, the privacy cover 104 is configured to rotate to the right (clockwise) to a second position and to the left (counterclockwise) to a third position. At the second position, the privacy cover 104 may be disposed alongside/over the first side 112, and at the third position, the privacy cover 104 may be disposed alongside/over the second side 114. In the second position and the third position, the camera and/or other components may be activated (or permitted to be activated such as when motion is detected). For example, and as will be explained in detail herein, in the second position and the third position, the features (e.g., rib, notch protrusion, etc.) of the privacy cover 104 may disengage the switch of the device 100 to permit the camera and/or other components of the device 100 (e.g., microphones) to be enabled. During rotation, and when the privacy cover 104 is in the second position and the third position, the privacy cover 104 may remain coupled to the camera housing 102. As the privacy cover 104 rotates, the privacy cover 104 may traverse over the camera housing 102, such as an exterior surface thereof.

The privacy cover 104 may include a passageway 120 that provides access to a button of the device 100. The passageway 120 may be located proximate to the top 108 of the device 100, and in the first position, the second position, and the third position of the privacy cover 104, the button may be accessible. In some instances, the privacy cover 104 may rotate about the button.

In some instances, the stand 106 may couple to a vertical surface (e.g., wall) for disposing the device 100 on the vertical surface, or may position the device 100 on a horizontal surface (e.g., shelf), such as, for example, as shown in FIG. 1. In some instances, the stand 106 may be rotatably, pivotably, or translationally coupled to the camera housing 102. When disposed on the horizontal surface, the stand 106 may be disposed at or along the bottom 110 of the device 100. However, when disposed on the vertical surface, the stand 106 may be disposed at or along the back 118 of the device 100. A coupling between the camera housing 102 and the stand 106 may resemble a ball and socket joint. Here, the stand 106 may include a ball that is received within a socket of the camera housing 102. The coupling between the stand 106 and the camera housing 102 not only permits the device 100 to be disposed on a plurality of surfaces, but may adjust a field of view (FoV) of the device 100 (e.g., camera(s), sensor(s), etc.). Further, although the stand 106 is shown coupled to the camera housing 102 at the bottom 110 and/or the back 118, the stand 106 may be coupled to other portions of the camera housing 102.

In some instances, and as will be explained herein, the camera housing 102 may be formed at least in part by a first cover 122 and a second cover 124. The first cover 122 and the second cover 124 may couple together via adhesives, snap-fit, fasteners, and the like. The first cover 122 and the second cover 124, once coupled together, may define an interior cavity within which components (e.g., camera, PCBs, etc.) of the device 100 are disposed. In some instances, the first cover 122 may be disposed along the front 116, the first side 112, the second side 114, and/or the bottom 110. The second cover 124 may be disposed along the back 118, the first side 112, the second side 114, and/or the top 108. The privacy cover 104 may be rotationally coupled to the first cover 122 (e.g., at the bottom 110) and the second cover 124 (e.g., at the top 108), respectively.

Figure 2:
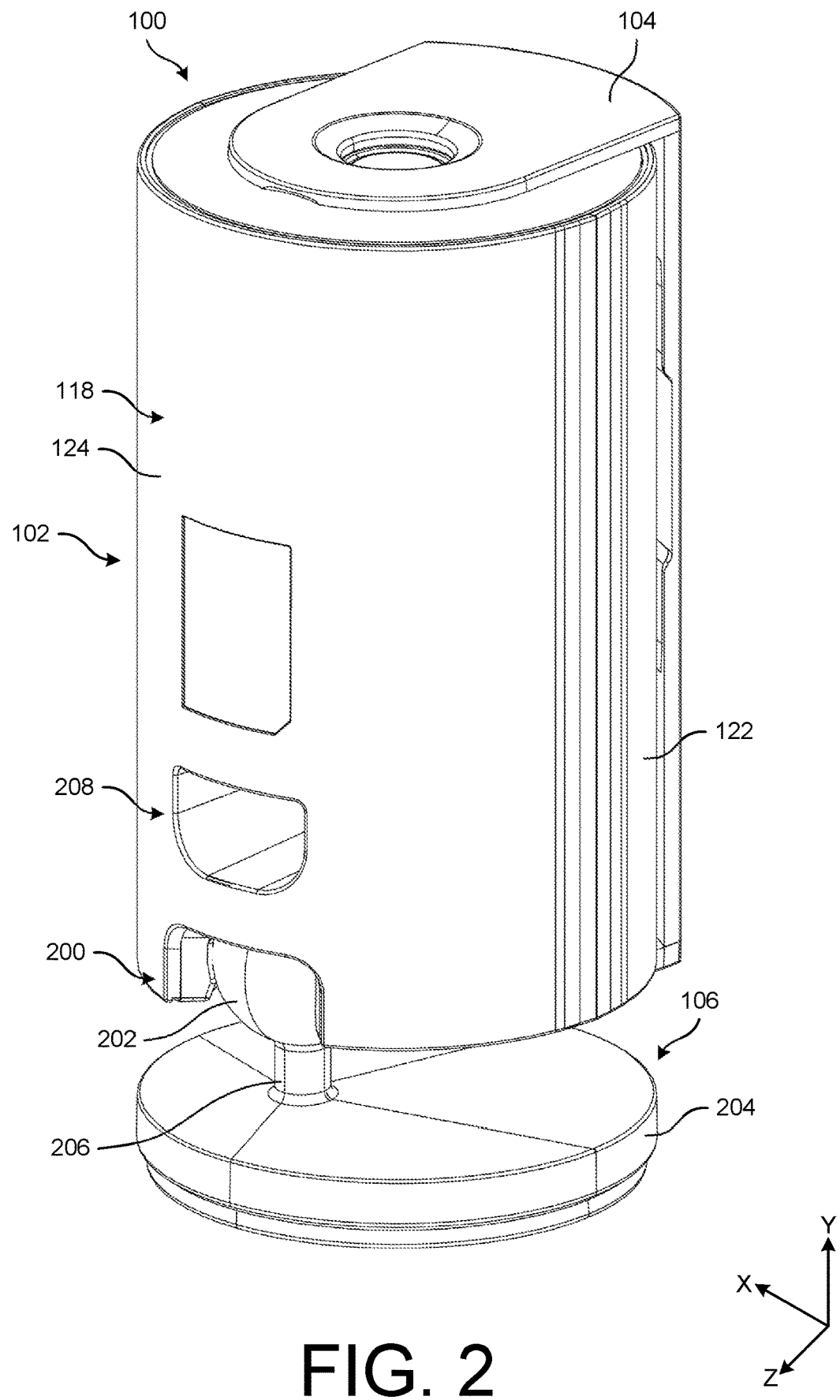
FIG. 2 illustrates a rear perspective view of the device of FIG. 1, according to examples of the present disclosure.

FIG. 2 illustrates a rear perspective view of the device 100, according to an example of the present disclosure. The stand 106 is shown coupled to the camera housing 102, at the back 118 of the device 100 (or a back of the camera housing 102). For example, in some instances, the first cover 122 and/or the second cover 124 of the camera housing 102 may define a socket 200 within which a ball 202 of the stand 106 is received. In some instances, the stand 106 includes a base 204 and an arm 206 extending from the base 204. The ball 202 may be disposed on an end of the arm 206 for being received within the socket 200. Moreover, the socket 200 may be open at the bottom 110 as well as at the back 118 of the device 100. Herein, the stand 106 may pivot between the position shown in FIG. 2 (e.g., disposed under the bottom 110) and being disposed at or along the back 118.

The camera housing 102 includes a pocket 208 for coupling the device 100 to networks, mains power, other devices, and so forth. For example, port(s) or other connections (e.g., power socket, auxiliary jack, ethernet, etc.) may be disposed within the pocket 208. As such, cables, wires, or other connectors may be routed into the pocket 208. In some instances, the pocket 208 may be defined by or included within the second cover 124 of the camera housing 102.

Figure 3:
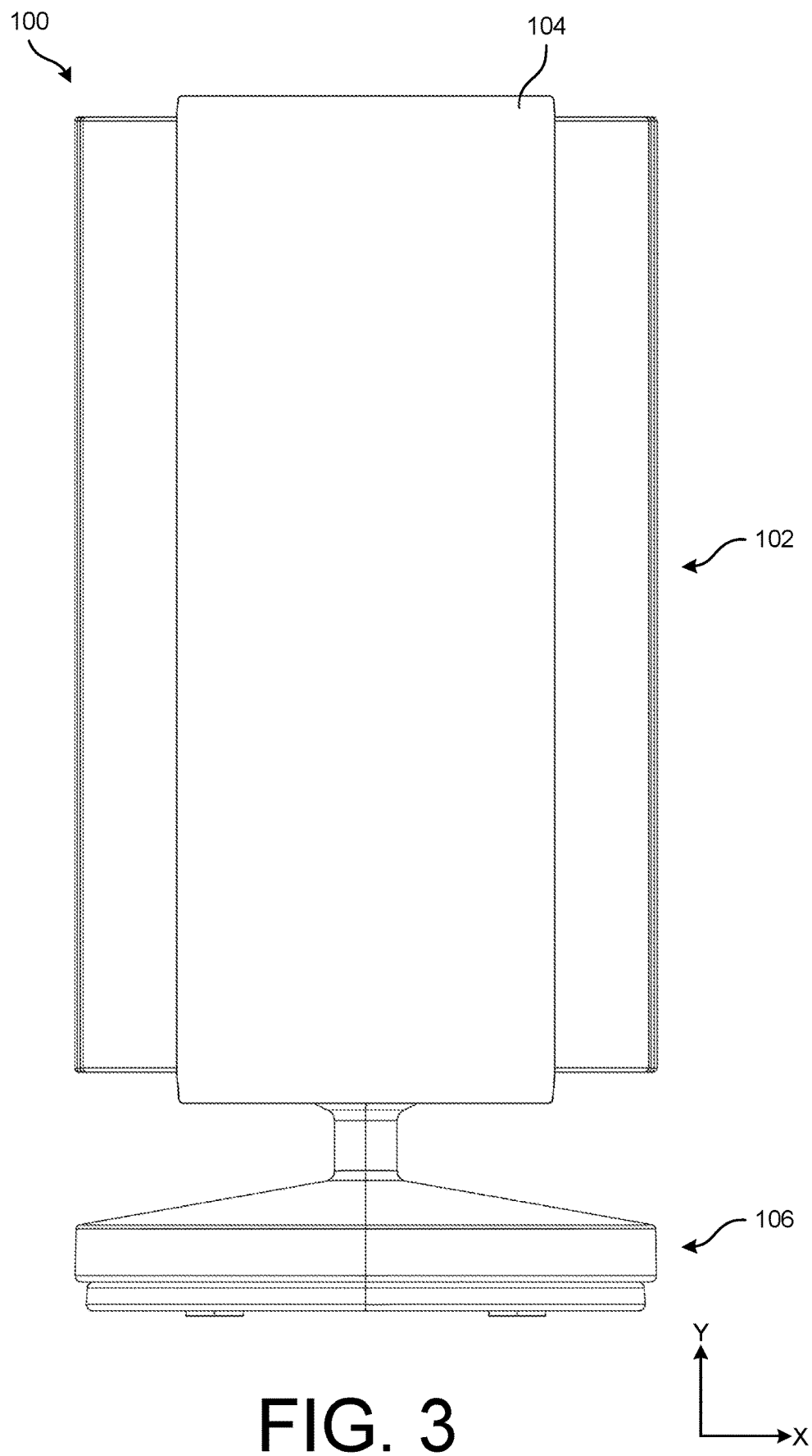
FIG. 3 illustrates a front view of the device of FIG. 1, according to an example of the present disclosure.

FIG. 3 illustrates a front view of the device 100, according to an example of the present disclosure. The privacy cover 104 is shown in the first position for obstructing the camera. In some instances, the camera housing 102 includes a first width (e.g., in the X-direction), and the privacy cover 104 includes a second width (e.g., in the X-direction) that is less than the first width. Although the privacy cover 104 does not extend across the first width, the second width of the privacy cover 104 may be sufficient to obstruct the camera. In some instances, in the first position of the privacy cover 104, the privacy cover 104 may be centrally aligned on the camera housing 102. Additionally, the stand 106 may be centrally aligned on the camera housing 102.

Figure 4:
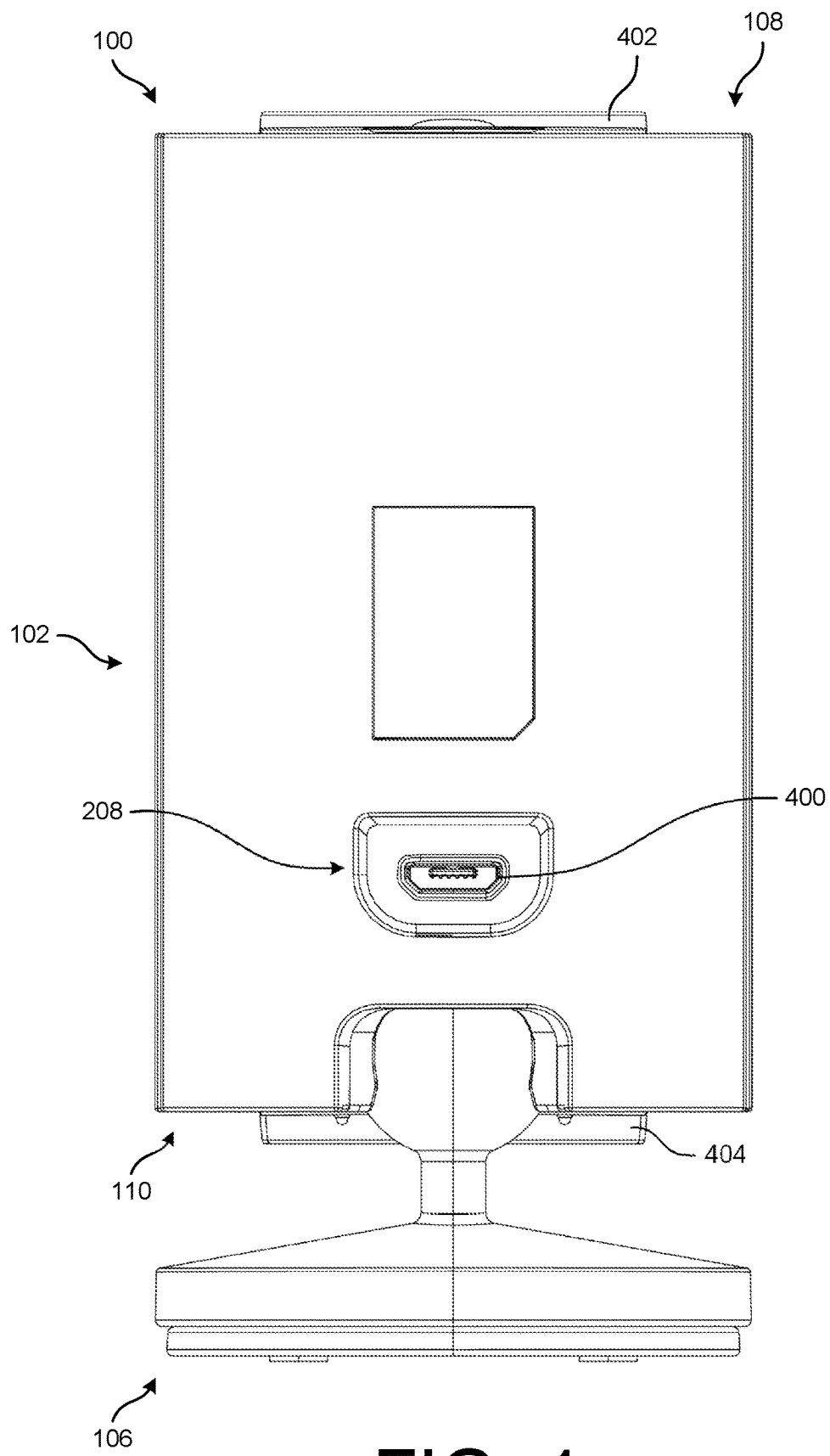
FIG. 4 illustrates a rear view of the device of FIG. 1, according to an example of the present disclosure.

FIG. 4 illustrates a back view of the device 100, according to an example of the present disclosure. The stand 106 is shown coupled to the bottom 110 and/or the back 118 of the device 100 (or the camera housing 102), and the pocket 208 is shown being formed within the camera housing 102. A connector 400 may be disposed within the pocket 208 for receiving power, connecting to other devices, and so forth.

The privacy cover 104 is shown including a first arm 402 and a second arm 404. The first arm 402 may extend at least partially onto and/or over the top 108 of the device 100 (or the top of the camera housing 102), while the second arm 404 may extend at least partially onto and/or over the bottom 110 of the device 100 (or the bottom of the camera housing 102).

Figure 5A:
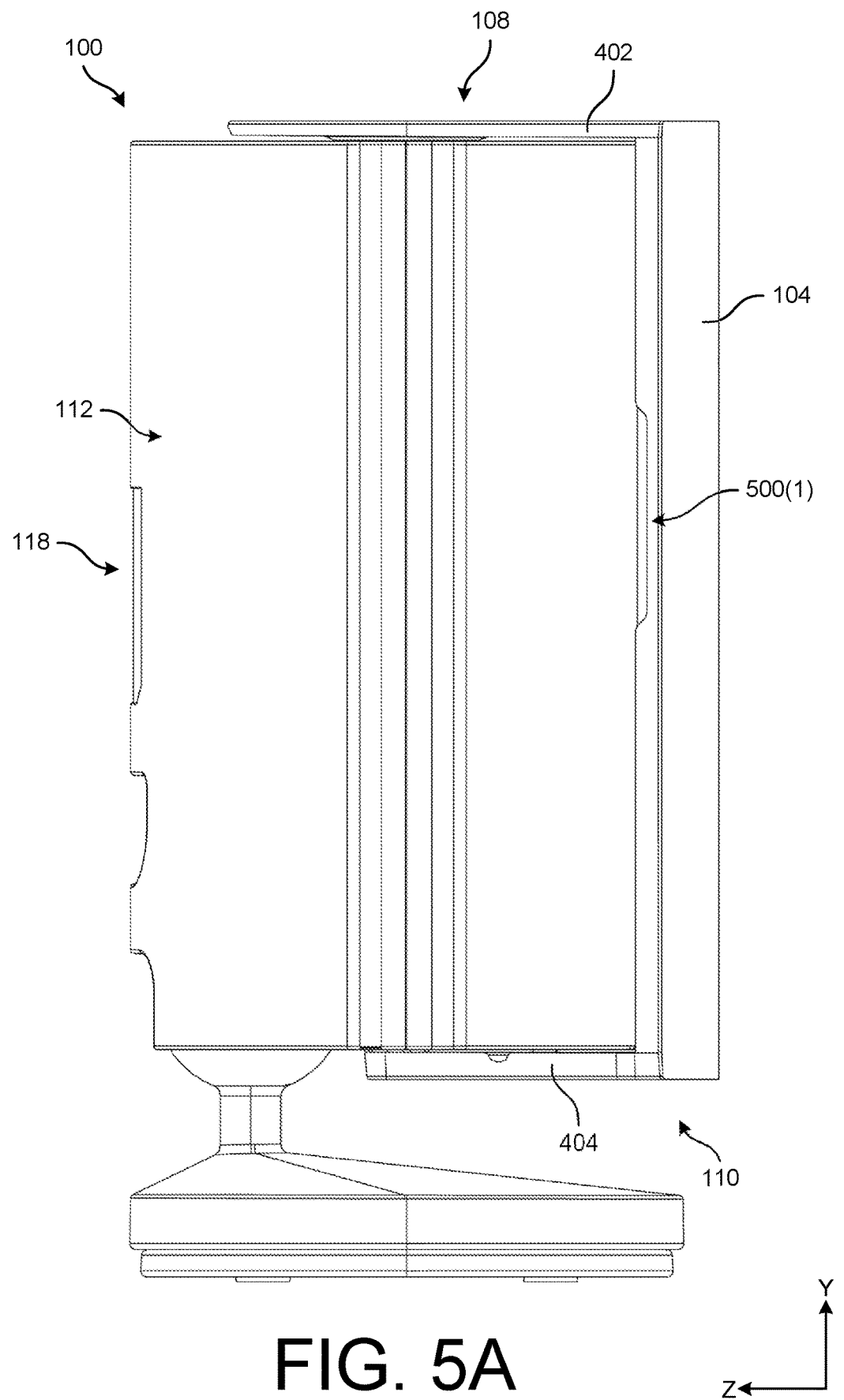
FIG. 5A illustrates a first side view of the device of FIG. 1, according to an example of the present disclosure.
Figure 5B:
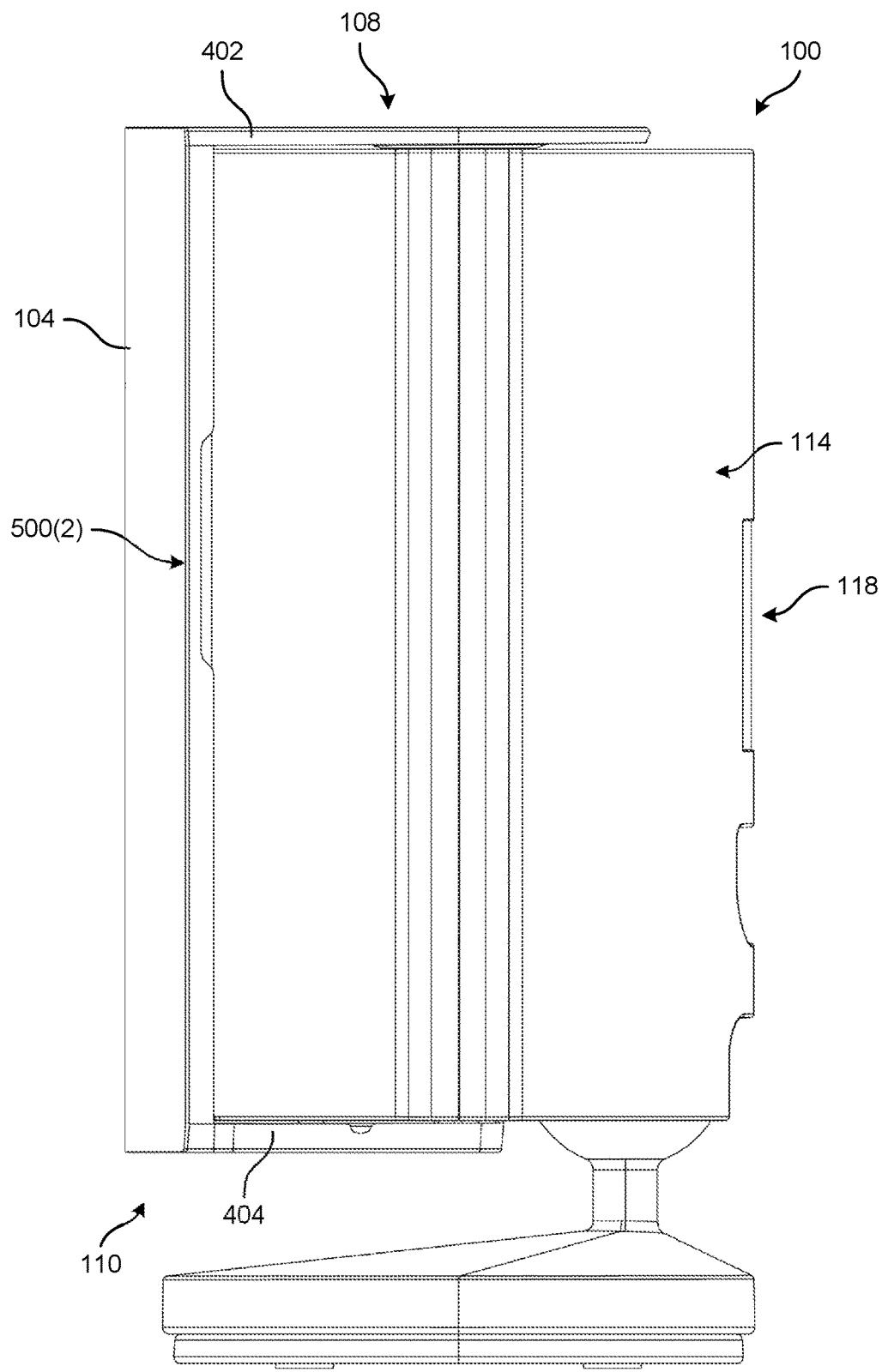
FIG. 5B illustrates a second side view of the device of FIG. 1, according to an example of the present disclosure.

FIGS. 5A and 5B illustrate a first side view and a second side view of the device 100, respectively, according to an example of the present disclosure. More particularly, FIG. 5A illustrates the first side 112 of the device 100, while FIG. 5B illustrates the second side 114 of the device 100.

The privacy cover 104 is shown including the first arm 402 that at least partially extends onto and/or over the top 108 of the device 100 (or the camera housing 102), and the second arm 404 that at least partially extends onto and/or over the bottom 110 of the device (or the camera housing 102). Additionally, the privacy cover 104 may include one or more cutouts 500, such as a first cutout 500(1) and a second cutout 500(2), that permit rotation of the privacy cover 104 between the first position, the second position, and the third position. In some instances, the one or more cutouts 500 may represent thinned regions of the privacy cover 104 such that the privacy cover 104 may rotate past the camera without contact. For example, the camera may extend beyond an exterior surface at the front 116 of the device 100, and the one or more cutouts 500 permit the privacy cover 104 to traverse over the camera.

Figure 6:
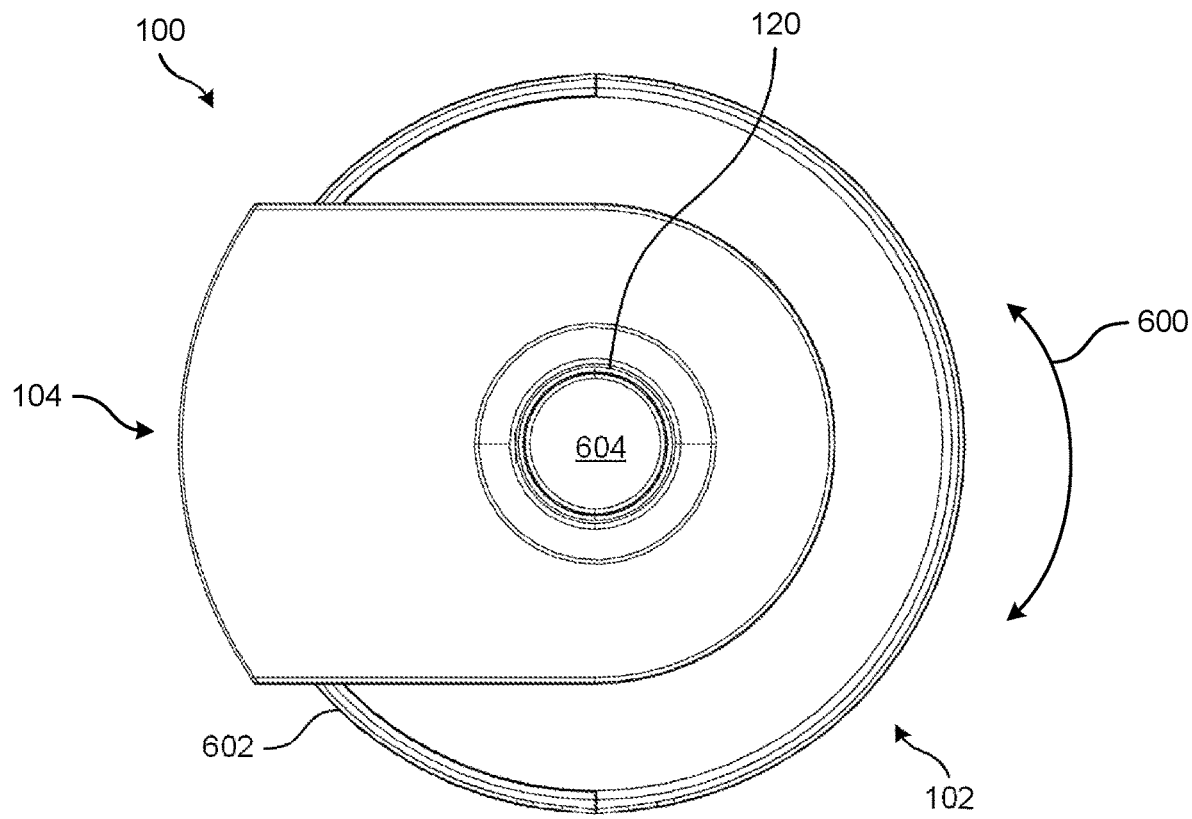
FIG. 6 illustrates a top view of the device of FIG. 1, according to an example of the present disclosure.

FIG. 6 illustrates a top view of the device 100, according to examples of the present disclosure. The privacy cover 104 is shown in the first position in which the camera is obscured. The privacy cover 104 is rotatable in a rotational direction 600. In some instances, the privacy cover 104 rotates about an axis disposed through a center of the camera housing 102. When moved from the first position as shown in FIG. 6, the privacy cover 104 may rotate in the clockwise direction about the axis to the second position, or in the counterclockwise direction about the axis to the third position. When rotated in the rotational direction 600, the privacy cover 104 traverses over an exterior surface 602 of the camera housing 102.

The device 100 includes a button 604 that is accessible via the passageway 120 of the privacy cover 104. In some instances, the button 604 may be a mechanical-type button, a resistive-type button, a capacitive-type button, and so forth. As the privacy cover 104 rotates between the first position, the second position, and the third position, the button 604 remains accessible via the passageway 120.

Figure 7:
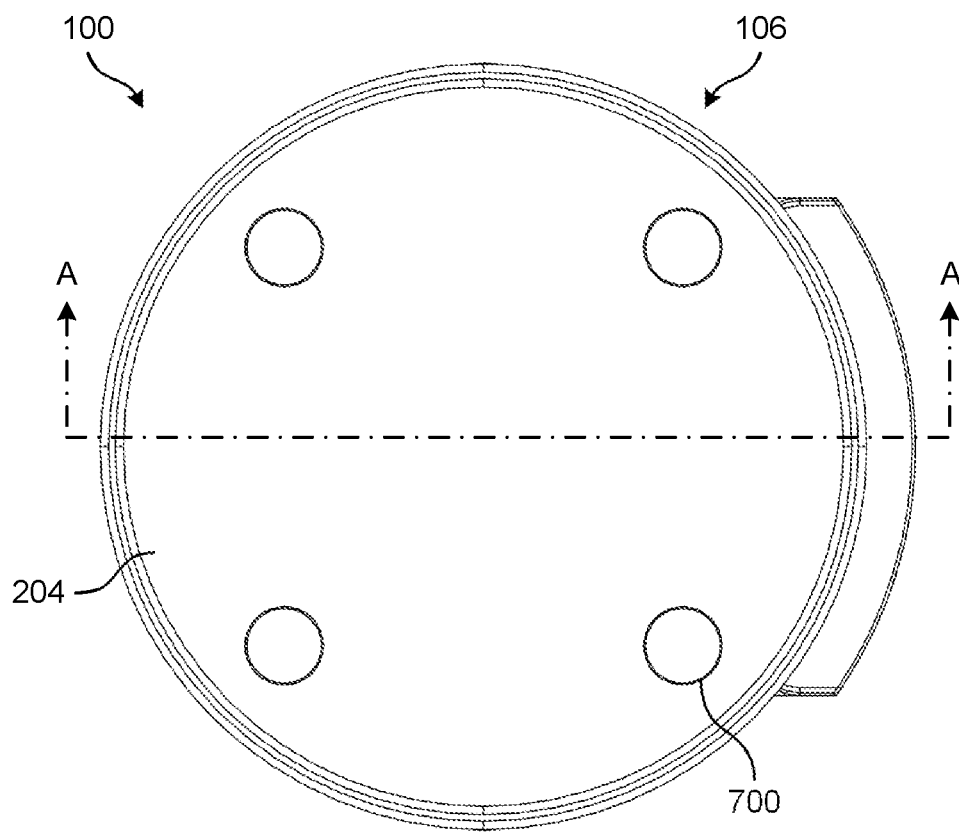
FIG. 7 illustrates a bottom view of the device of FIG. 1, according to an example of the present disclosure.
Figure 7:
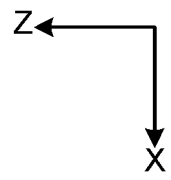

FIG. 7 illustrates a bottom view of the device 100, according to an example of the present disclosure. The stand 106, such as the base 204, is shown including holes 700 for receiving fasteners (e.g., screws) that may couple the stand 106 to a surface (e.g., wall). For example, fasteners may be disposed through the holes 700 and secured into a surface for coupling the stand 106 to the surface. Alternatively, the base 204 may rest on a horizontal surface to dispose the device 100 within an environment.

Figure 12:
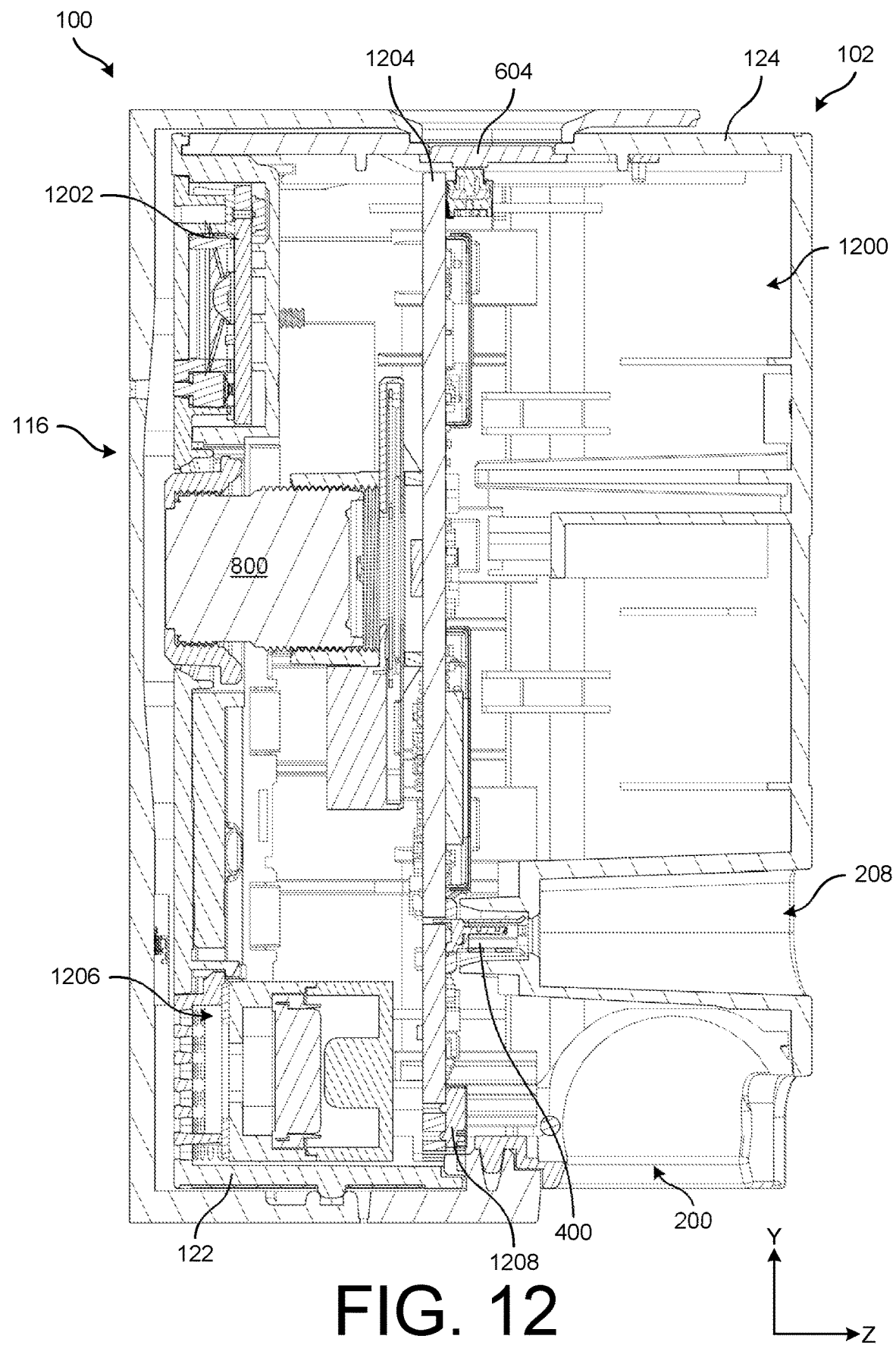
FIG. 12 illustrates a cross-sectional view of the device of FIG. 1, taken along line A-A of FIG. 7, according to an example of the present disclosure.

A line A-A is further shown extending through the device 100, which is used to illustrate a cross-sectional view of the device in FIG. 12.

Figure 8A:
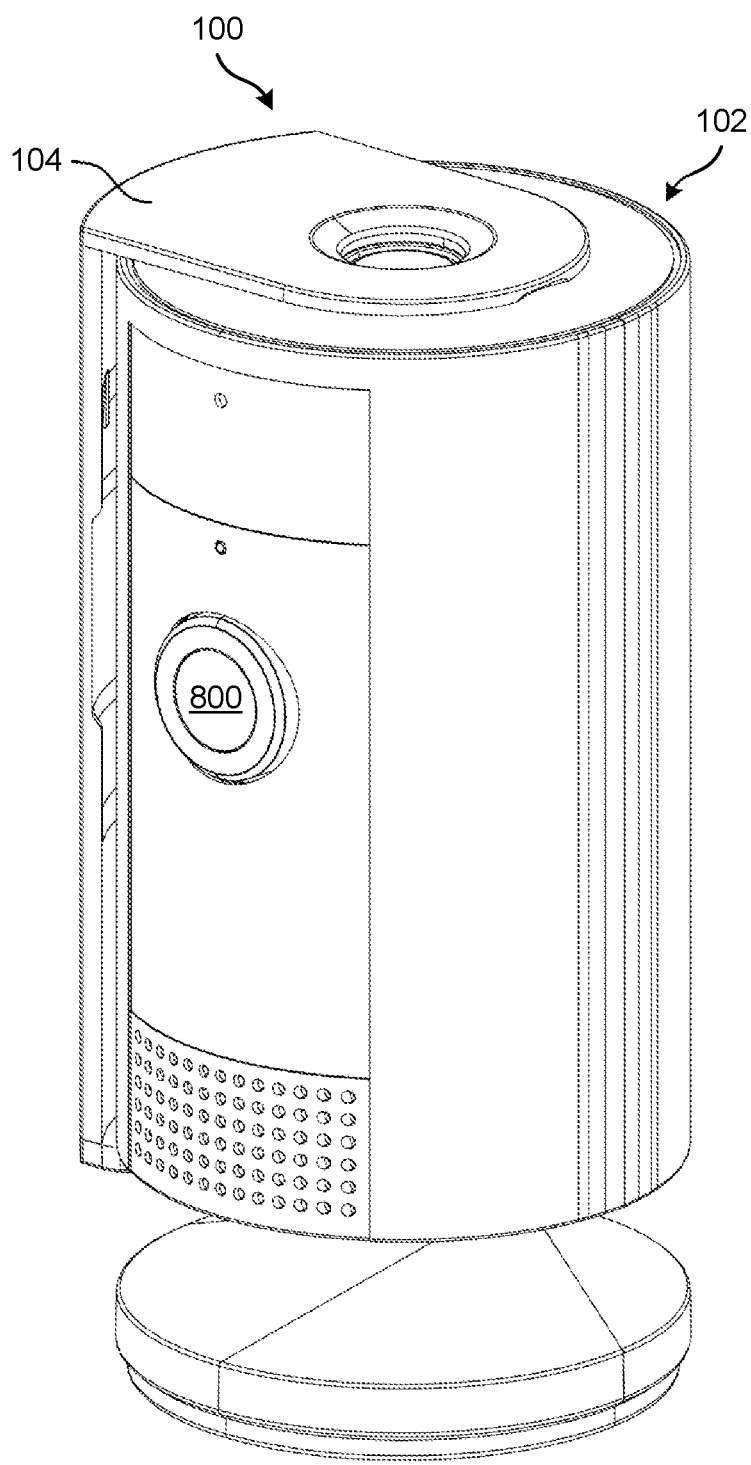

FIGS. 8A and 8B illustrate the privacy cover 104 in the second position, according to examples of the present disclosure. FIG. 8A illustrates a front perspective view of the device 100 with the privacy cover 104 in the second position, while FIG. 8B illustrates a front planar view of the device 100 with the privacy cover 104 in the second position.

From the first position of the privacy cover 104, the privacy cover 104 may rotate (e.g., swing) in the clockwise direction to the second position. In some instances, the privacy cover 104 may rotate 90 degrees from the first position to the second position. At the second position, a camera 800 and other components of the device 100 (e.g., IR lighting element(s), microphone(s), etc.) are unobstructed by the privacy cover 104. Rotation of the privacy cover 104, to the second position, is accomplished at least in part via an engagement between the privacy cover 104 and the camera housing 102. As will be explained herein, features of the privacy cover 104 and the camera housing 102 may engage in the second position to provide a snap-like feel to a user of the device 100 to indicate that the privacy cover 104 is in the second position and/or to keep the privacy cover 104 in the second position.

Figure 9A:
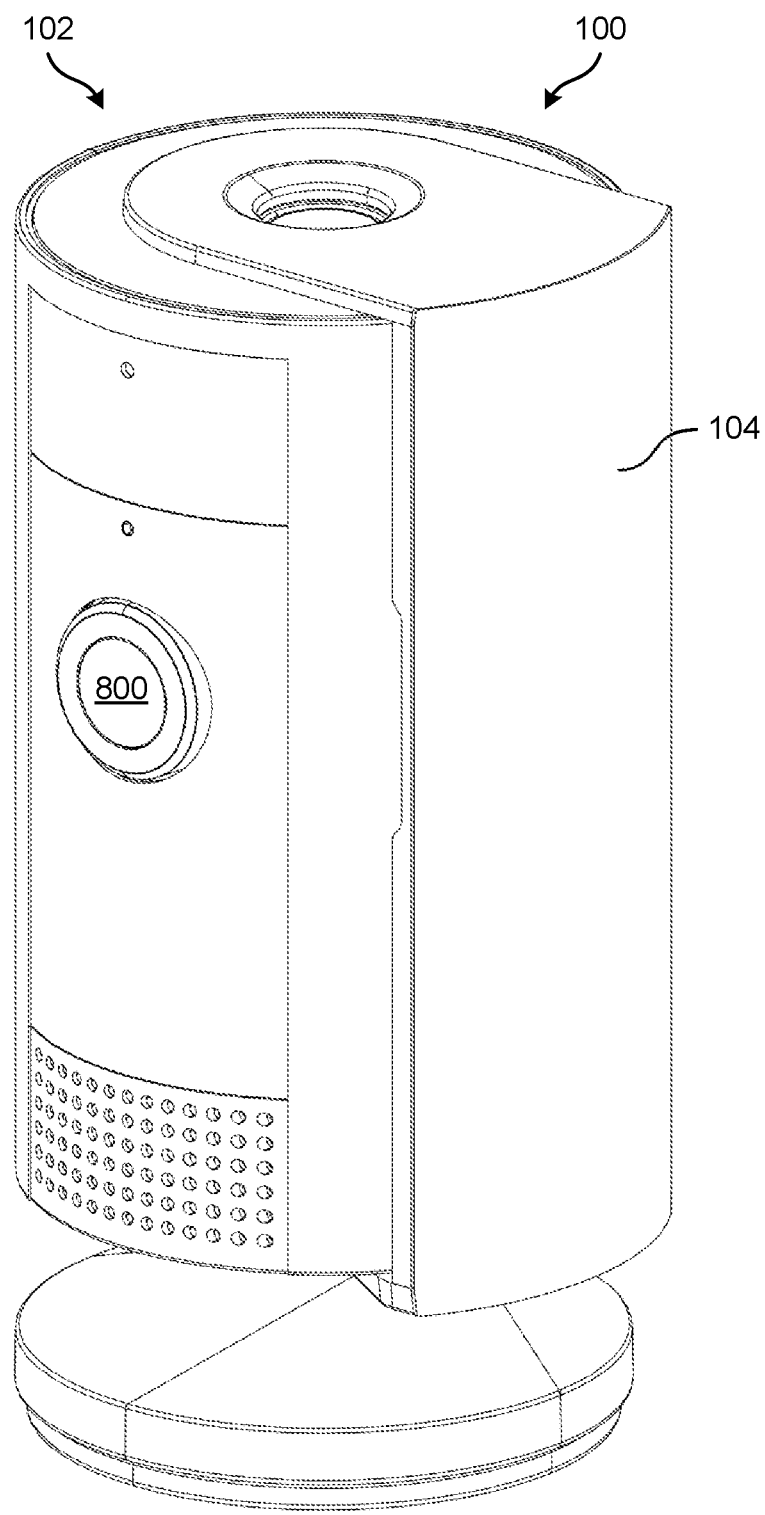
FIGS. 9A and 9B illustrate a rotational movement of the privacy cover of FIG. 1, showing the privacy cover in a third position, according to an example of the present disclosure.
Figure 9A:
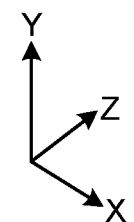
Figure 9B:
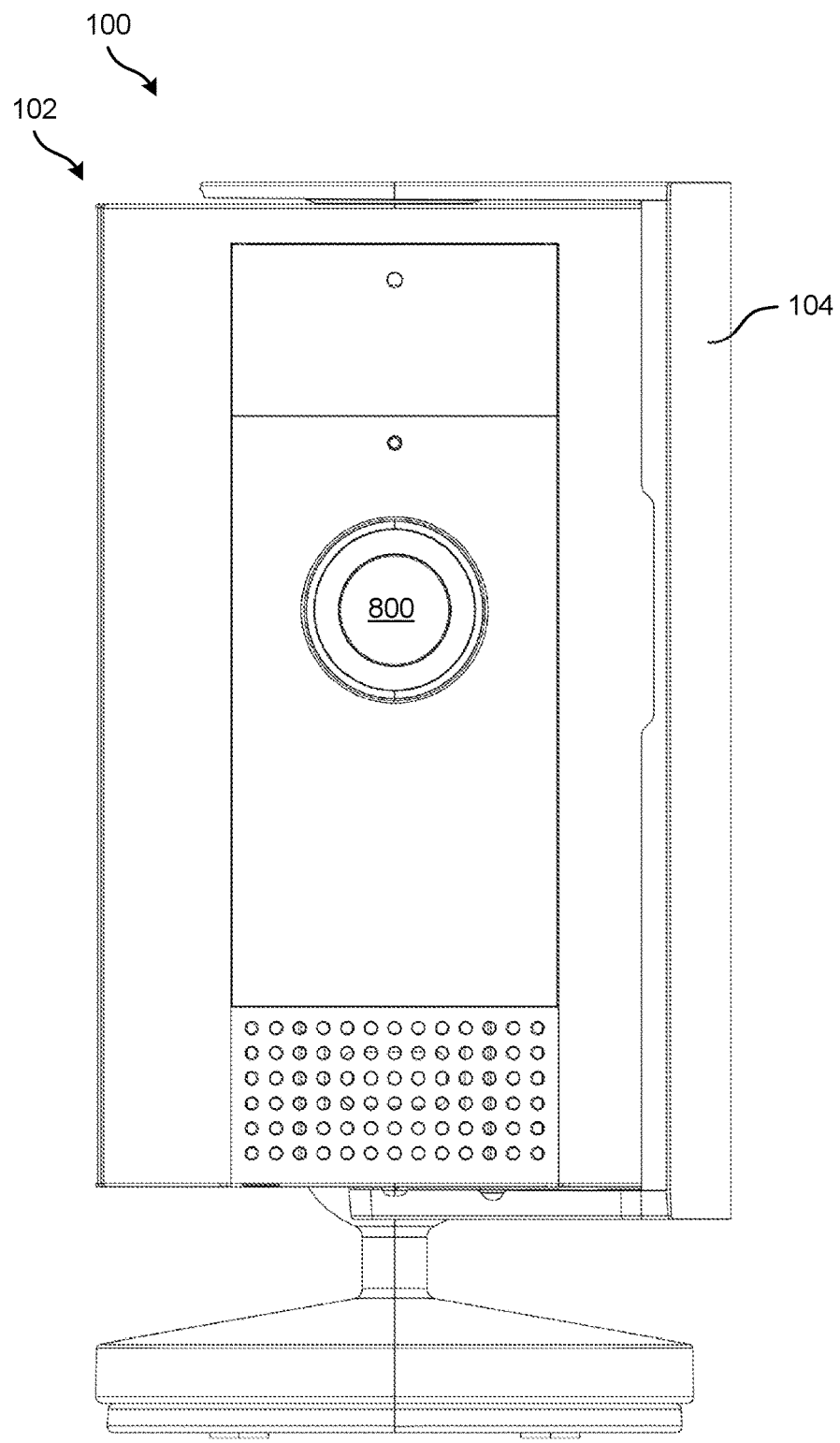

FIGS. 9A and 9B illustrate the privacy cover 104 in the third position, according to examples of the present disclosure. FIG. 9A illustrates a front perspective view of the device 100 with the privacy cover 104 in the third position, while FIG. 9B illustrates a front planar view of the device 100 with the privacy cover 104 in the third position.

From the first position of the privacy cover 104 (or the second position), the privacy cover 104 may rotate (e.g., swing) in the counterclockwise direction to the third position. In some instances, the privacy cover 104 may rotate 90 degrees from the first position to the third position, or 180 degrees from the second position to the third position. At the third position, a camera 800 and other components of the device 100 (e.g., IR lighting element(s), microphone(s), etc.) are unobstructed by the privacy cover 104. Rotation of the privacy cover 104, to the third position, is accomplished at least in part via an engagement between the privacy cover 104 and the camera housing 102. As will be explained herein, features of the privacy cover 104 and the camera housing 102 may engage in the third position to provide a snap-like feel to a user of the device 100 to indicate that the privacy cover 104 is in the third position and/or to keep the privacy cover 104 in the third position.

Although the privacy cover 104 is described as being moveable between the first position, the second position, and the third position, in some instances, the privacy cover 104 may be movable between two positions. At a first of these positions, the privacy cover 104 may obstruct the camera 800 (e.g., the first position), while at a second of these positions, the privacy cover 104 may not obstruct the camera 800 (e.g., the second position or the third position). In other words, while the privacy cover 104 is described herein as being rotated in both clockwise or counterclockwise directions from the first position, to either the second position or the third position, the privacy cover 104 may be limited to moving to only one of the second position or the third position.

Figure 10:
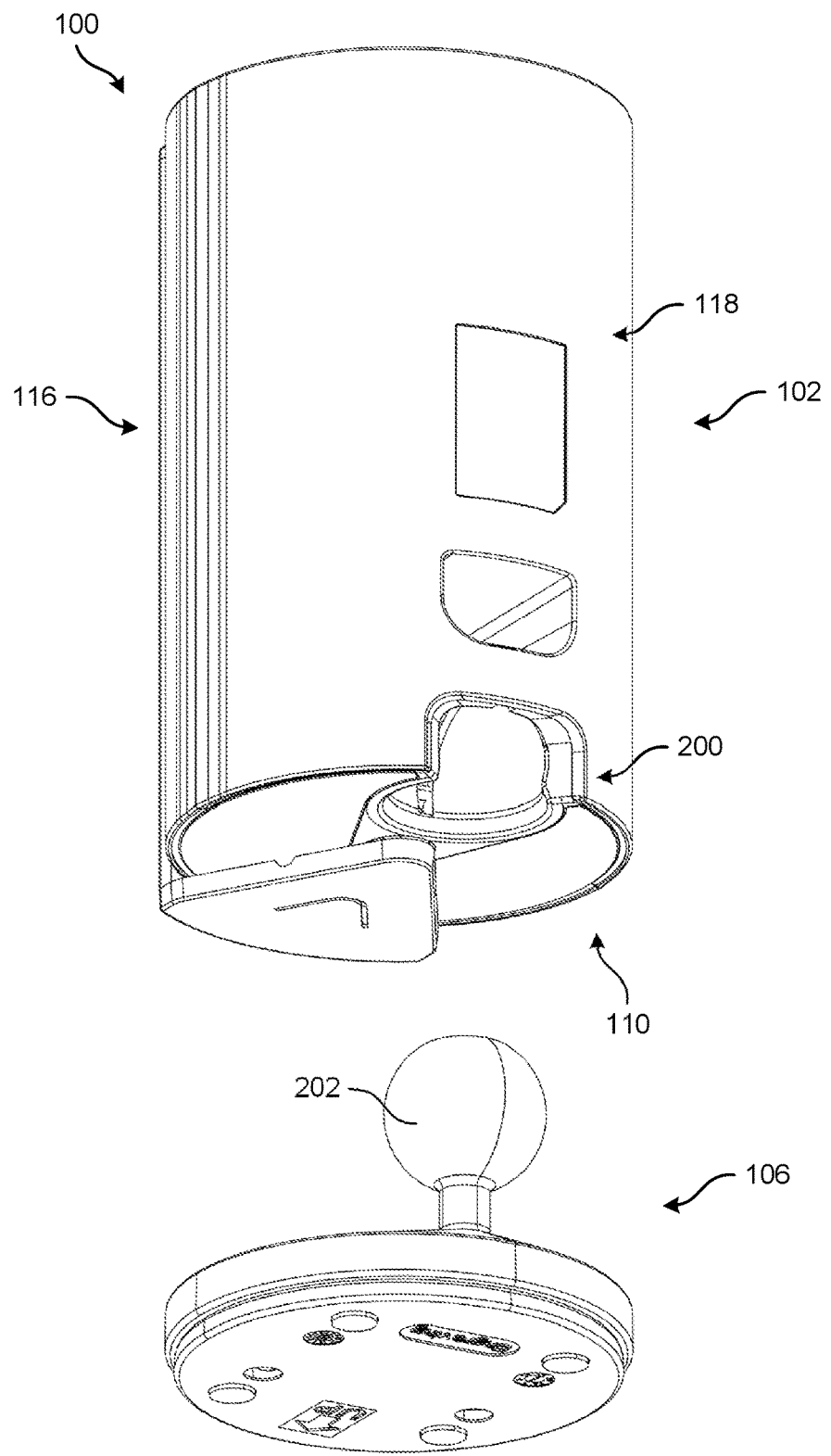
FIG. 10 illustrates a partially exploded view of the device of FIG. 1, showing an example stand of the device being separated from an example camera housing of the device, according to an example of the present disclosure.

FIG. 10 illustrates a partially exploded view of the device 100, according to examples of the present disclosure. For example, the ball 202 of the stand 106 is shown being removed from the socket 200 of the camera housing 102. In some instances, the socket 200 is disposed at the bottom 110 of the device 100, or at the bottom of the camera housing 102. Moreover, the socket 200 may be located closer to the back 118 of the device 100 than the front 116 of the device 100. The socket 200 is open at the bottom 110 and the back 118 to permit the stand 106 to pivot between being disposed adjacent to the bottom 110 and the back 118, respectively.

In some instances, when the ball 202 is inserted into the socket 200, a compression or snap-like fit may be formed therebetween. However, the ball 202 is configured to rotate within the socket 200 to adjust an orientation of the device 100, for example. Additionally, the ball 202 may be pulled out of the socket 200 upon application of a threshold amount of force.

Figure 11:
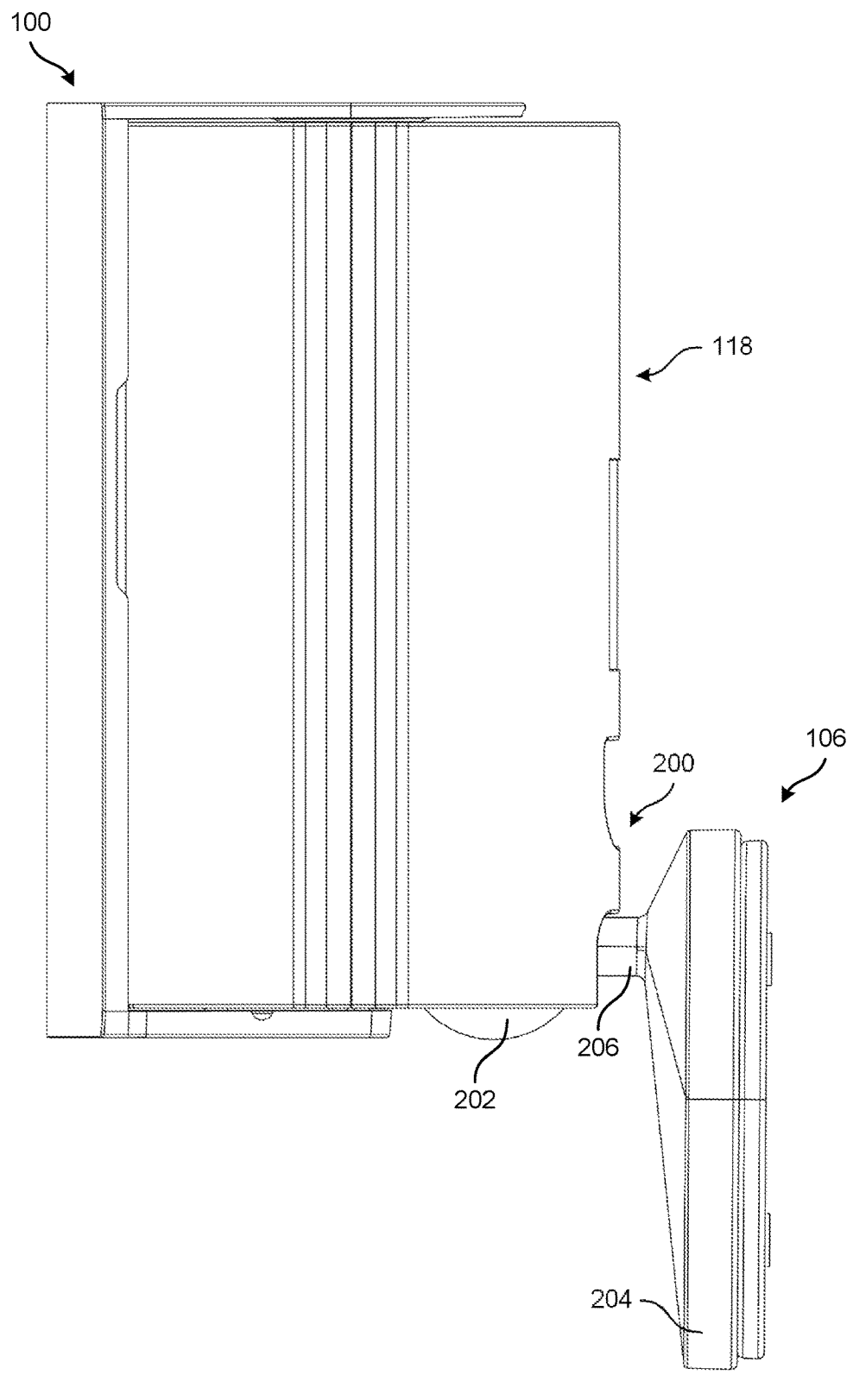
FIG. 11 illustrates a pivotable movement of the stand of FIG. 10 with the camera housing of FIG. 10, according to an example of the present disclosure.

FIG. 11 illustrates the rotational coupling between the camera housing 102 and the stand 106, according to examples of the present disclosure. For example, from the position of the stand 106 shown in FIG. 5B, the stand 106 may be rotated counterclockwise (e.g., about the X-axis) to the position shown in FIG. 11. At this position, the stand 106 may be disposed adjacent to the back 118 of the device 100, for example, to mount the device 100 along a vertical surface. The ball and socket joint formed between the ball 202 and the socket 200, may also permit the device 100 to be rotated from side to side (e.g., about the Y-axis and/or the Z-axis). As such, despite FIG. 11 illustrating a particular orientation of the device 100 and the stand 106 (or a relative position therebetween), the device 100 may be rotated, pivotable, or oriented to other positions.

FIG. 12 illustrates a cross-sectional view of the device 100, taken along line A-A of FIG. 7, according to examples of the present disclosure. In FIG. 12, the stand 106 is shown being removed from the device 100. As such, FIG. 12 may illustrate the camera housing 102 of the device 100.

The first cover 122 and the second cover 124 of the camera housing 102 may define an interior cavity 1200 within which components of the device 100 reside. In some instances, the device 100 includes a first PCB 1202 and a second PCB 1204. The first PCB 1202 may reside closer to the front 116 of the device 100 than the second PCB 1204. In some instances, the camera 800 may be disposed on (e.g., mounted to) the second PCB 1204. The button 604 may also be disposed on the second PCB 1204. Additionally, among other components, the device 100 may include a speaker 1206 and a switch 1208 that operates to activate and deactivate the camera 800. In some instances, the speaker 1206 is mounted to the first cover 122, and is oriented to output sound in a direction towards the front 116 of the device 100. The switch 1208 may be disposed on the second PCB 1204 and, as explained herein, may include a lever that is acted on by a rib of the privacy cover 104.

The first cover 122 may at least partially define the socket 200 that receives the ball 202 of the stand 106. The second cover 124 defines the socket 200 within which the connector 400 is disposed. In some instances, the connector 400 is disposed on the second PCB 1204.

Figure 13:
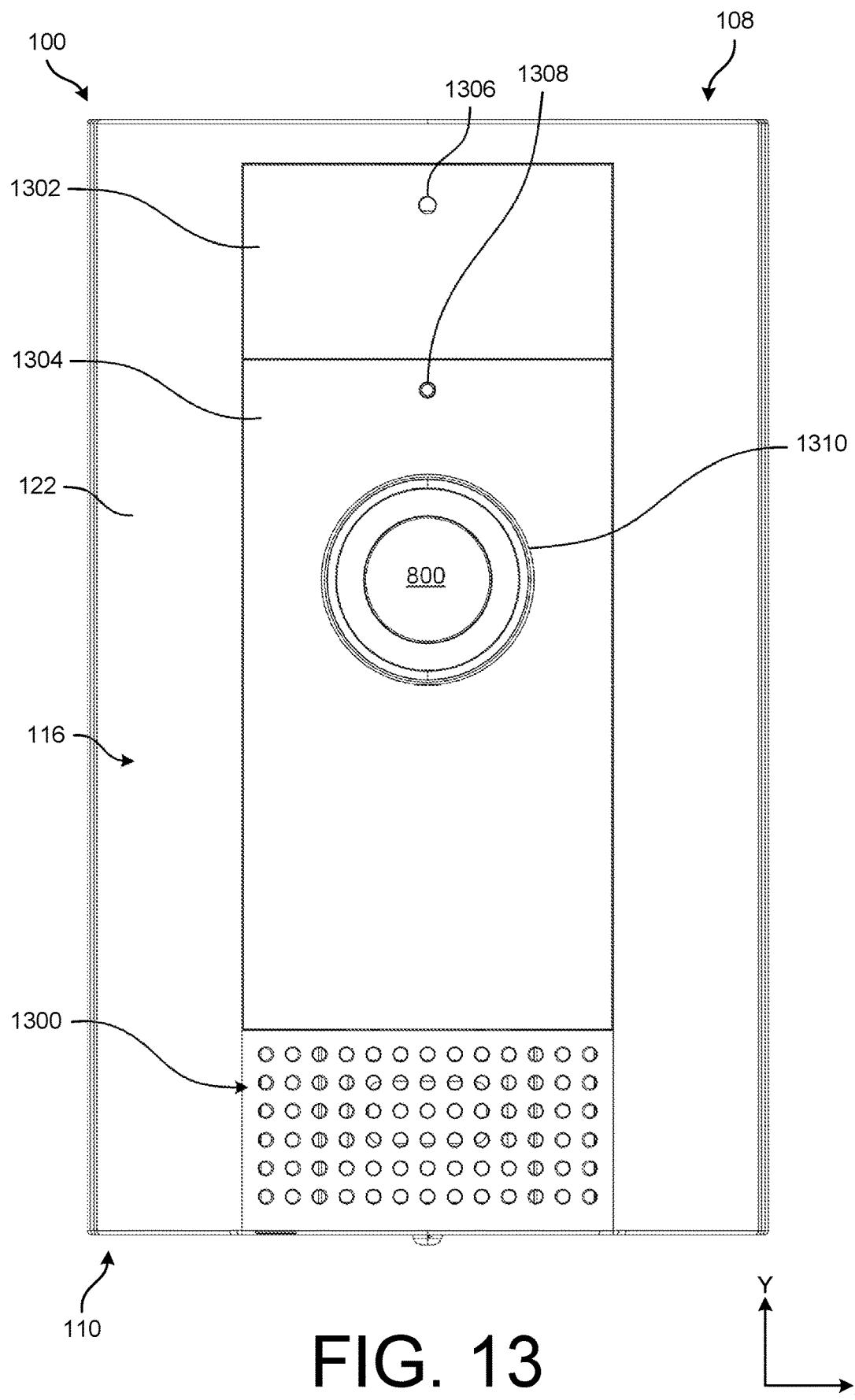
FIG. 13 illustrates a front view of an example camera housing of the device of FIG. 1, according to an example of the present disclosure.

FIG. 13 illustrates a front view of the device 100, showing the privacy cover 104 removed, according to examples of the present disclosure. The first cover 122 may define orifices 1300 that output sound emitted via the speaker 1206. The speaker 1206 may reside beneath the orifices 1300 (e.g., in the Z-direction). As shown, the orifices 1300 may be located proximate to the bottom 110 of the device 100. Although a certain number, shape, orientation, and/or pattern of the orifices 1300 are shown, the orifices 1300 may be arranged differently than shown.

The camera housing 102 may include a first window 1302 and a second window 1304. The first window 1302 and the second window 1304 may couple to the first cover 122, for example, along the front 116 of the device 100. The first window 1302 is shown being disposed vertically above the second window 1304, for example, proximate to the top 108 of the device 100. As such, the second window 1304 may be interposed between the orifices 1300 and the first window 1302. In some instances, the first window 1302 and the second window 1304 include a similar width (e.g., in the X-direction).

The first window 1302 includes a microphone port 1306. As will be discussed herein, a microphone may reside beneath the microphone port 1306. The microphone port 1306 may channel sound from an exterior of the device 100 to the interior of the device 100 such that the microphone is able to capture sound within an environment of the device 100. As shown, the microphone port 1306 may be located vertically above the camera 800, and/or closer to the top 108 of the device 100 than the bottom 110. Although the first window 1302 is shown and described as only including one microphone port 1306, the first window 1302 (or the second window 1304, first cover 122, etc.) may define additional microphone ports. In such instances, the device 100 may include more than one microphone.

The second window 1304 includes a first channel 1308 that emits light via a lighting element (e.g., status indicator) of the device 100. The first channel 1308 may be disposed through the second window 1304, and in some instances, a light pipe may reside within the first channel 1308 for uniformly dispersing light emitted via the lighting element. The lighting element, as will be explained herein, may output light (e.g., color, pattern, intensity, etc.) based on operations being performed by the device 100 (e.g., sensed motion, capture audio, etc.). The second window 1304 may also define a second channel 1310 that receives at least a portion of the camera 800. For example, a portion of the camera 800 may be disposed through the second channel 1310. As shown, the second channel 1310 may be located vertically below the first channel 1308. In some instances, the microphone port 1306, the first channel 1308, and the second channel 1310 are vertically aligned, and/or may be centrally located on the camera housing 102.

Additionally, as will be shown and explained herein, lighting elements, IR lighting element(s), and so forth may be disposed beneath the first window 1302 and/or the second window 1304. As such, in some instances, the first window 1302 and/or the second window 1304 may be transmissible to certain wavelengths of light. In some instances, the first window 1302 and/or the second window 1304 may be manufactured from high density polyethylene (HDPE), germanium, zinc-sulfide, and so forth.

Figure 14:
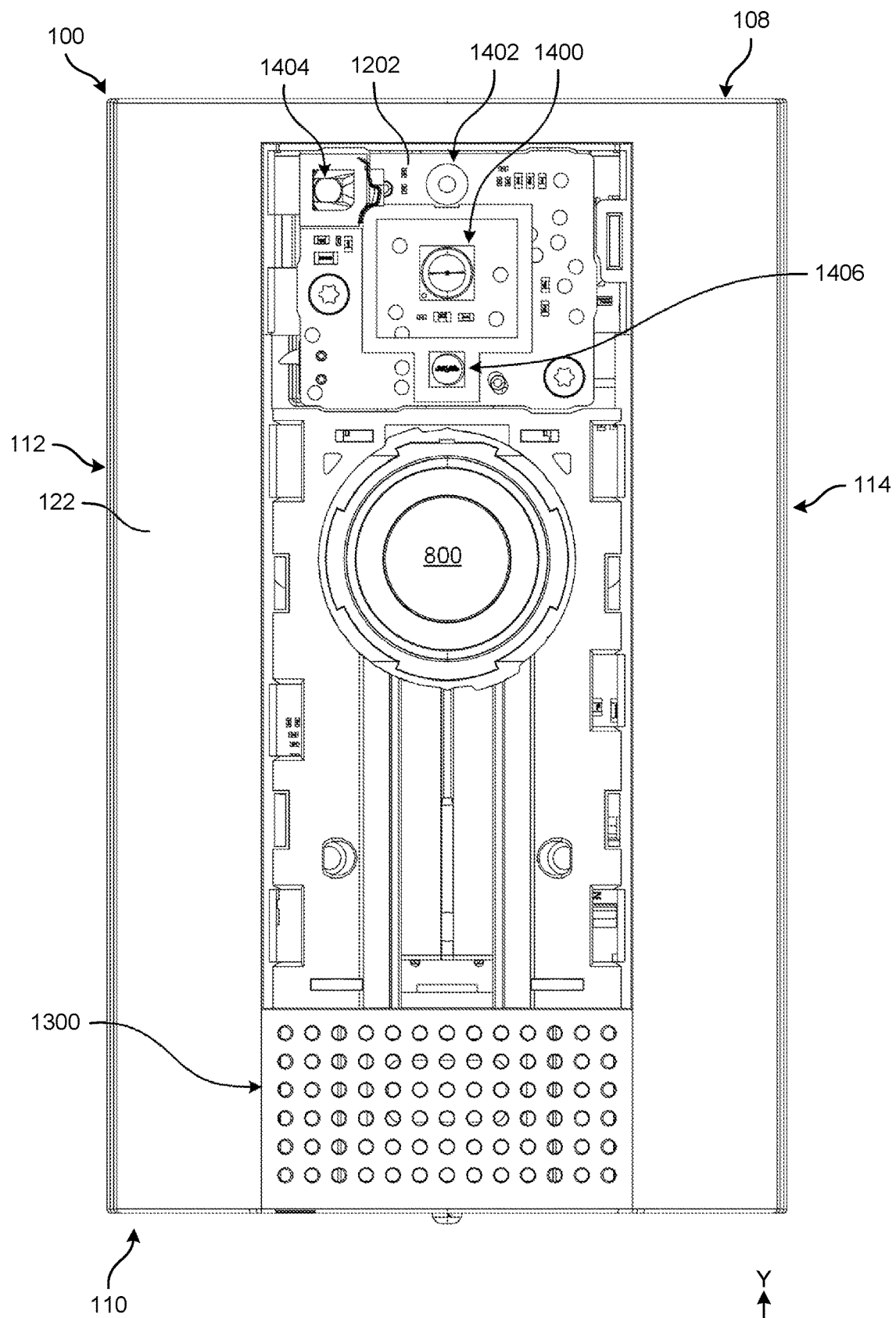
FIG. 14 illustrates example components of the device of FIG. 1, according to an example of the present disclosure.

FIG. 14 illustrates a front view of the device 100, showing the first window 1302 and the second window 1304 removed to illustrate components of the device 100, according to examples of the present disclosure.

The device 100 may include an IR lighting element 1400, a microphone 1402, an ambient light sensor 1404, and a lighting element 1406. In some instances, the IR lighting element 1400, the microphone 1402, the ambient light sensor 1404, and/or the lighting element 1406 are disposed on the first PCB 1202. However, in some instances, although the IR lighting element 1400, the microphone 1402, the ambient light sensor 1404, and/or the lighting element 1406 may be disposed on the first PCB 1202, the IR lighting element 1400, the microphone 1402, and the ambient light sensor 1404 may be disposed behind the first window 1302, while the lighting element 1406 may be disposed behind the second window 1304.

The IR lighting element 1400 is shown being located between the microphone 1402 and the camera 800. The lighting element 1406 may be located between the IR lighting element 1400 and the camera 800. In some instances, the IR lighting element 1400, the microphone 1402, the ambient light sensor 1404, and the lighting element 1406 are vertically aligned. Moreover, in some instances, the ambient light sensor 1404 and the microphone 1402 may be horizontally aligned.

The IR lighting element 1400 is configured to output light (e.g., IR light via an emitter) through the first window 1302 and into an environment of the device 100. In some instances, the IR lighting element 1400 may be used to detect motion within the environment, and in response, the camera 800 may be caused to capture image data and/or video data within the environment. In some instances, the IR lighting element 1400 is oriented to sense motion in front of the device 100. Although a single IR lighting element 1400 is shown, the device 100 may include more than one IR lighting element. Additionally, although the IR lighting element 1400 is shown at a particular position, the IR lighting element 1400 may be located differently than shown (e.g., closer to the top 108, closer to the bottom 110, etc.).

The microphone 1402 may be aligned with the microphone port 1306 such that sound external to the device 100 may reach the microphone 1402 located within the device 100. That is, the microphone 1402 may receive audio, for instance, user speech, via the microphone port 1306. In some instances, the microphone 1402 and/or the microphone port 1306 may be encased with foam that acoustically seals the microphone 1402 to minimize sound received and/or generated via other portions of the device 100. For example, the foam may isolate the microphone 1402 from the speaker 1206 to minimize an intensity of audio received from the speaker 1206.

The ambient light sensor be used to determine lighting conditions of the environment of the device 100, for example, when switching between daytime and nighttime modes (or light and dark lighting conditions). In some instances, the ambient light sensor 1404 is located closer to the first side 112 of the device 100 and the second side 114. In some instances, the ambient light sensor 1404 may receive light through (or via) the first window 1302 for determining the lighting conditions within the environment. The lighting element 1406 may output information associated with an operational state of the device 100, such as whether the microphone 1402 is recording audio, whether the camera 800 is capturing video, and so forth. In some instances, the lighting element 1406 may represent an RGB lighting element that may output light according to different appearance states (e.g., frequency, intensity, color, etc.).

In addition to defining the orifices 1300, the first cover 122 may define various cutouts, receptacles, and the like for receiving the first window 1302, the second window, the camera 800, and so forth. In some instances, the first window 1302 and the second window 1304 may couple to the first cover 122 may snap-fit, fasteners, adhesives, and so forth. The first cover 122 may also define various keyways, slots, and so forth that receive corresponding features of the first window 1302 and/or the second window 1304 for aligning or coupling the first window 1302 and/or the second window 1304 to the first cover 122.

Figure 15:
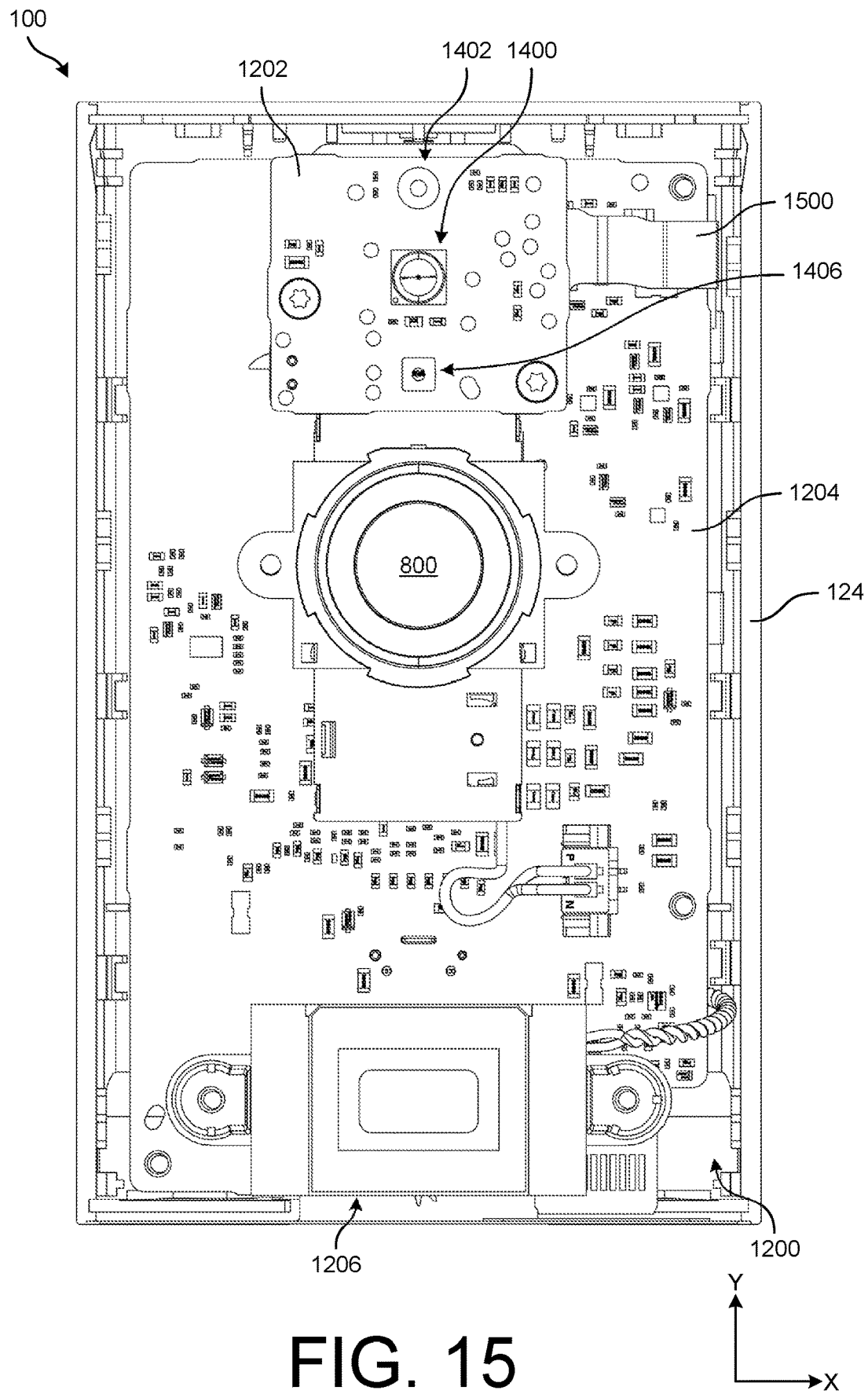
FIG. 15 illustrates example components of the device of FIG. 1, according to an example of the present disclosure.

FIG. 15 illustrates a front view of the device 100, showing the first cover 122 removed to illustrate components of the device 100, according to examples of the present disclosure.

The microphone 1402, the IR lighting element 1400, and the lighting element are shown disposed on the first PCB 1202 (the ambient light sensor 1404 is shown removed), while the camera 800 is shown disposed on the second PCB 1204. The speaker 1206 (which may reside within a speaker box) may be configured to couple to an inside surface of the first cover 122. In some instances, the first PCB 1202 and the second PCB 1204 communicatively couple to one another via a FPC 1500. For example, the FPC 1500 may transfer signals, power, and the like between the first PCB 1202 and the second PCB 1204. Additionally, various cables, wires, and so forth may connect the camera 800 and/or the speaker 1206 to the first PCB 1202 and/or the second PCB 1204. As shown, the camera 800 is oriented towards the front 116 of the device 100, and positioned vertically between the speaker 1206 and the lighting element 1406. In some instances, the speaker 1206, the camera 800, the lighting element 1406, the IR lighting element 1400, and the microphone 1402 are aligned along an axis (e.g., vertically aligned).

Removing the first cover 122 exposes the second cover 124, which may couple to the first cover 122 and define the interior cavity 1200 within which the components reside. The first PCB 1202 and/or the second PCB 1204 may couple to the first cover 122 and/or the second cover 124.

Figure 16:
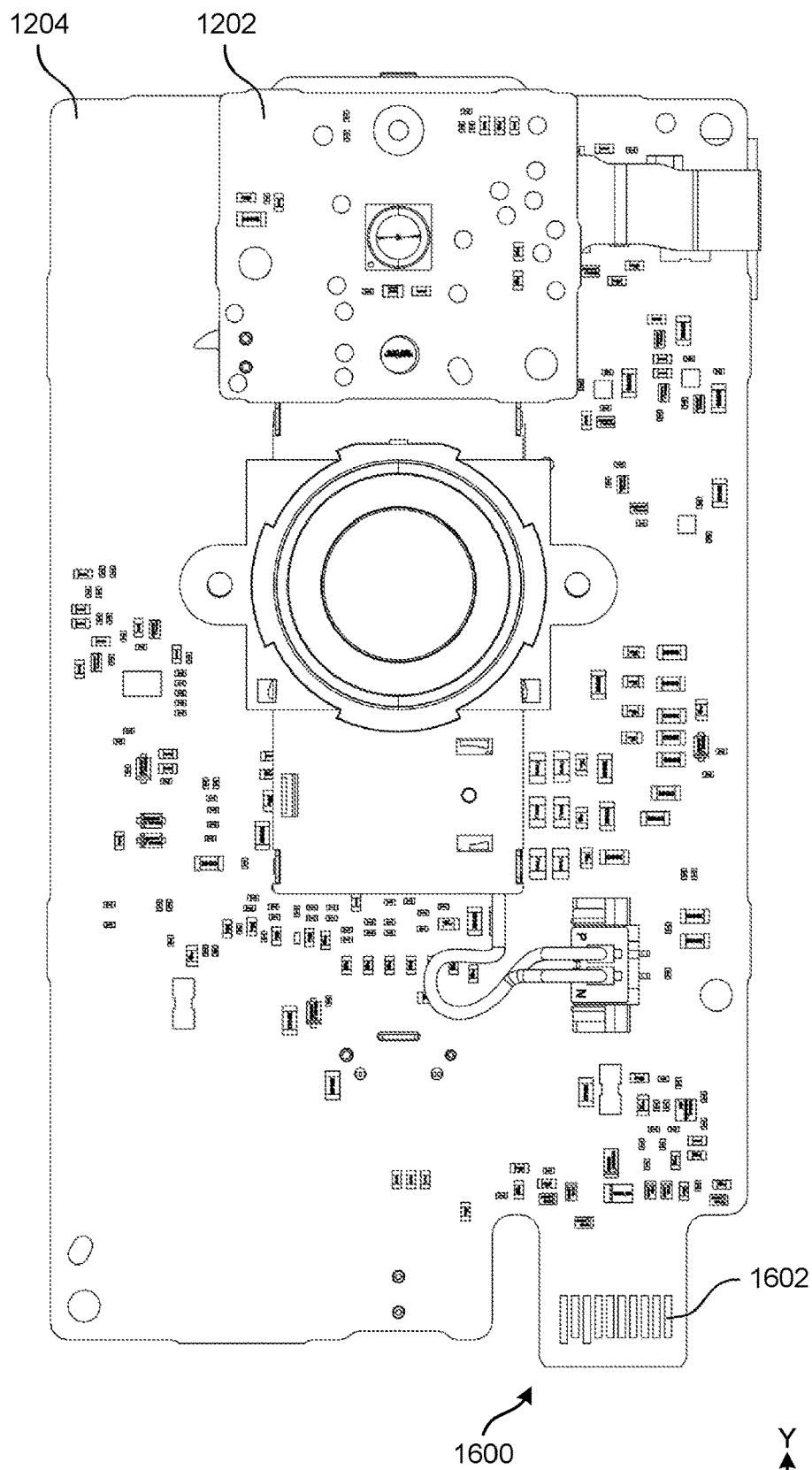
FIG. 16 illustrates example components of the device of FIG. 1, according to an example of the present disclosure.

FIG. 16 illustrates the first PCB 1202 and the second PCB 1204, according to examples of the present disclosure. From FIG. 15, the speaker 1206 and the second cover 124 are shown removed.

In some instances, the second PCB 1204 includes a connector 1600. For example, the connector 1600 may be formed by the second PCB 1204, and represent a male connection that receives a female connection from a cable, wire, fiber, etc. that receives the connector 1600. The connector 1600 includes circuit traces 1602 for communicatively coupling the second PCB 1204 to one or more other electronic devices, storage devices, and so forth. In some instances, the connector 1600 may be accessible via the first cover 122. For example, as will be explained herein, the first cover 122 may define a port and the connector 1600 may be accessible via the port. In some instances, the port is located proximate to the bottom 110 of the device 100. In some instances, the connector 1600 may be used to provide updates to the device 100, to download data from the device (e.g., debugging), and so forth.

As shown, the connector 1600 may be located on an end of the second PCB 1204 spaced apart from the first PCB 1202. However, although a certain location of the connector 1600 is shown, the connector 1600 may be located differently than shown.

Figure 17A:
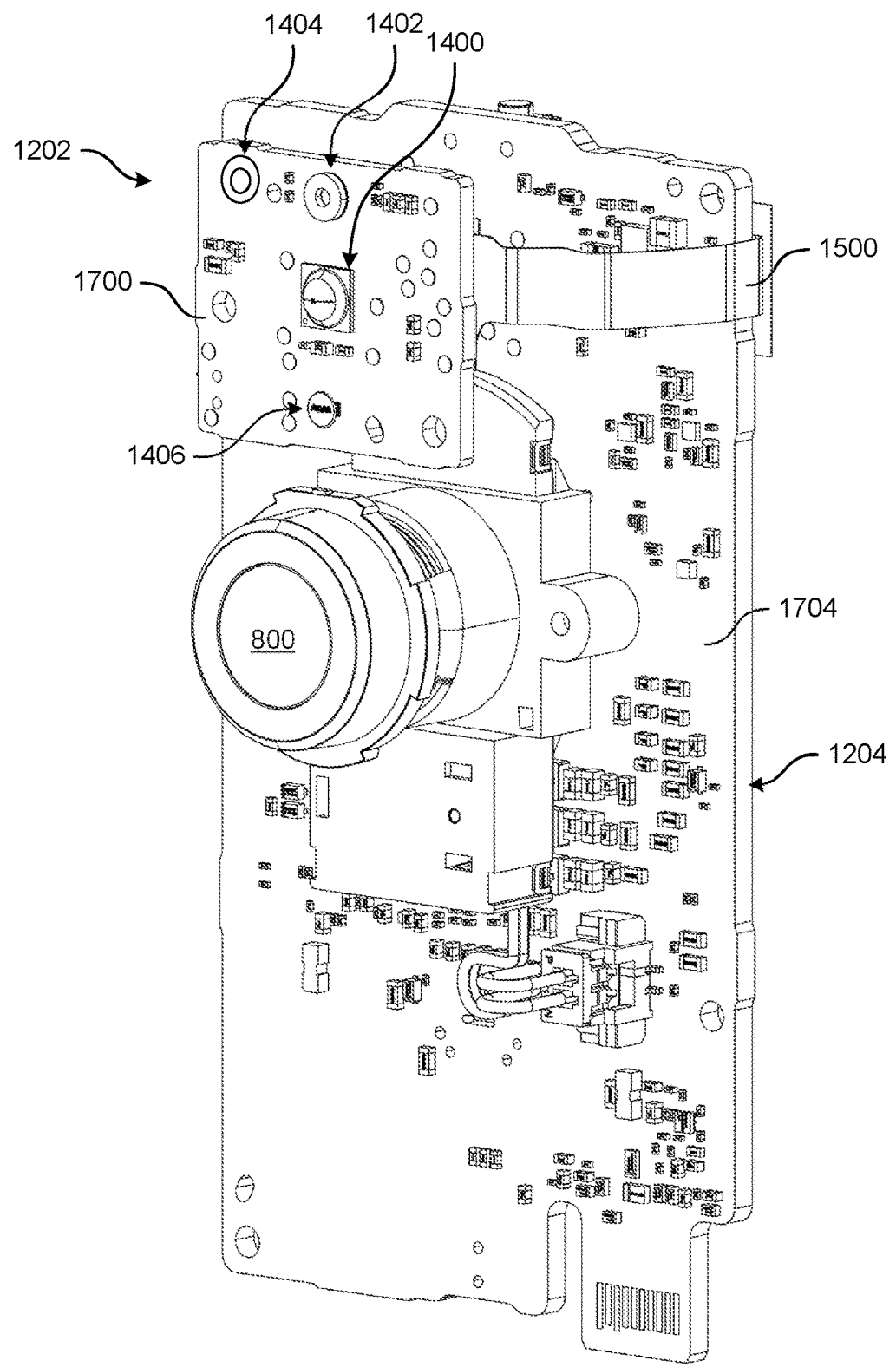
FIGS. 17A and 17B illustrate example components of the device of FIG. 1, according to an example of the present disclosure.
Figure 17B:
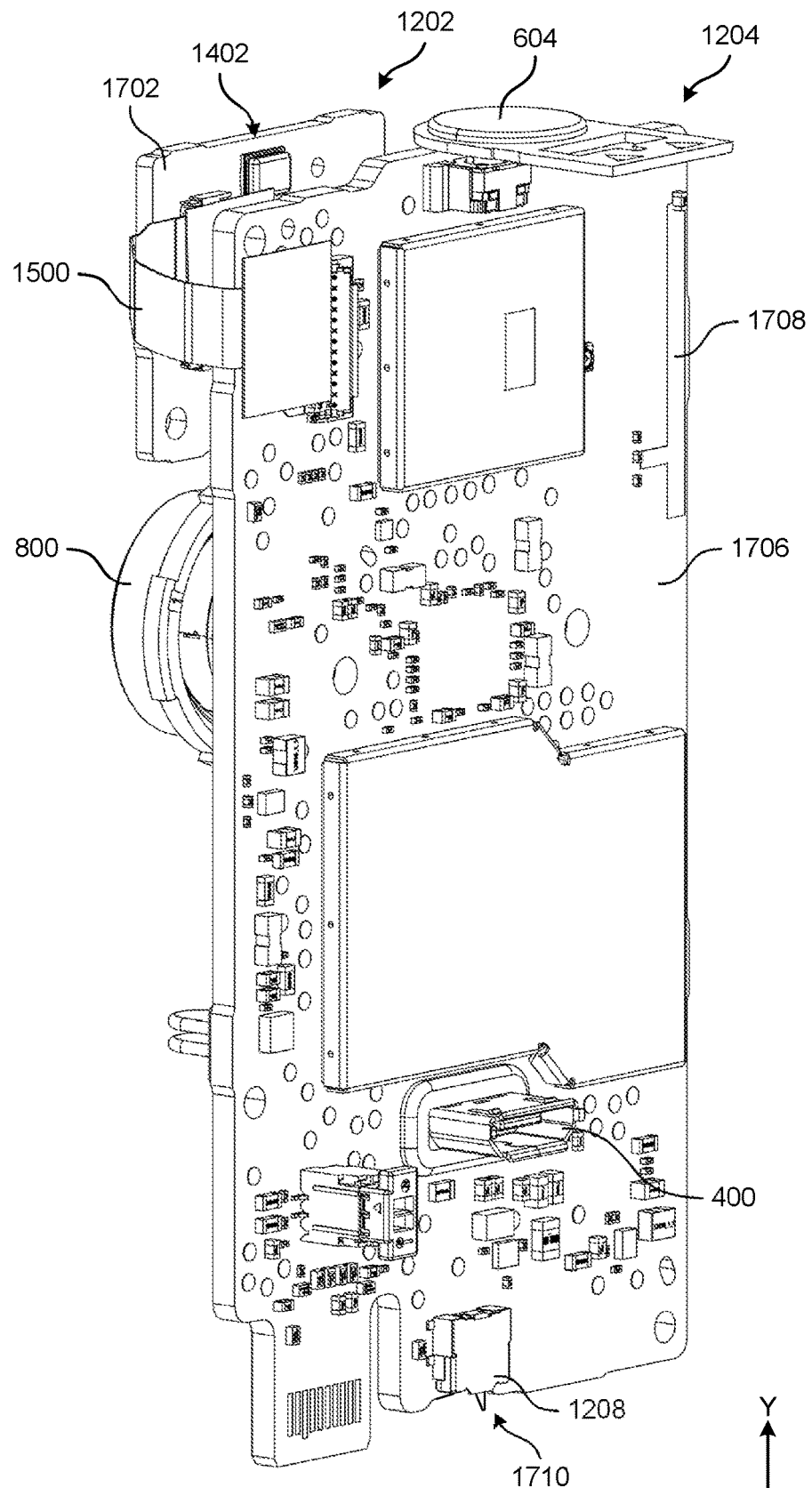

FIGS. 17A and 17B illustrate perspective views of the first PCB 1202 and the second PCB 1204, according to examples of the present disclosure. FIG. 17A illustrates a front perspective view of the first PCB 1202 and the second PCB 1204, while FIG. 17B illustrates a rear perspective view of the first PCB 1202 and the second PCB 1204.

In some instances, the IR lighting element 1400, the lighting element 1406, and/or the ambient light sensor 1404 are disposed on a first side 1700 of the first PCB 1202. The first side 1700 of the first PCB 1202 may be oriented towards the front 116 of the device 100. The microphone 1402, meanwhile, may be disposed on a second side 1702 of the first PCB 1202 that is opposite the first side 1700. The second side 1702 may be oriented towards the back 118, or towards the second PCB 1204. In some instances, the first PCB 1202 defines a channel that directs sound to the microphone 1402 located on the second side 1702. The channel may align with the microphone port 1306.

The camera 800 may be disposed on a first side 1704 of the second PCB 1204, and oriented towards the front 116 of the device 100. The connector 400, the switch 1208, and so forth may be disposed on a second side 1706 of the second PCB 1204. Additionally, the button 604, as well as a frame, biasing members, and so forth thereof, may be disposed on the second side 1706 of the second PCB 1204. In some instances, the second side 1706 of the second PCB 1204 may also include various network interfaces, antennas, power supplies, shielding elements, Wi-Fi module(s)/driver(s), LORA module(s)/driver(s), and so forth. For example, an antenna 1708 may be formed within and/or on the second side 1706. In some instances, a Wi-Fi module or a LORA module may communicatively couple to the antenna 1708. In some instances, the FPC 1500 may be disposed between the second side 1702 of the first PCB 1202 and the second side 1706 of the second PCB 1204.

As will be explained herein, the switch 1208 includes a lever 1710 that is engageable by a rib of the privacy cover 104. The switch 1208 may be mounted to the second PCB 1204 (e.g., on the second side 1706), and the lever 1710 may be moveable between various positions (e.g., about the Z-axis). For example, the rib of the privacy cover 104 may act upon the lever 1710, and in response, the lever 1710 may rotate (e.g., about the Z-axis). Depending upon the rotation of the lever 1710, or the position of the lever 1710, the camera 800 may be activated or deactivated.

Figure 18A:
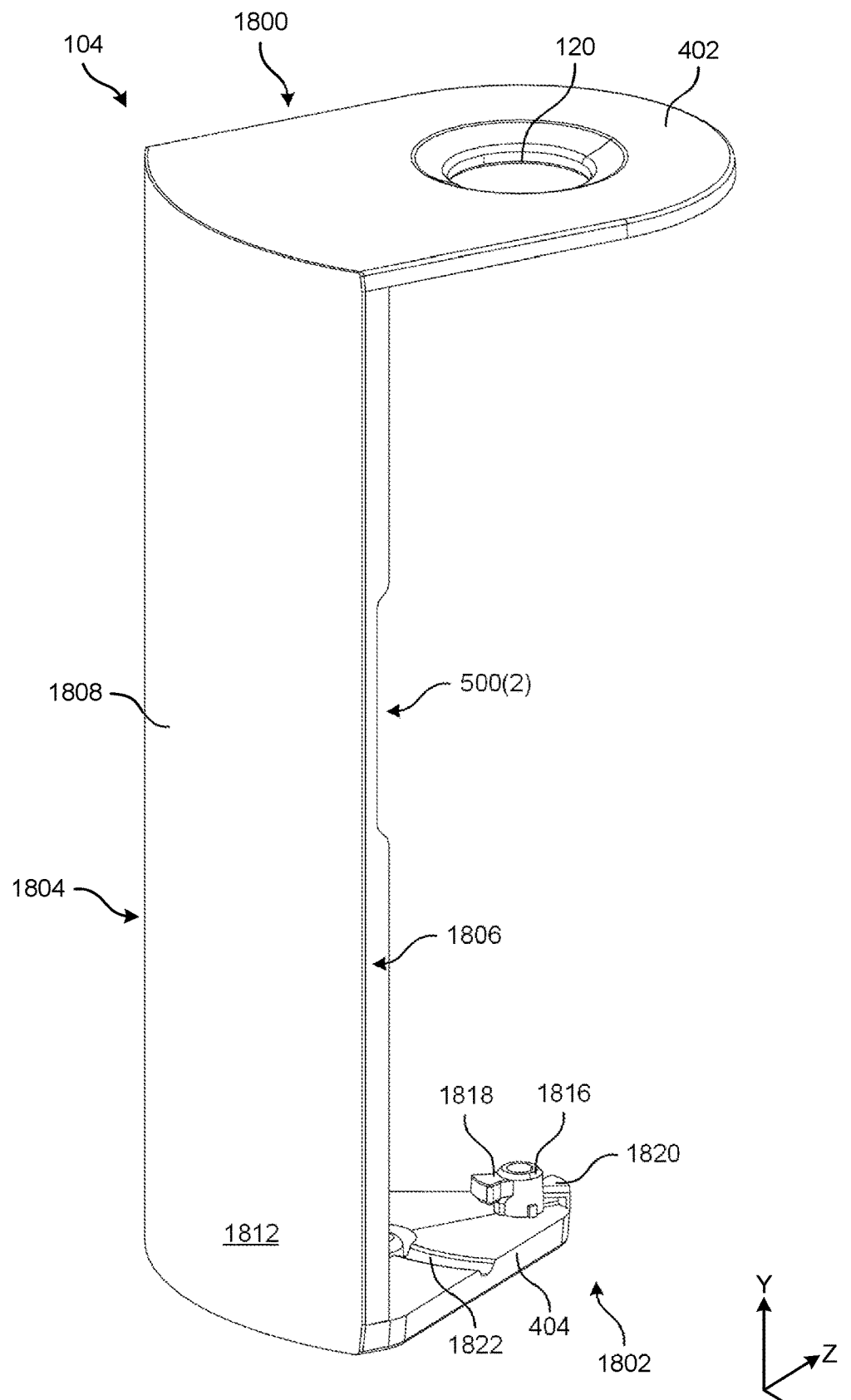
FIGS. 18A-18C illustrate the privacy cover of FIG. 1, according to an example of the present disclosure.
Figure 18B:
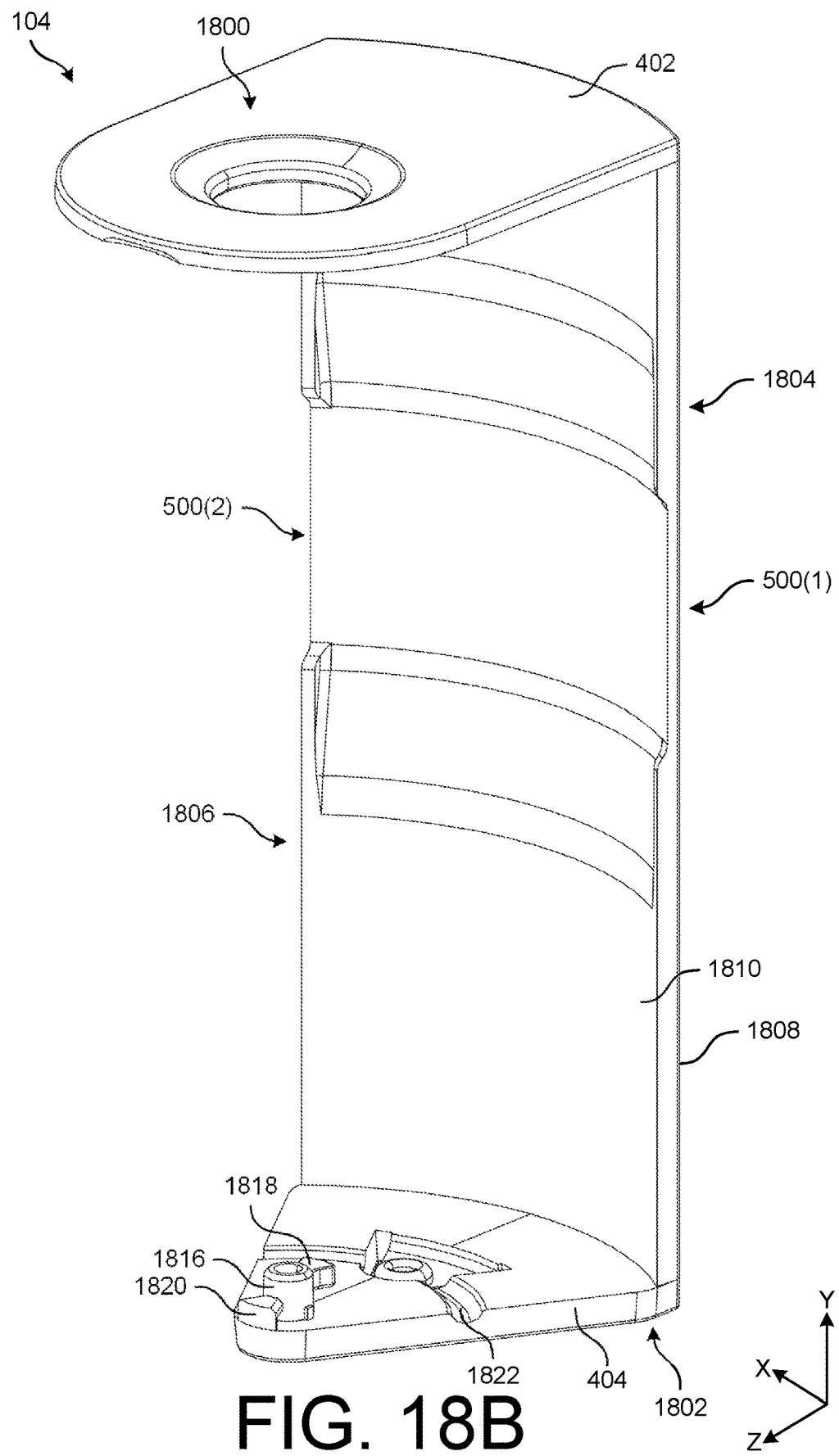
Figure 18C:
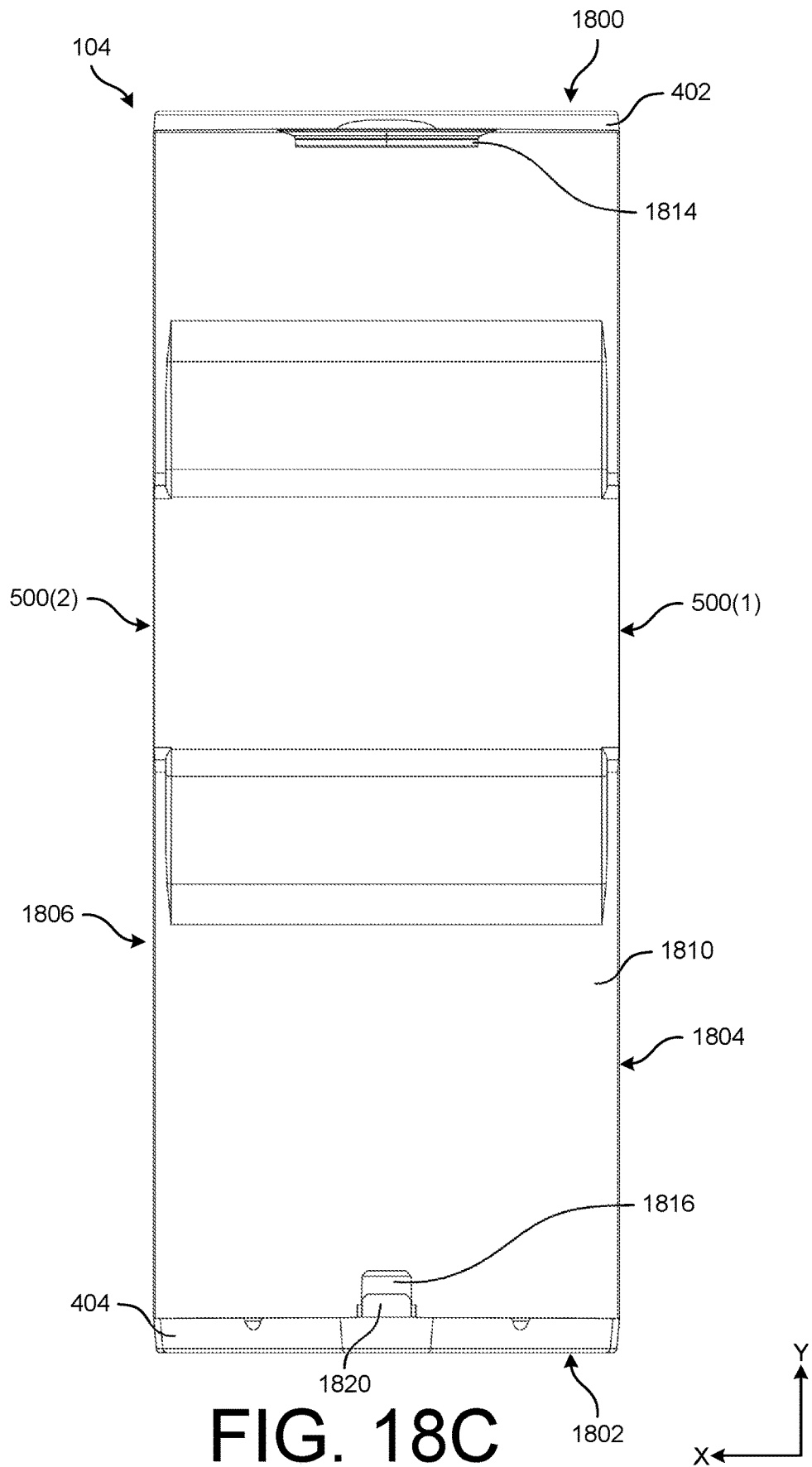
Figure 19A:
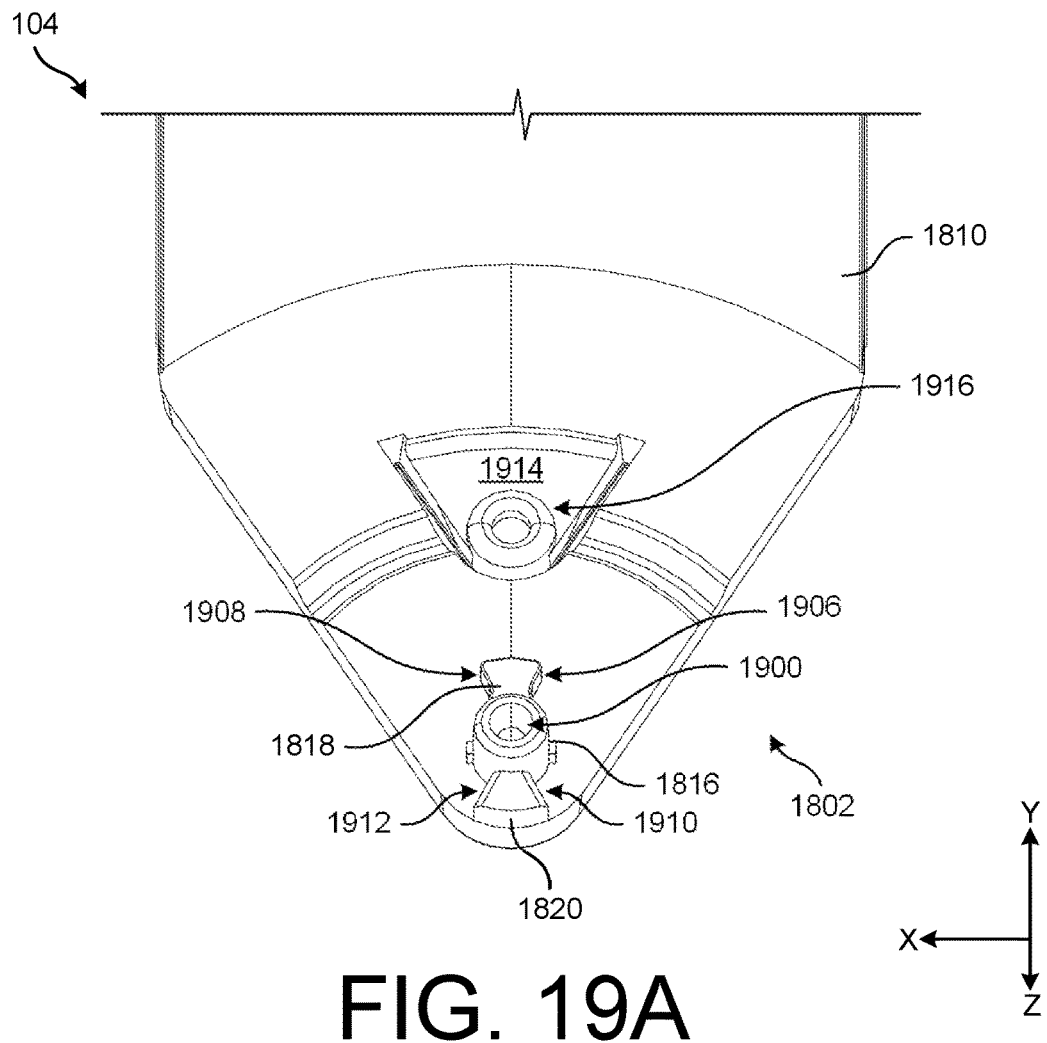
FIGS. 19A-19D illustrate an end of the privacy cover of FIG. 1, showing example features for engaging with the camera housing of FIG. 13, according to an example of the present disclosure.
Figure 19B:
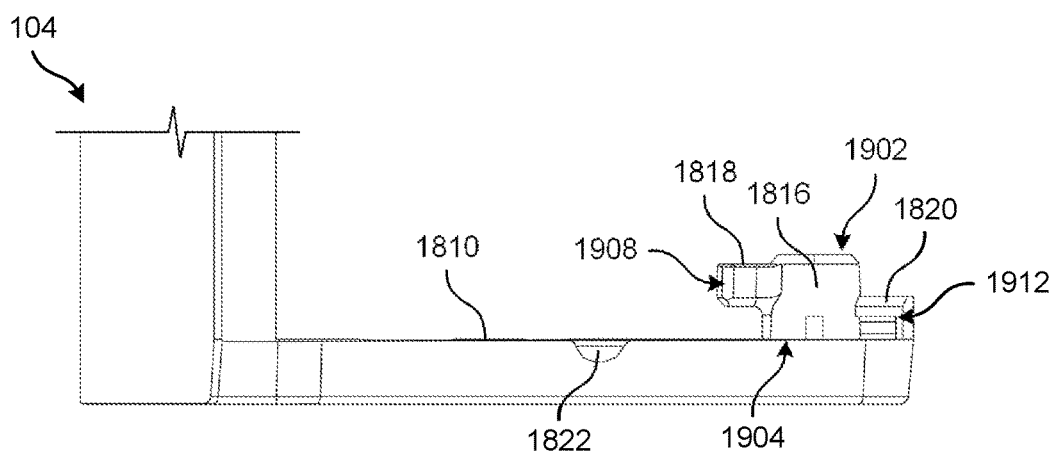
Figure 19C:
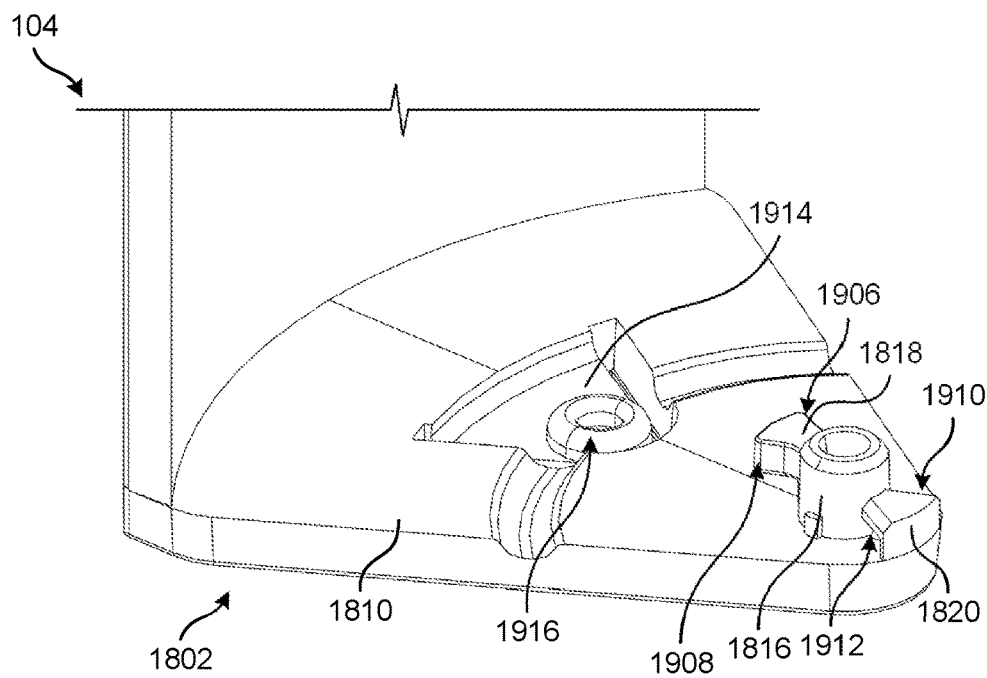
Figure 19D:
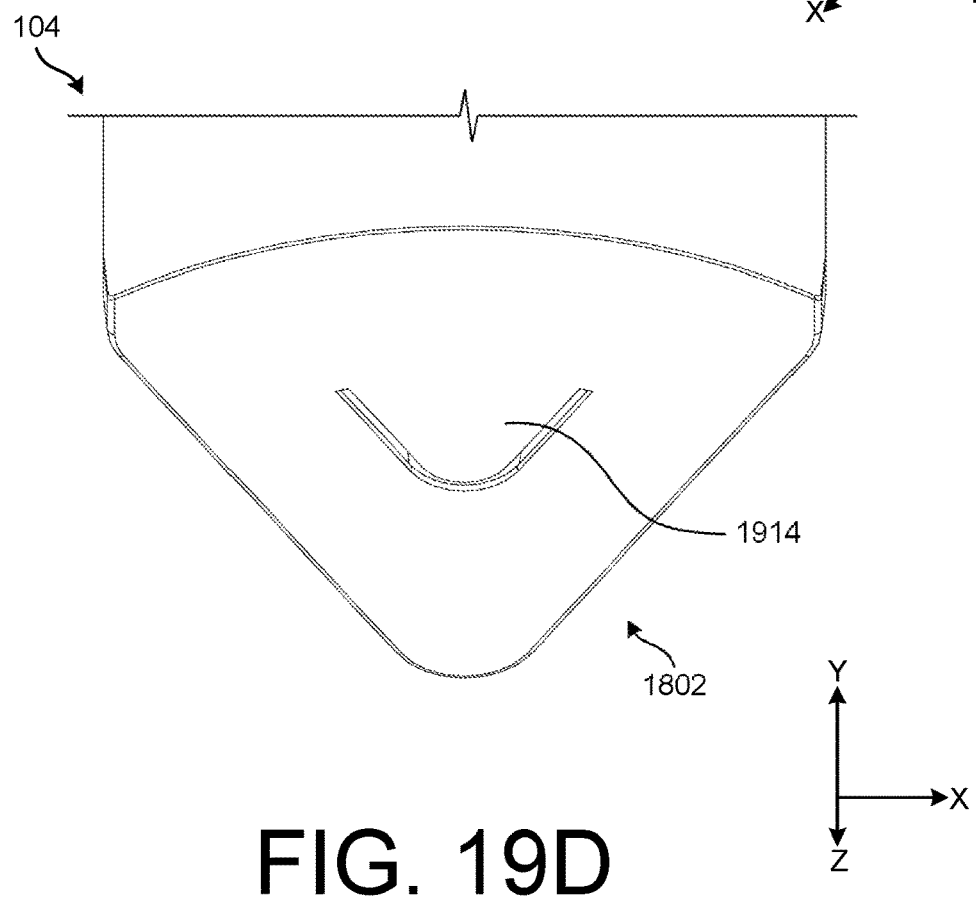

FIGS. 18A-18C illustrate the privacy cover 104, according to examples of the present disclosure. FIG. 18A illustrates a front perspective view of the privacy cover 104, while FIG. 18B illustrates a rear perspective view of the privacy cover 104, and FIG. 18C illustrates a rear planar view of the privacy cover 104.

The privacy cover 104 may include a first end 1800 and a second end 1802 opposite the first end 1800 (e.g., spaced apart in the Y-direction). A height of the privacy cover 104 is disposed between the first end 1800 and the second end 1802. The privacy cover 104 also includes a first side 1804 and a second side 1806 opposite the first side 1804 (e.g., spaced apart in the X-direction). A width of the privacy cover 104 is disposed between the first side 1804 and the second side 1806. The privacy cover 104 also includes an exterior surface 1808 and an interior surface 1810. The exterior surface 1808 may be oriented in a direction away from the device 100, while the interior surface 1810 may be oriented in a direction towards the device 100 (when the privacy cover 104 couples to the device 100).

In some instances, the first arm 402 is located at the first end 1800, and the second arm 404 is located at the second end 1802. A body 1812 of the privacy cover 104 extends between the first end 1800 and the second end 1802. In some instances, the first arm 402 and the second arm 404 extend transverse to the body 1812. The passageway 120 is disposed through the first arm 402 of the privacy cover 104, between the exterior surface 1808 and the interior surface 1810, such that the button 604 may be actuated.

The first end 1800 defines the passageway 120 for providing access to the button 604. The passageway 120 may be disposed through the privacy cover 104 at the first arm 402. Additionally, the privacy cover 104 may include a lip 1814 disposed on the interior surface 1810, and which encircles the passageway 120. The lip 1814 may engage with the second cover 124 for maintaining an alignment of the privacy cover 104 on the camera housing 102.

The second end 1802 may include a protrusion 1816 having a rib 1818 and/or a prong 1820. In some instances, the protrusion 1816, the rib 1818, and/or the prong 1820 represent a single feature (e.g., extrusion) that extends from the interior surface 1810 of the privacy cover 104 at the second end 1802. In some instances, the rib 1818 may extend from the protrusion 1816 on a side that is opposite the prong 1820. The rib 1818 is configured to engage with the lever 1710 of the switch 1208, and the prong 1820 is configured to translate along a surface of the first cover 122 to position the privacy cover 104 at the first position, the second position, and the third position, respectively. The protrusion 1816, meanwhile, may engage with a post of the first cover 122 for aligning or rotatably coupling the privacy cover 104 to the first cover 122 (or more generally, the camera housing 102).

The interior surface 1810 at the second end 1802 may also include an annular groove 1822 that receives a knob (e.g., jut, post, etc.) disposed on the bottom of the camera housing 102. The knob may translate or otherwise traverse within at least a portion of the annular groove 1822 as the privacy cover 104 moves between the first position, the second position, and the third position. In some instances, the engagement between the knob and the annular groove 1822 may maintain an alignment of the privacy cover 104 on the camera housing 102, and/or may create a friction fit that maintains a position of the privacy cover 104 in the first position, the second position, and/or the third position. For example, the knob may include a rubber surface that engages with the annular groove 1822 to prevent unintended movement of the privacy cover 104.

The first cutout 500(1) and the second cutout 500(2) are located along the body 1812, at the first side 1804 and the second side 1806 of the privacy cover 104, respectively. The first cutout 500(1) and the second cutout 500(2) may include a thickness (e.g., in the Z-direction) that is less than that of a remaining portion of the body 1812. These thinned sections of the body 1812 permit the privacy cover 104 to translate over the camera 800, which may extend beyond (e.g., proud of) an exterior surface 602 of the camera housing 102. As such, the first cutout 500(1) and the second cutout 500(2) may be horizontally aligned with the camera 800 to permit such rotation.

FIGS. 19A-19D illustrate various views of the second end 1802 of the privacy cover 104, according to examples of the present disclosure.

The second end 1802 includes the protrusion 1816 having the rib 1818 and the prong 1820. As shown, the protrusion 1816 may extend from the interior surface 1810 of the privacy cover 104, in a direction towards the first end 1800 of the privacy cover 104. In some instances, the protrusion 1816 may be cylindrically shaped, however, other shapes are envisioned. The protrusion 1816 defines a slot 1900 that receives a post defined by the first cover 122, as will be explained herein. The privacy cover 104 may rotate about the engagement between the post of the first cover 122 and the slot 1900.

The rib 1818 may extend from a first side of the protrusion 1816 while the prong 1820 may extend from a second side of the protrusion 1816, opposite to the first side from which the rib 1818 extends. In some instances, the prong 1820 may be engaged with, or adjoined to, the interior surface 1810 of the privacy cover 104 while the rib 1818 may be spaced apart from the interior surface 1810. For example, the protrusion 1816 may include a top end 1902 spaced apart from the interior surface 1810, and a bottom end 1904 at the interior surface 1810. A height of the protrusion 1816 may extend between the top end 1902 and the bottom end 1904. In some instances, the rib 1818 is located closer to the top end 1902 of the protrusion 1816 as compared to the prong 1820. The slot 1900 extends into the protrusion from the top end 1902.

The rib 1818 includes a first surface 1906 located at a first side of the rib 1818, and a second surface 1908 located at a second side of the rib 1818. The first surface 1906 and the second surface 1908 may act on the lever 1710 during a rotation of the privacy cover 104 as well as when the privacy cover 104 is in the first position. For example, in the first position, the first surface 1906 or the second surface 1908 may displace the lever 1710 to a displaced position (e.g., about the Z-axis). In such instances, the lever 1710 may rest against the first surface 1906 or the second surface 1908. For example, a biasing member (e.g., coil spring) may urge the lever 1710 to a drop dead location, or a non-displaced position (e.g., parallel to the Y-axis) when the lever 1710 is not displaced by the rib 1818. However, in the first position of the privacy cover 104, the rib 1818 may prevent the lever 1710 being urged to such location (i.e., the non-displaced position). Instead, the lever 1710 may be urged against the first surface 1906 or the second surface 1908. Comparatively, when the privacy cover 104 rotates, either to the second position or the third position, the lever 1710 may be permitted to the drop dead location (e.g., non-displaced position). In such instances, the first surface 1906 or the second surface 1908 may not displace the lever 1710 (i.e., the lever 1710 may not be displaced by the rib 1818).

Additionally, as will be explained herein, the first cover 122 may define a receptacle within which the protrusion 1816, including the rib 1818 and the prong 1820, are disposed. In some instances, the first surface 1906 and the second surface 1908 may engage with features of the receptacle to prevent rotation of the privacy cover 104 past the second position and the third position. For example, in the second position of the privacy cover 104, the first surface 1906 may engage with a feature of the receptacle to prevent the privacy cover 104 being rotated further past the second position (e.g., in the clockwise direction). Likewise, in the third position of the privacy cover 104, the second surface 1908 may engage with a feature of the receptacle to prevent the privacy cover 104 being rotated further past the third position (e.g., in the counterclockwise direction).

As will also be explained herein, the prong 1820 may include an upper surface that engages with a contoured surface of the receptacle. The engagement between the prong 1820 and the contoured surface may secure the privacy cover 104 in the first position, the second position, and the third position, respectively. For example, the prong 1820, or the upper surface, may translate along, over, or about the contoured surface during rotation of the privacy cover 104. In some instances, the contoured surface within the receptacle includes different contours to secure the privacy cover 104 in the first position, the second position, and the third position, respectively. In this sense, the engagement between the prong 1820 and the contoured surface may lock the privacy cover 104 in the first position, the second position, and the third position, however, upon application of a certain amount of force, the privacy cover 104 may be rotated to another of the first position, the second position, or the third position.

More particularly, the prong 1820 may include a first edge 1910 and a second edge 1912 spaced apart from the first edge 1910. When in the first position, the prong 1820 may reside within a furrow of the receptacle, and the first edge 1910 and the second edge 1912 may engage with sides of the furrow. Such engagement may secure the privacy cover 104 in the first position until a sufficient amount of force is applied to rotate the prong 1820 out of the furrow. In such instances, depending upon the rotational direction of the privacy cover, the first edge 1910 and the second edge 1912 may be driven out of the sidewalls of the furrow.

The annular groove 1822 extends between sides of the privacy cover 104, and is configured to receive a knob disposed on the camera housing 102. Additionally, the second end 1802 of the privacy cover 104 may include a tab 1914 having a pocket 1916. The pocket 1916 may receive the knob when the privacy cover 104 is in the first position. Otherwise, when the privacy cover 104 is in the second position or the third position, the knob may be disposed externally to the pocket 1916. The knob may therefore be urged out of the pocket 1916 during rotation of the privacy cover 104. However, when the privacy cover 104 is in the first position, the engagement between the knob and the pocket 1916 may secure the privacy cover 104 in the first position until the knob is rotated out of the pocket 1916. In such instances, the tab 1914 may permit such deflection of the pocket 208.

Figure 20:
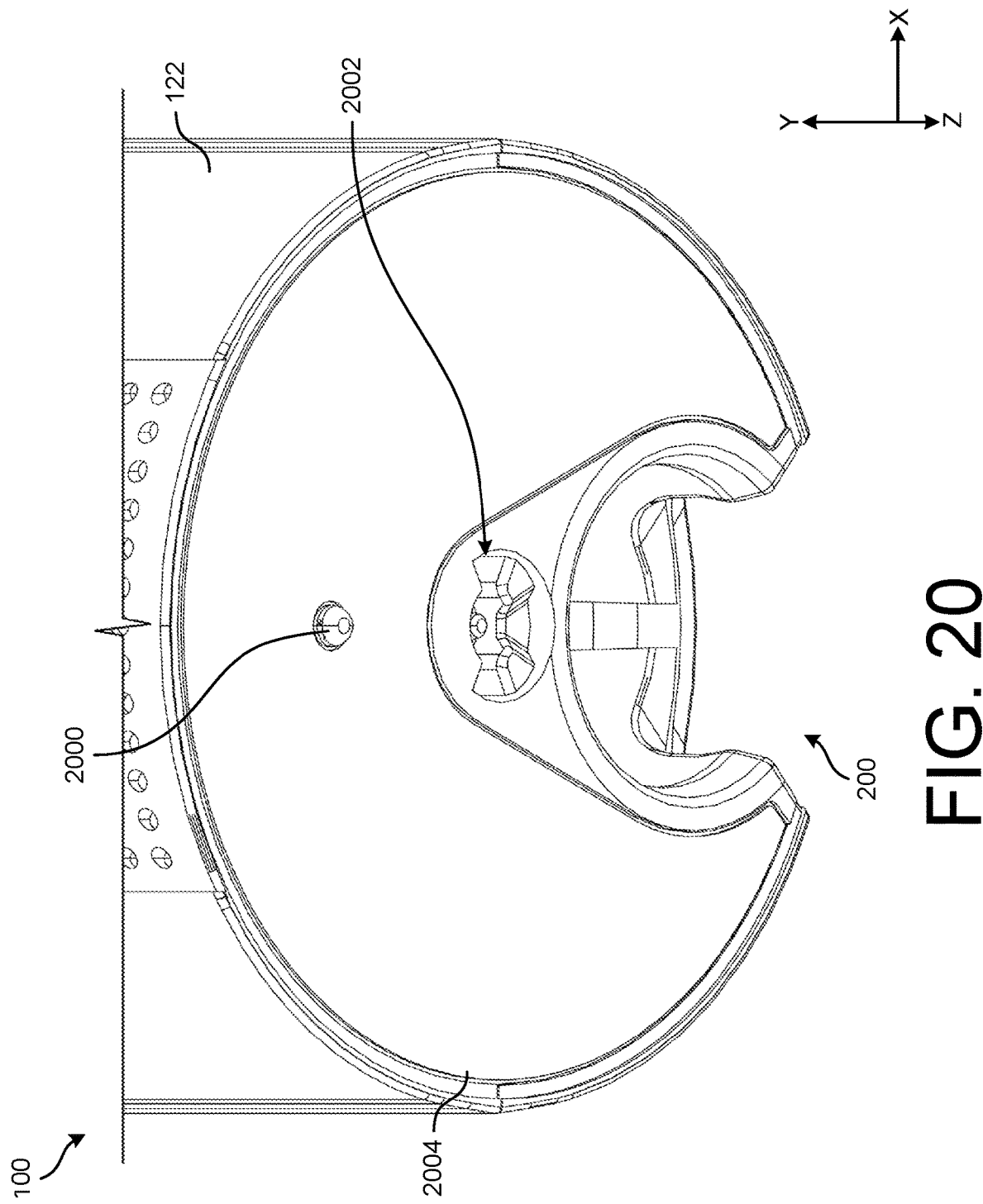
FIG. 20 illustrates a bottom view of the camera housing of FIG. 13, according to an example of the present disclosure.

FIG. 20 illustrates a bottom view of the camera housing 102, showing the privacy cover 104 removed, according to examples of the present disclosure. The camera housing 102 includes a knob 2000 that is sized and configured to reside within the pocket 1916 and the annular groove 1822. The knob 2000 may extend past (e.g., proud of) a bottom surface of the camera housing 102 for engaging with the annular groove 1822. For example, in the first position of the privacy cover 104, the knob 2000 may reside within the pocket 1916 disposed on the tab 1914. However, during rotation of the privacy cover 104 to the second position or the third position, the knob 2000 may be displaced out of the pocket 1916 and into the annular groove 1822. In some instances, the knob 2000 includes a rubber material for creating a friction or resistant fit between the knob 2000, the pocket 1916, and the annular groove 1822, respectively. Such fit may prevent the privacy cover 104 unintentionally rotating. In some instances, the knob 2000 is disposed on the first cover 122 of the camera housing 102.

The camera housing 102 defines the socket 200 that receives the ball 202 of the stand 106. The socket 200 may be open at the bottom 110 of the device (or the camera housing 102), as well as at the back 118 of the device 100 (or the camera housing 102) in order to permit the stand 106 to rotate between positions for disposing the device 100 on a vertical surface or horizontal surface.

Additionally, the camera housing 102, or the first cover 122, defines a receptacle 2002. The receptacle 2002 may receive the protrusion 1816, the rib 1818, and the prong 1820 of the privacy cover 104. The receptacle 2002 may be located between the knob 2000 and the socket 200. In some instances, the receptacle 2002 is centrally located on the camera housing 102. Details of the receptacle 2002 are discussed herein, however, the protrusion 1816 (including the rib 1818 and the prong 1820) are insertable into the receptacle 2002 such that the rib 1818 may engage with the lever 1710 and the prong 1820 (or the upper surface) may engage with the contoured surface.

The bottom of the camera housing 102 may also include a cap 2004 that is disposed over a port for accessing the connector 1600. The cap 2004, in some instances, may couple to the first cover 122 via adhesives, snap-fits, fasteners, and the like. However, the cap 2004 is capable of being removed to access the connector 1600. In some instances, the cap 2004 may be multiple pieces, or segments, where one may provide access to the connector 1600 and another may remain coupled to the camera housing 102. In some instances, the cap 2004 may be coupled to the camera housing 102 via adhesives, snap-fit, compression-fit, and so forth.

Figure 21:
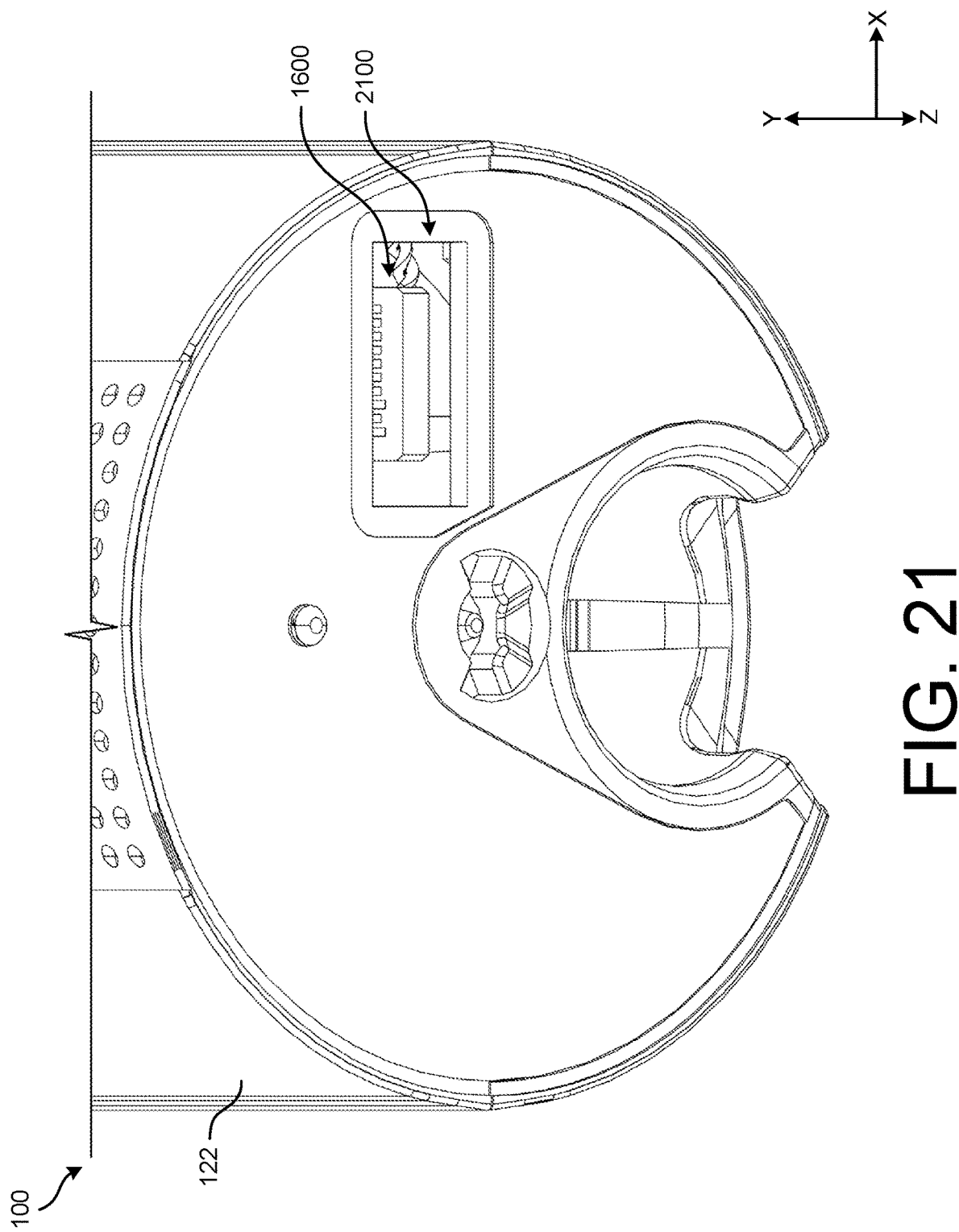
FIG. 21 illustrates a bottom view of the camera housing of FIG. 13, showing an example port for communicatively coupling to example components disposed within the camera housing, according to an example of the present disclosure.

FIG. 21 illustrates the cap 2004 of the camera housing 102 removed to illustrate the connector 1600, according to examples of the present disclosure. For example, the first cover 122 may define a port 2100 that is accessible via removing the cap 2004. The port 2100 provides access to the connector 1600, for example, such that a cable (e.g., with a female end) may communicatively couple to the second PCB 1204 (or more generally, the device 100). As such, the cable may be inserted at least partially into or through the port 2100 for coupling to the connector 1600.

Figure 22:
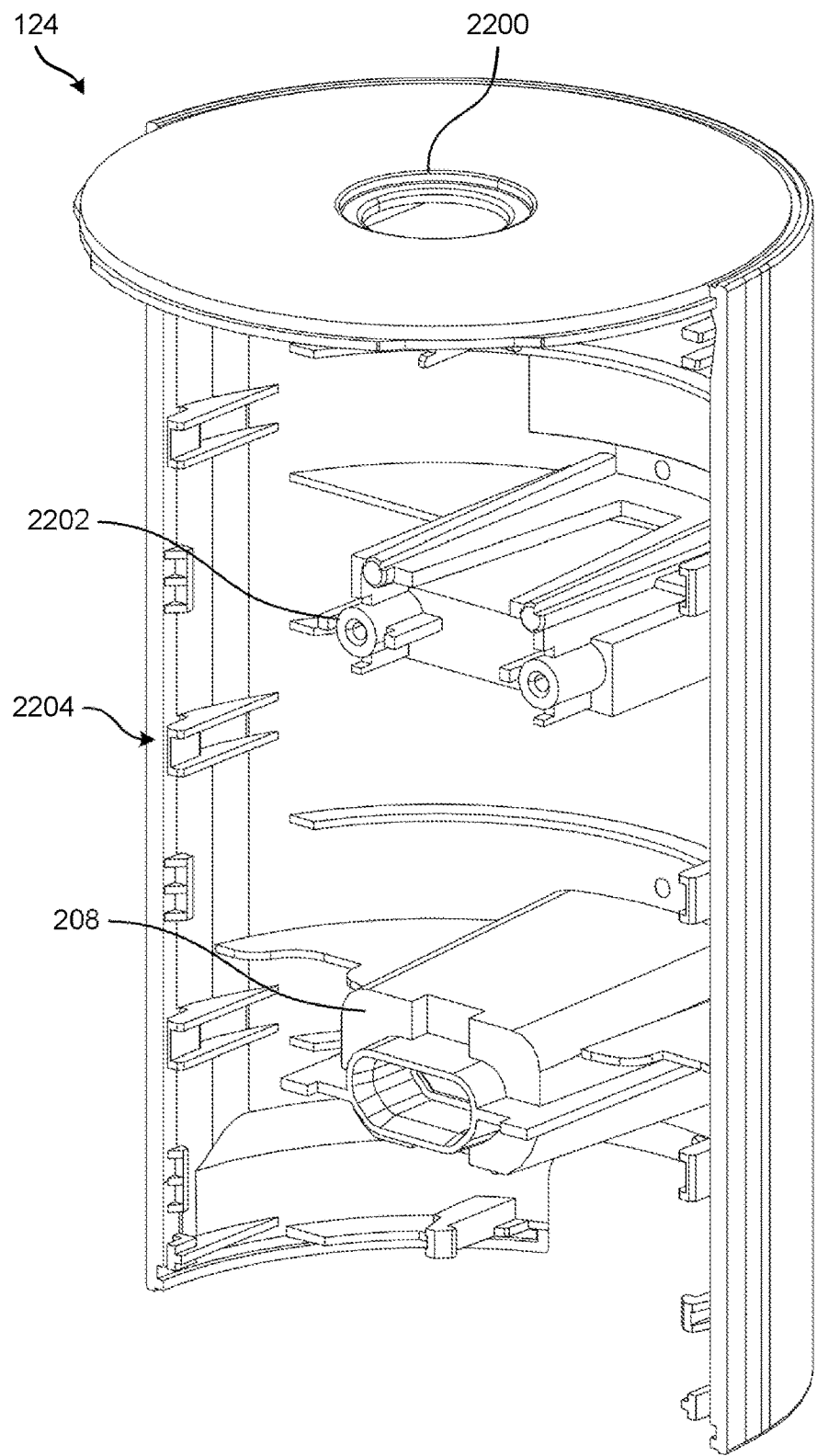
FIG. 22 illustrates an example cover of the device of FIG. 1, according to an example of the present disclosure.

FIG. 22 illustrates the second cover 124 of the camera housing 102, according to examples of the present disclosure. The second cover 124 may define a passageway 2200 that aligns with the passageway 120 of the privacy cover 104 such that the button 604 may be actuatable. In some instances, the lip 1814 of the privacy cover 104 is engageable within the passageway 2200 to secure the privacy cover 104 to the camera housing 102. For example, the lip 1814 may be rotatable within the passageway 2200 during rotation of the privacy cover 104.

The second cover 124 may include various posts, columns, and the like to which components of the device 100 couple. For example, the first PCB 1202 and/or the second PCB 1204 may couple to posts 2202 of the second cover 124. The second cover 124 may also define the pocket 208 in which the connector 400 is accessible. The second cover 124 may also include alignment tabs that engage with corresponding features of the first cover 122 in order to align the first cover 122 and the second cover 124. Additionally, the second cover 124 may include attachment mechanisms 2204 (e.g., keyways, slots, tabs, projections, slits, etc.) that couple the first cover 122 and the second cover 124 together.

Figure 23A:
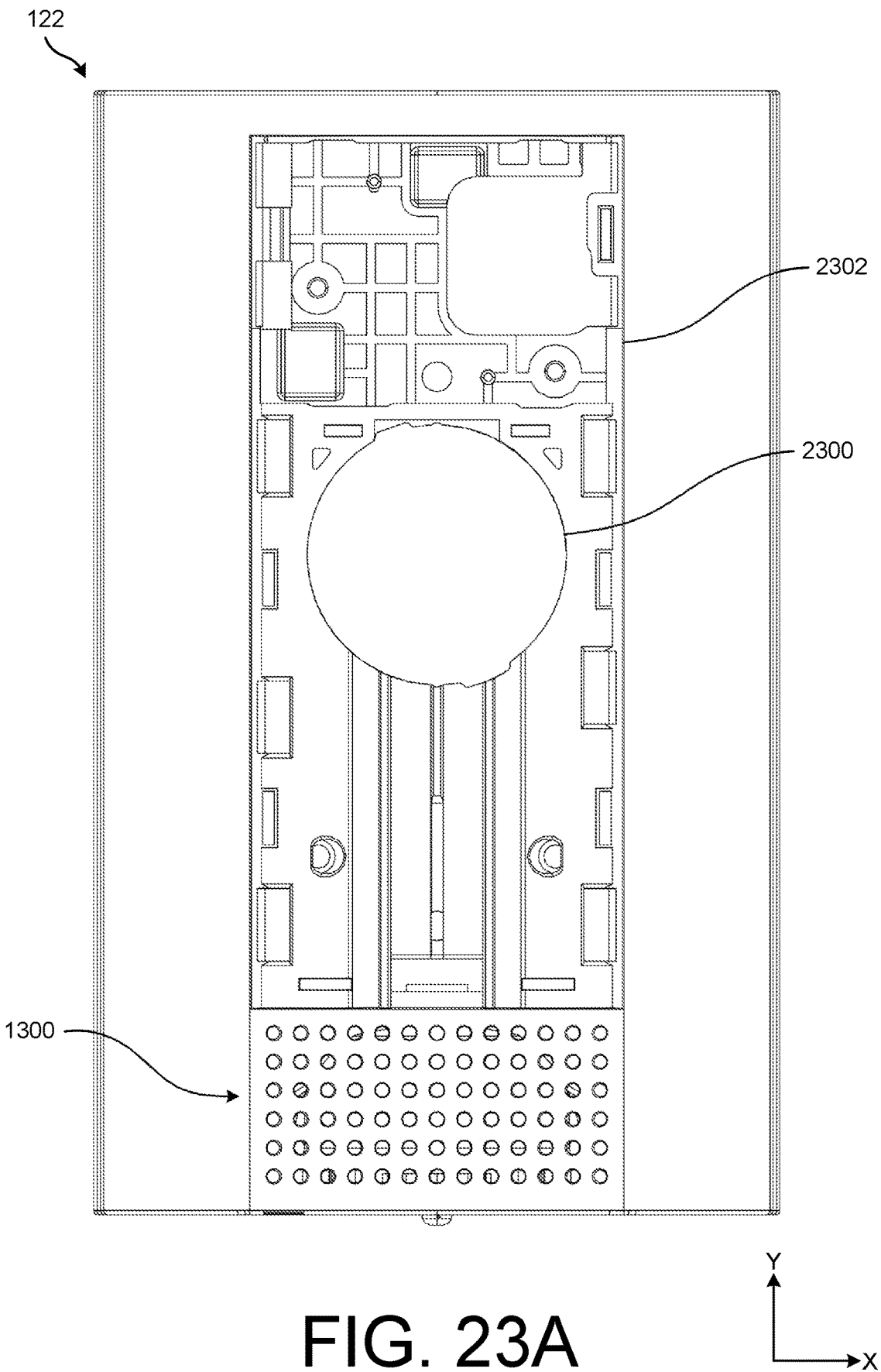
FIGS. 23A-23C illustrate an example cover of the device of FIG. 1, according to an example of the present disclosure.
Figure 23B:
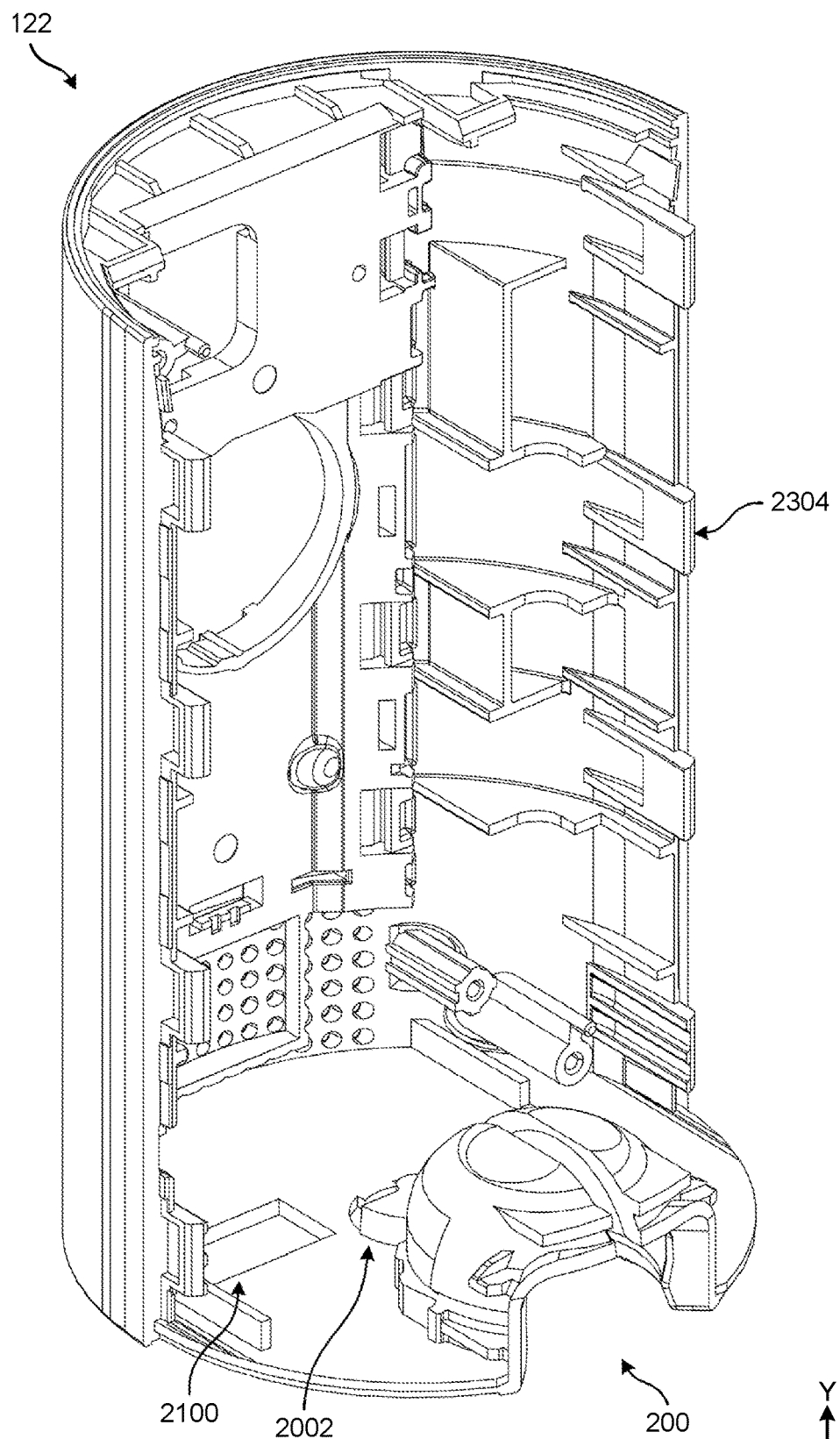
Figure 23C:
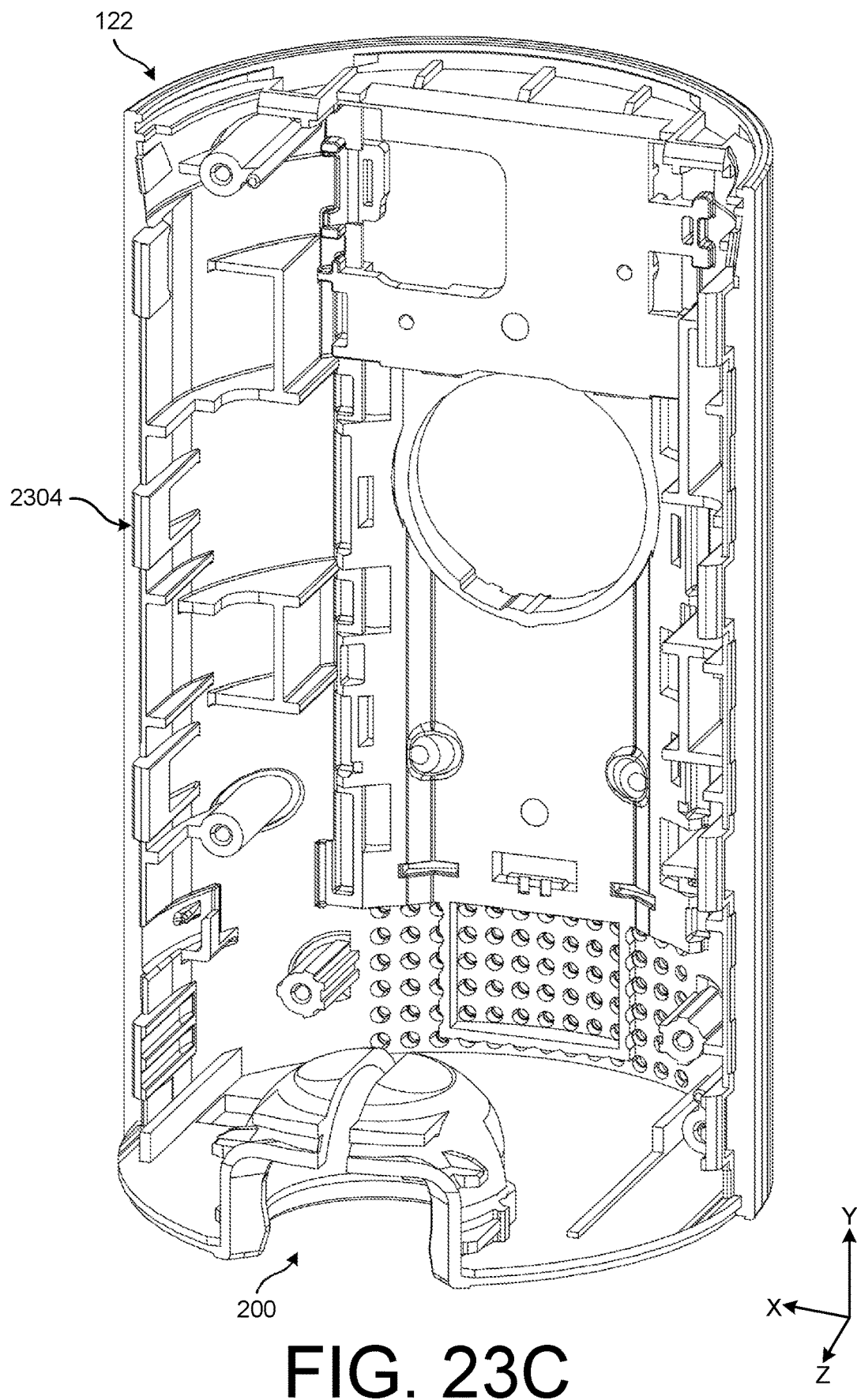
Figure 24A:
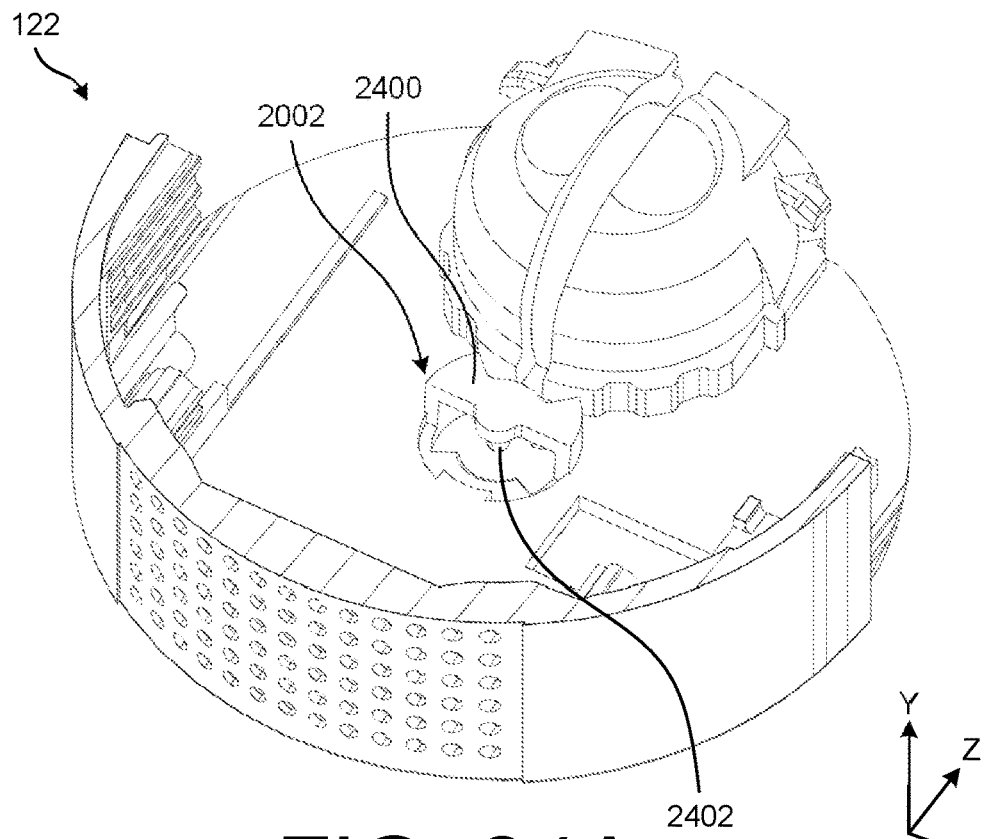
FIGS. 24A-24E illustrate an example receptacle of the cover of FIGS. 23A-23C for receiving the privacy cover of FIG. 1, according to an example of the present disclosure.
Figure 24B:
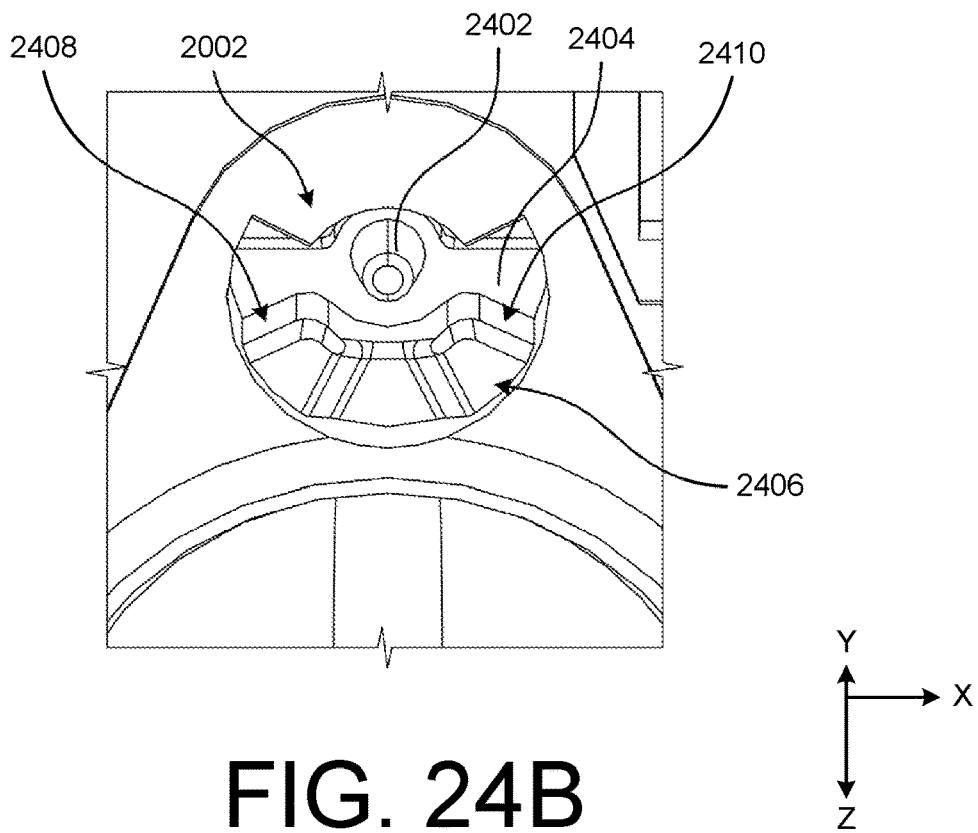
Figure 24C:
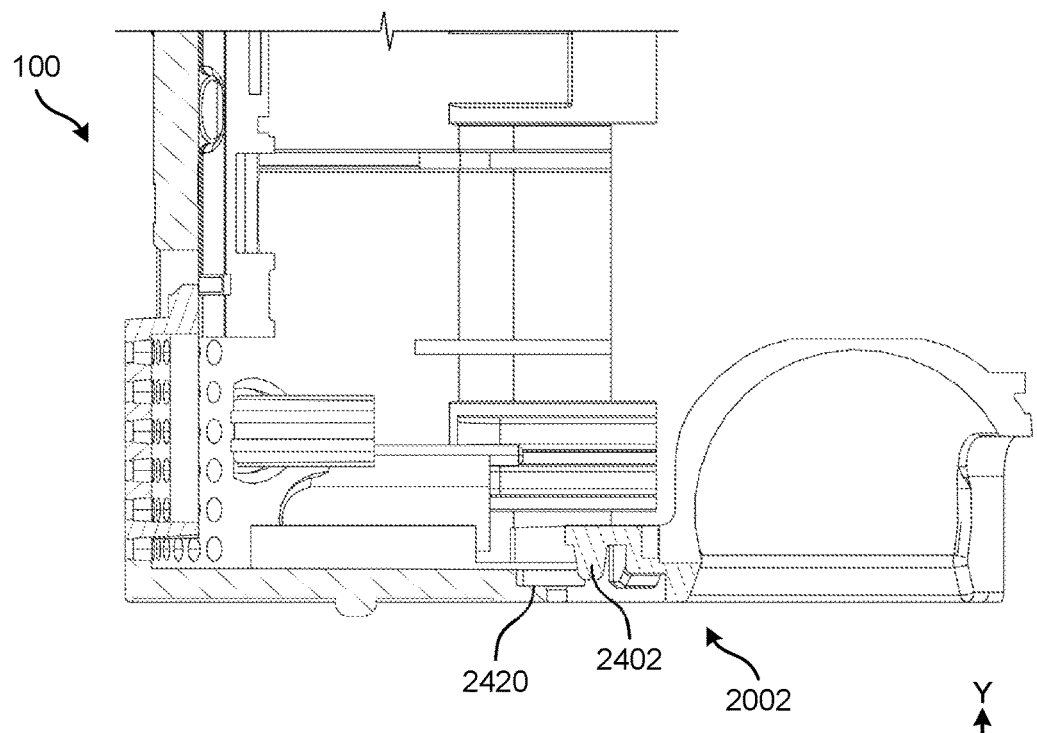
Figure 24D:
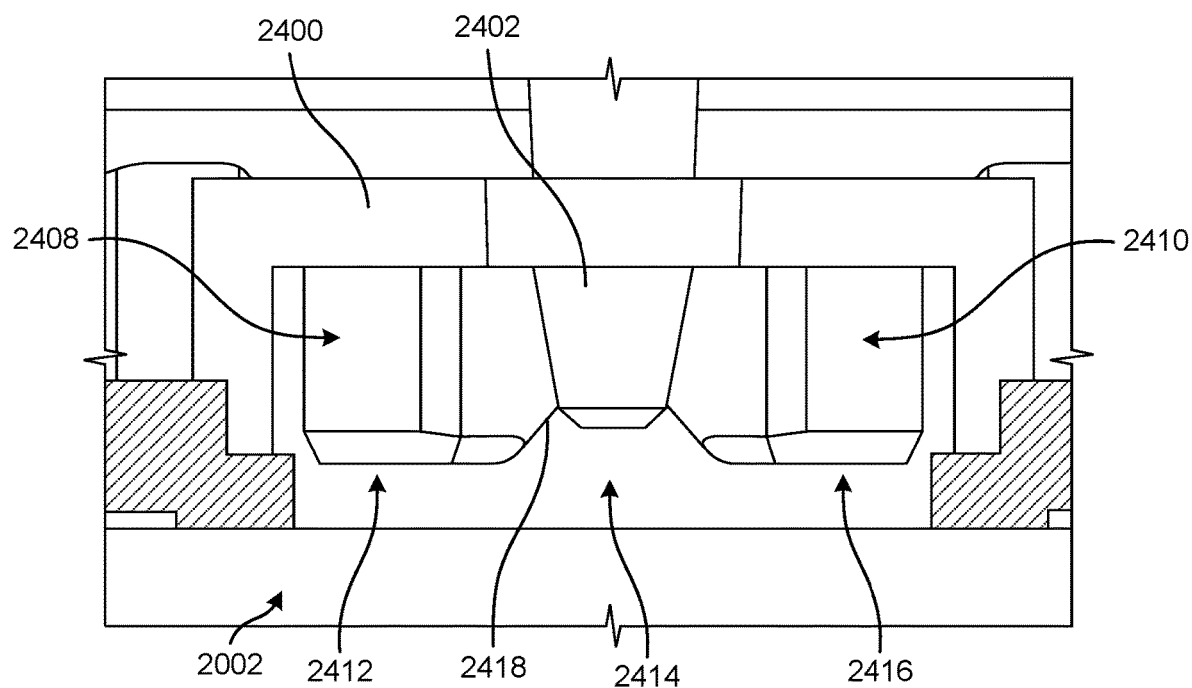
Figure 24E:
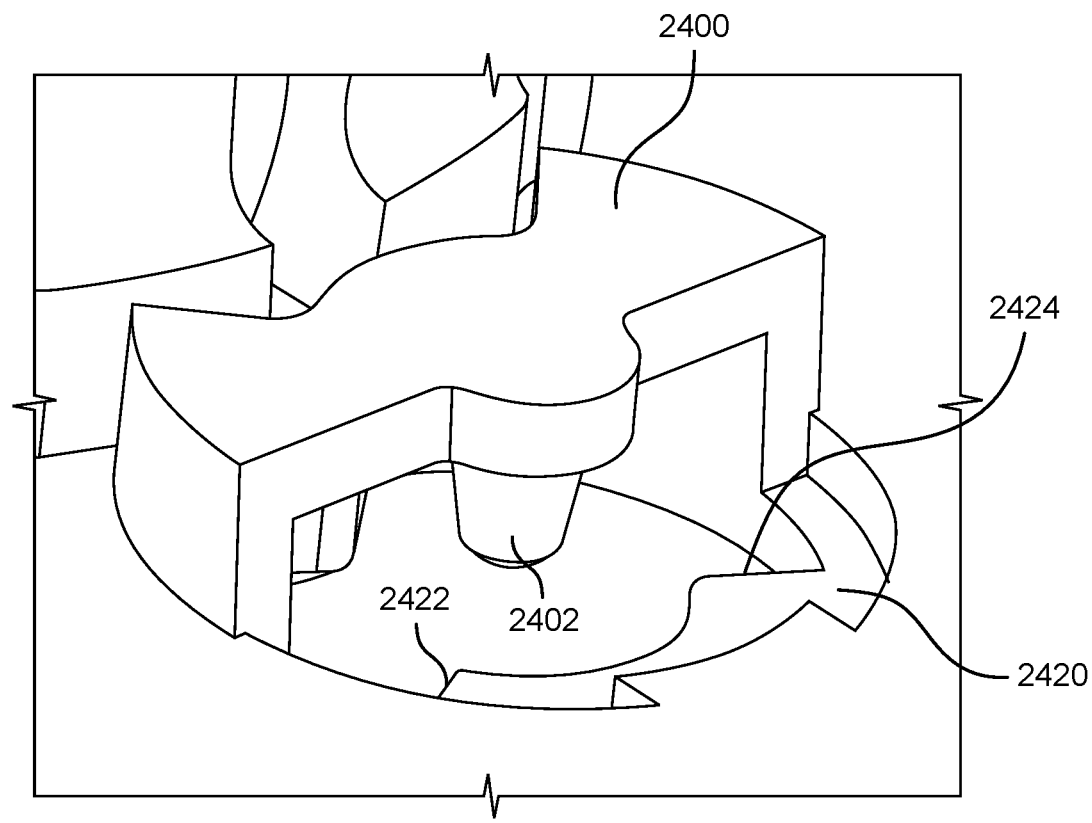
Figure 25A:
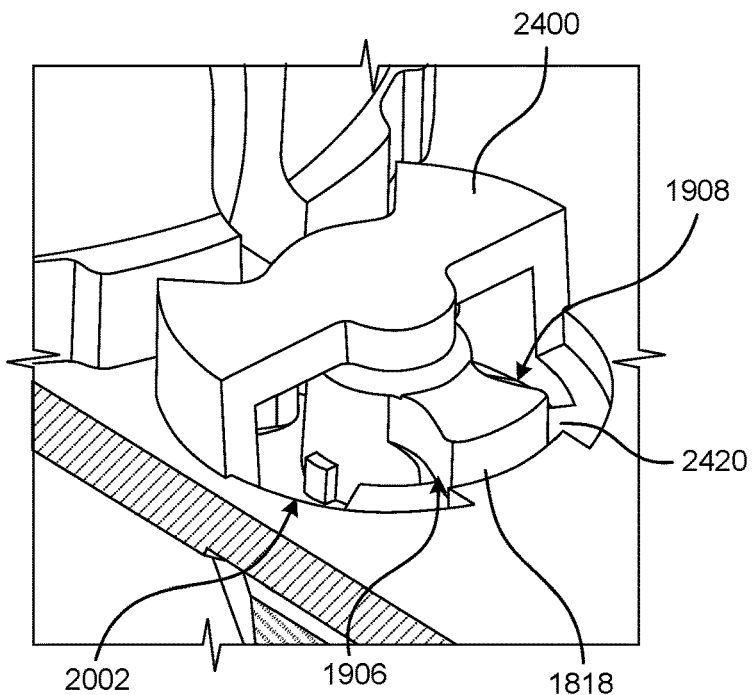
Figure 25B:
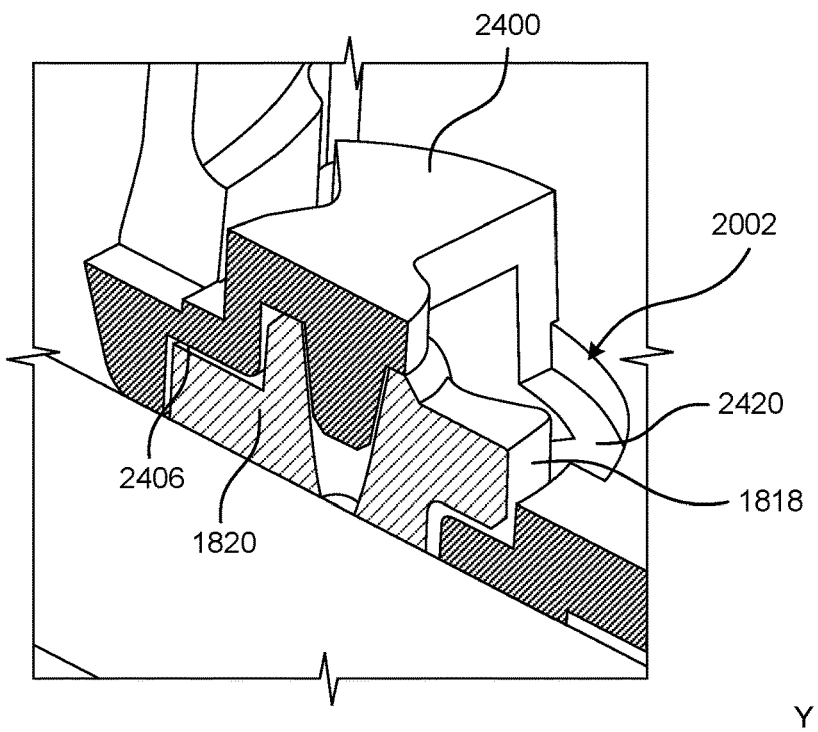
Figure 25C:
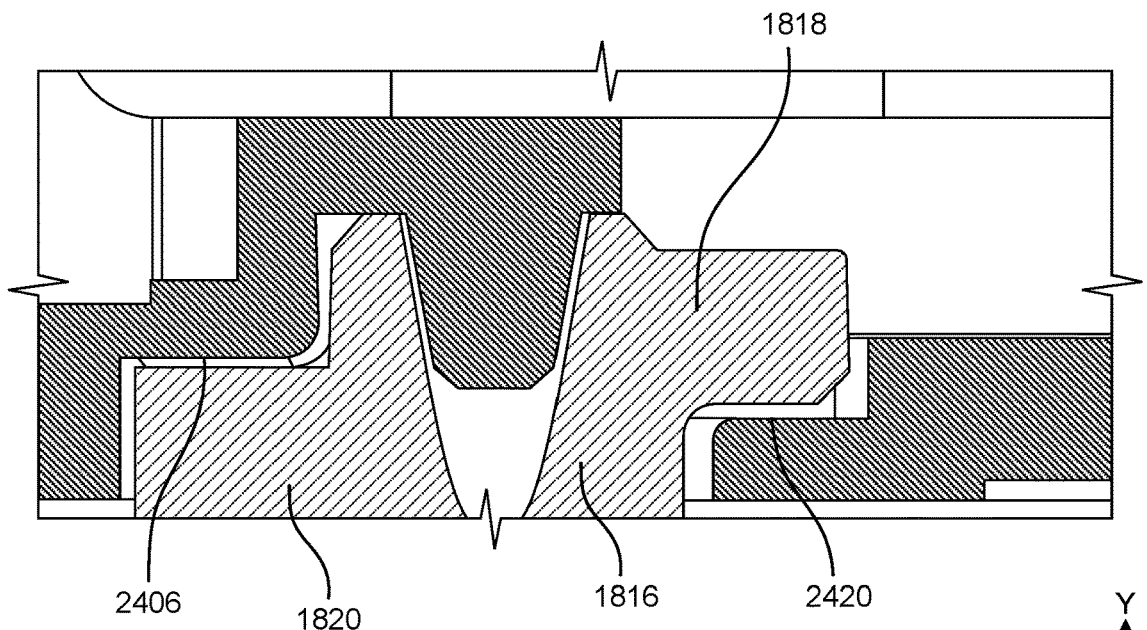
Figure 25D:
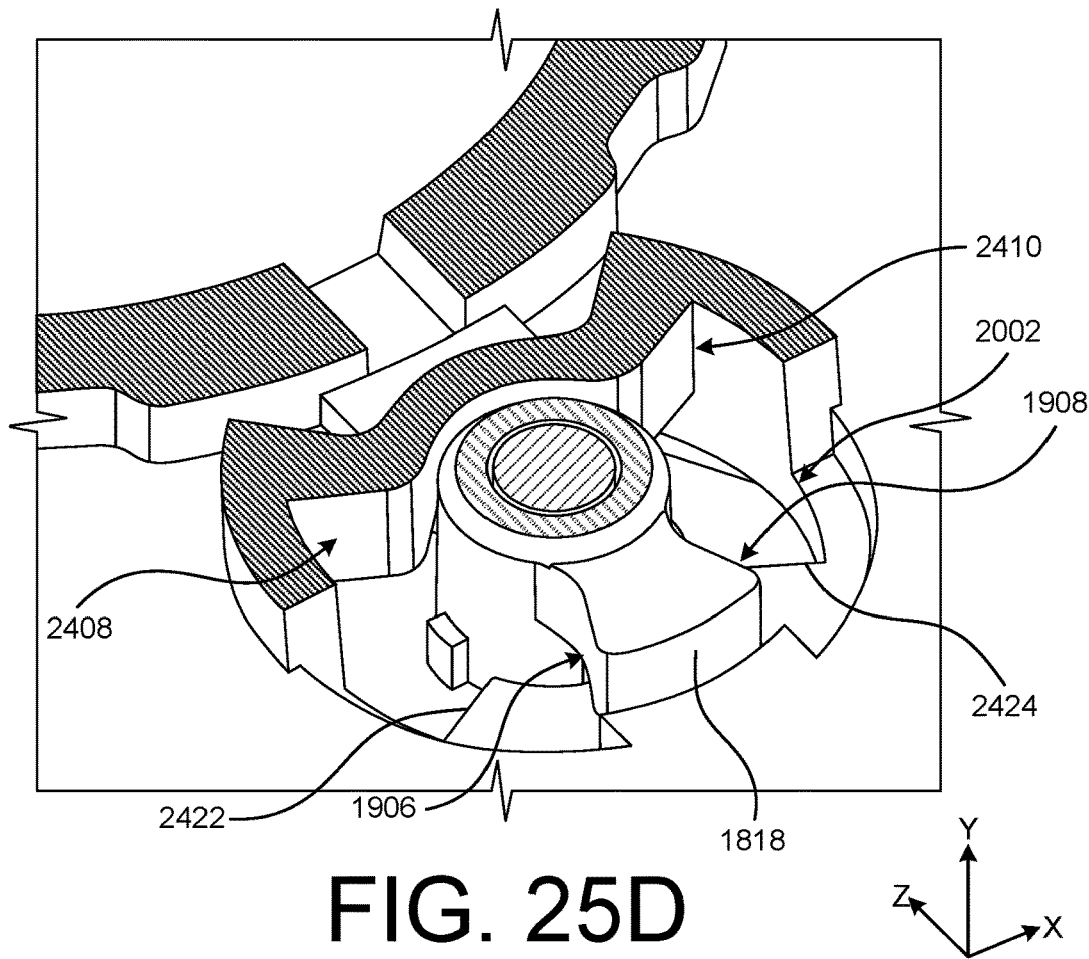

FIGS. 23A-23C illustrate the first cover 122, according to examples of the present disclosure. FIG. 23A illustrates a front view of the first cover 122, FIG. 23B illustrates a first rear perspective view of the first cover 122, and FIG. 23C illustrates a second rear perspective view of the first cover 122.

The first cover 122 defines the orifices 1300 through which sound is output by the speaker 1206. Additionally, the first cover 122 may define an opening 2300 through which at least a portion of the camera 800 is disposed. The first cover 122 may also define an aperture 2302 that represents a cutout within which the first window 1302 and/or the second window 1304 are received. For example, the aperture 2302 may include a depth that substantially corresponds to a thickness of the first window 1302 and the second window 1304. Once the first window 1302 and the second window 1304 couple to the first cover 122, the first window 1302 and the second window 1304 may respectively align with an exterior surface of the first cover 122. The first cover 122 may also define various keyways, slots, etc. for receiving the first window 1302 and the second window 1304, or for otherwise aligning or coupling the first window 1302 and the second window 1304 to the first cover 122.

The first cover 122 includes the socket 200 for receiving the ball 202 of the stand 106, as well as the port 2100 such that the connector 1600 may be accessible. In addition, the first cover 122 may include attachment mechanisms 2304 (e.g., keyways, slots, tabs, projections, slits, etc.) that engage with the attachment mechanisms 2204 of the second cover 124 in order to couple the first cover 122 and the second cover 124 together. By way of example, the attachment mechanisms 2304 may include a keyway, and the attachment mechanism 2204 may include a hook or a tab that is configured to engage with the keyway when the first cover 122 and the second cover 124 are snapped together, for example. The first cover 122 further defines the receptacle 2002, which is discussed in detail herein in FIGS. 24A-24E.

The first cover 122 may include various posts, columns, and the like to which components of the device 100 couple. For example, the speaker 1206 and/or the first PCB 1202 may couple to features of the first cover 122.

FIGS. 24A-24E illustrate details of the receptacle 2002, according to examples of the present disclosure.

The receptacle 2002 includes an opening such that the protrusion 1816 of the privacy cover 104 may be insertable into the receptacle 2002. In some instances, the receptacle 2002 defines a cover 2400 having a post 2402. The post 2402 may extend from an interior surface 2404 of the cover 2400 and may be insertable into the slot 1900 of the protrusion 1816. When the privacy cover 104 is rotated, the protrusion 1816 may rotate about the post 2402.

The interior surface 2404 of the cover 2400 may also define a contoured surface 2406. The contoured surface 2406 may extend between a first side 2408 and a second side 2410, and may be engaged by the upper surface of the prong 1820. The contoured surface 2406 may include a first section 2412 disposed adjacent to the first side 2408, a second section 2414, and a third section 2416 disposed adjacent to the second side 2410. The second section 2414 may be disposed between the first section 2412 and the third section 2416. As shown, the first section 2412 and the third section 2416 may be planar with one another, while the second section 2414 may include a cutout, groove, or furrow 2418. The furrow 2418 is configured to receive the prong 1820 in the first position of the privacy cover 104. In such instances, the first edge 1910 and the second edge 1912 of the prong 1820 may reside within the furrow 2418 to secure the privacy cover 104 in the first position. However, upon application of a sufficient amount of force, the prong 1820 may be driven out of the furrow 2418 such that the privacy cover 104 may rotate to the second position or the third position, respectively. Moreover, in some instances, the contoured surface 2406 may reside beneath, or within, the cover 2400.

As the privacy cover 104 rotates to the second position, for example, the first surface 1906 of the rib 1818 may engage with the first side 2408 of the contoured surface 2406 to prevent the privacy cover 104 being rotated further past the second position (e.g., in the clockwise direction). Likewise, in the third position of the privacy cover 104, the second surface 1908 of the rib 1818 may engage with the second side 2410 of the contoured surface 2406 to prevent the privacy cover 104 being rotated further past the third position (e.g., in the counterclockwise direction).

The receptacle 2002 also defines a shelf 2420 disposed externally (e.g., out from underneath) the cover 2400. In some instances, the rib 1818 may rest upon, or translate along, the shelf 2420. The shelf 2420 may, in some instances, include a first edge 2422 and a second edge 2424. The rib 1818 engages with the shelf 2420 to prevent the privacy cover 104 being removed from the camera housing 102. In the second position of the privacy cover 104, the second edge 1912 of the prong 1820 may engage (e.g., abut) the second edge 2424 of the shelf 2420 to prevent rotation of the privacy cover 104 past the second position. Likewise, in the third position of the privacy cover 104, the first edge 1910 of the prong 1820 may engage (e.g., abut) the first edge 2422 of the shelf 2420 to prevent rotation of the privacy cover 104 past the third position.

FIGS. 25A-25F illustrate an engagement between the protrusion 1816 and the receptacle 2002, according to examples of the present disclosure. In FIGS. 25A-25F, the privacy cover 104 is shown in the first position. Additionally, FIGS. 25B-25F show various cross-sectional views of the protrusion 1816 and the receptacle 2002 to illustrate an engagement therebetween.

In the first position of the privacy cover 104, the rib 1818 is disposed above the shelf 2420, and the prong 1820 may engage within the contoured surface 2406. For example, the prong 1820 may reside within the furrow 2418 of the second section 2414 of the contoured surface 2406. Additionally, the post 2402 that extends from the cover 2400 may be disposed in the slot 1900 of the protrusion 1816. In the first position, the rib 1818 extends external externally to the cover 2400 (e.g., out from underneath the cover 2400) such that the rib 1818 may act on the lever 1710 of the switch 1208. For example, from the first position (or the third position), the privacy cover 104 may be rotated clockwise (e.g., about the Y-axis) to the second position. In doing so, the prong 1820 may be disposed out of the furrow 2418 along the third section 2416, and the first surface 1906 of the rib 1818 may be brought into contact with the first side 2408 of the contoured surface 2406. At the same time, in some instances, the second edge 1912 of the prong 1820 may be brought into contact with the second edge 2424 of the shelf 2420. In the second position of the privacy cover 104, the prong 1820 may reside along the third section 2416 of the contoured surface 2406. When the privacy cover 104 moves to the second position, the rib 1818 may not act on the lever 1710, and consequently, the camera 800 may be activated.

Likewise, from the first position (or the second position), the privacy cover 104 may be rotated counterclockwise (e.g., about the Y-axis) to the third position. In doing so, the prong 1820 may be disposed out of the furrow 2418 along the first section 2412, and the second surface 1908 of the rib 1818 may be brought into contact with the second side 2410 of the contoured surface 2406. At the same time, in some instances, the first edge 1910 of the prong 1820 may be brough brought into contact with the first edge 2422 of the shelf 2420. In the third position of the privacy cover 104, the prong 1820 may reside along the first section 2412 of the contoured surface 2406. Moreover, when the privacy cover 104 moves from the second position to the third position, and vice versa, the prong 1820 may be translated over the second section 2414, through the furrow 2418, to the first section 2412. When the privacy cover 104 moves to the second position, the rib 1818 may not act on the lever 1710, and consequently, the camera 800 may be activated.

In some instances, the privacy cover 104 may not be removed (e.g., decoupled) from the camera housing 102 in the first position. For example, in the first position, the rib 1818 resides vertically above the shelf 2420, which may prevent a disengagement between the protrusion 1816 and the receptacle 2002. For example, the second arm 402 may not be capable of being flexed to remove the protrusion 1816 from within the receptacle 2002. Instead, to remove the privacy cover 104 from the camera housing 102, or to couple the privacy cover 104 to the camera housing 102, the privacy cover 104 may be moved to the second position or the third position. For example, in the second position and the third position, the protrusion 1816 may be insertable into the receptacle 2002 and the shelf 2420 may not interfere with inserting the protrusion into the receptacle 2002 (via the rib 1818 contacting the shelf 2420). However, after being inserted, the privacy cover 104 may rotate from the second position, for example, to the first position.

Figure 26A:
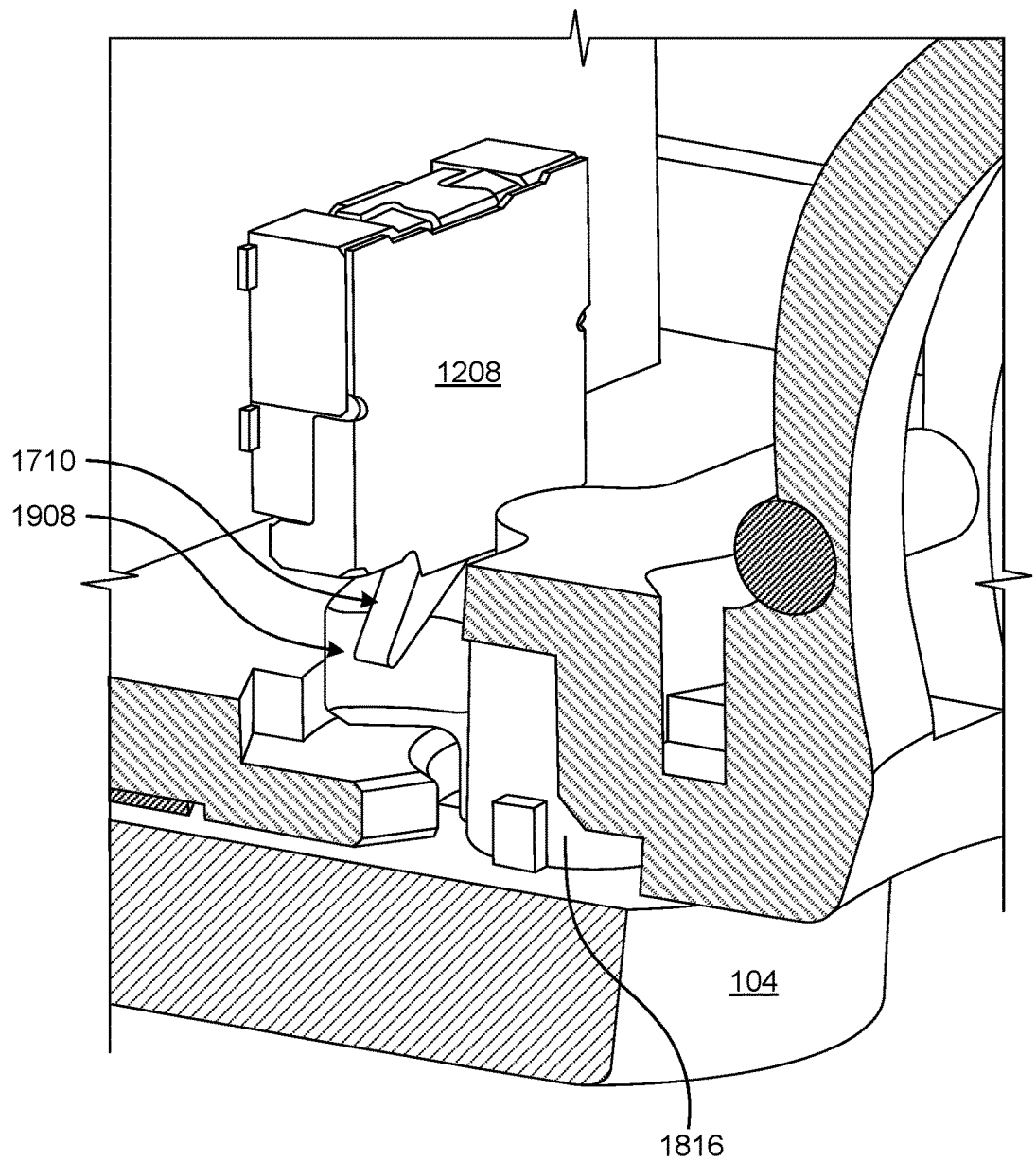
Figure 26B:
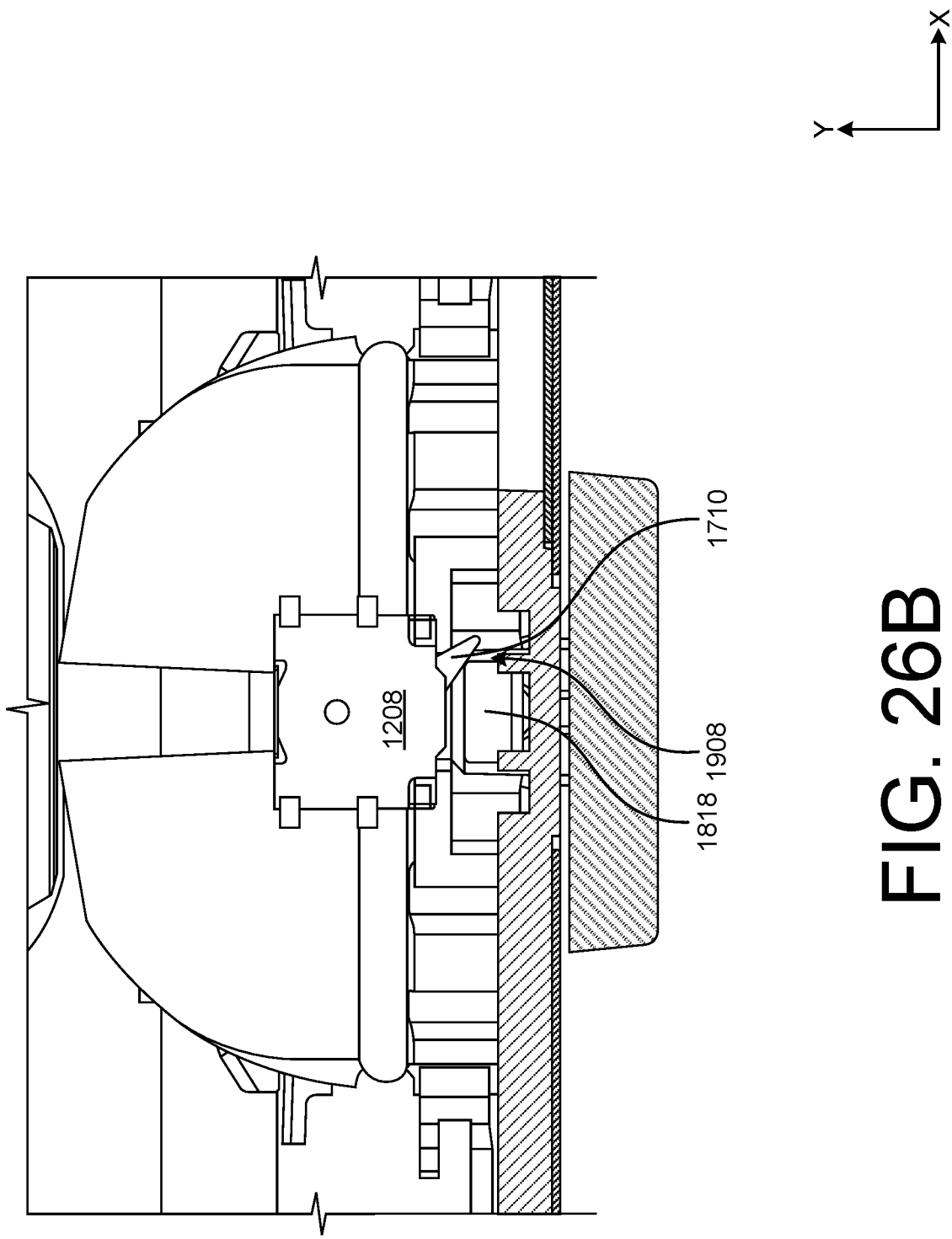

FIGS. 26A-26C illustrate an engagement between the protrusion 1816 and the switch 1208, according to examples of the present disclosure. More particularly, FIGS. 26A-26C illustrate an engagement between the rib 1818 and the lever 1710 of the switch 1208. In FIGS. 26A-26C, the privacy cover 104 is shown in the first position.

In the first position of the privacy cover 104, the lever 1710 may be engaged with the second surface 1908 of the rib 1818. As shown, the lever 1710 may be displaced to the left of the rib 1818, from a vertical (e.g., drop down) position of the lever 1710. That is, in a resting, uninterrupted, or non-displaced state, the lever 1710 may hang vertically (e.g., parallel with the Y-axis or Y-plane). However, the rib 1818 impedes the lever 1710 moving to such position, and accordingly, is engaged with the second surface 1908 of the rib 1818. In this position, the switch 1208 may deactivate the camera 800 (or other components of the device 100) or may otherwise restrict the camera 800 from being activated (e.g., in response to motion). From the first position, the privacy cover 104 may rotate to the second position (e.g., clockwise about the Y-axis). During this movement, the lever 1710 may no longer be inhibited by the rib 1818 and may hang vertically (e.g., parallel with the Y-axis or Y-plane). At such position, the switch 1208 (or other components of the device 100) may not deactivate or disable the camera 800. If the privacy cover 104 moves, from the second position to the first position, the second surface 1908 of the rib 1818 may displace the lever 1710 such that the switch 1208 may cause the camera 800 to be deactivated.

Similarly, from the first position, the privacy cover 104 may rotate to the third position (e.g., counterclockwise about the Y-axis). During this movement, the lever 1710 may pass over a top of the rib 1818 and be disposed adjacent to the first surface 1906 of the rib 1818. Additionally, in the third position, the lever 1710 may no longer be inhibited by the rib 1818 and may hang vertically (e.g., parallel with the Y-axis or Y-plane). At such position, the switch 1208 may not cause the camera 800 to be deactivated or disabled. If the privacy cover 104 moves, from the third position to the first position, the first surface 1906 of the rib 1818 may displace the lever 1710 (e.g., to the right) such that the switch 1208 may cause the camera 800 to be deactivated. As such, the lever 1710 may toggle between being acted on by the first surface 1906 and the second surface 1908.

Figure 27:
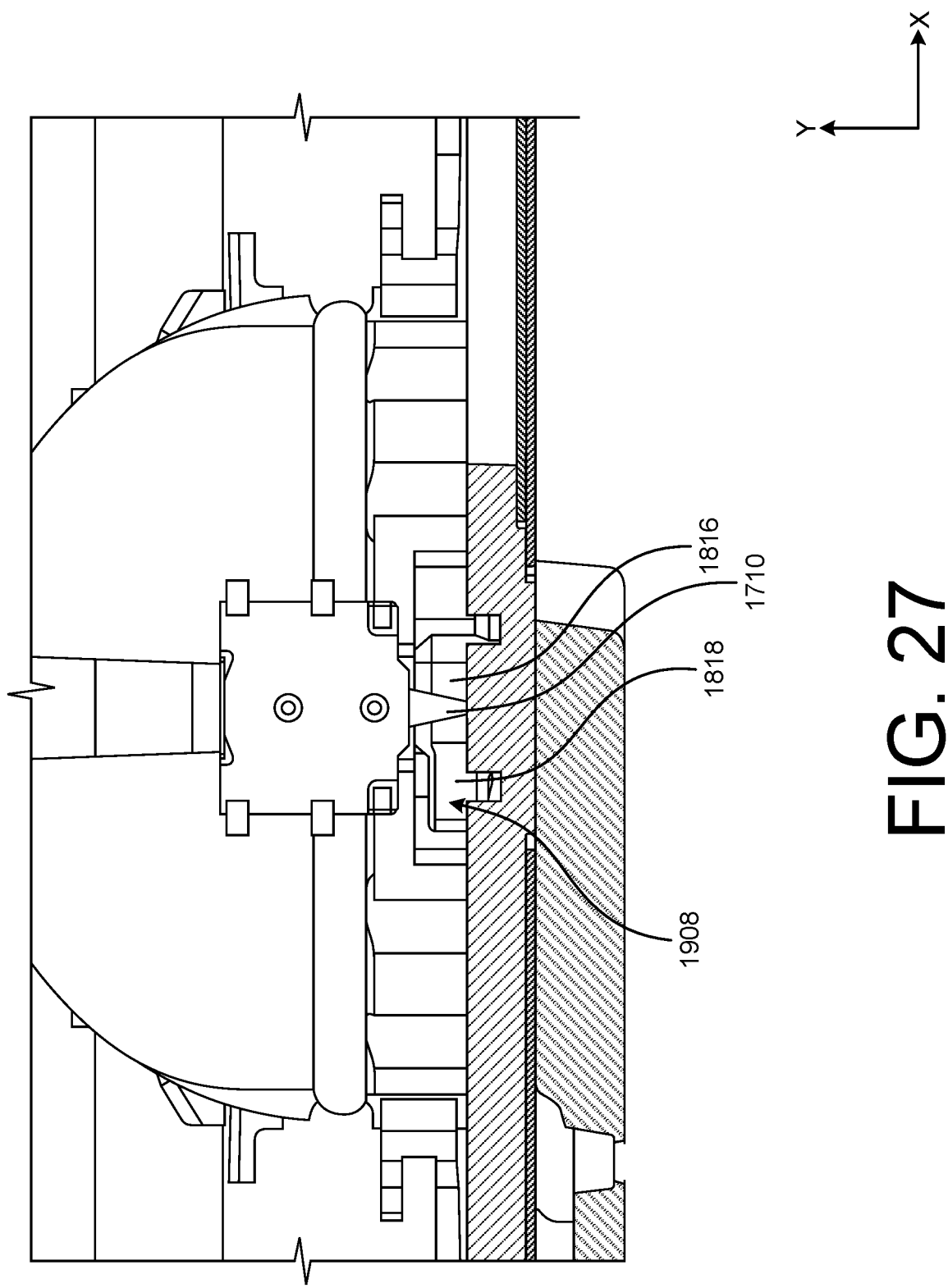
FIG. 27 illustrates a disengagement between the switch of FIGS. 26A-26C and the privacy cover of FIG. 1 when the privacy cover is in the second position, according to an example of the present disclosure.

FIG. 27 illustrates a disengagement between the protrusion 1816 and the switch 1208, according to examples of the present disclosure. More particularly, FIG. 27 illustrates the rib 1818 being disengaged with the lever 1710. In FIG. 27, the privacy cover 104 is shown in the second position. At the second position, the lever 1710 of the switch 1208 is permitted to hang vertically (e.g., parallel with the Y-axis or Y-plane). That is, in the second position of the privacy cover 104, the rib 1818 may not act on or engage the lever 1710. Accordingly, the lever 1710 freely hangs, and correspondingly, the switch 1208 may not deactivate or otherwise prohibit the camera 800.

Figure 28:
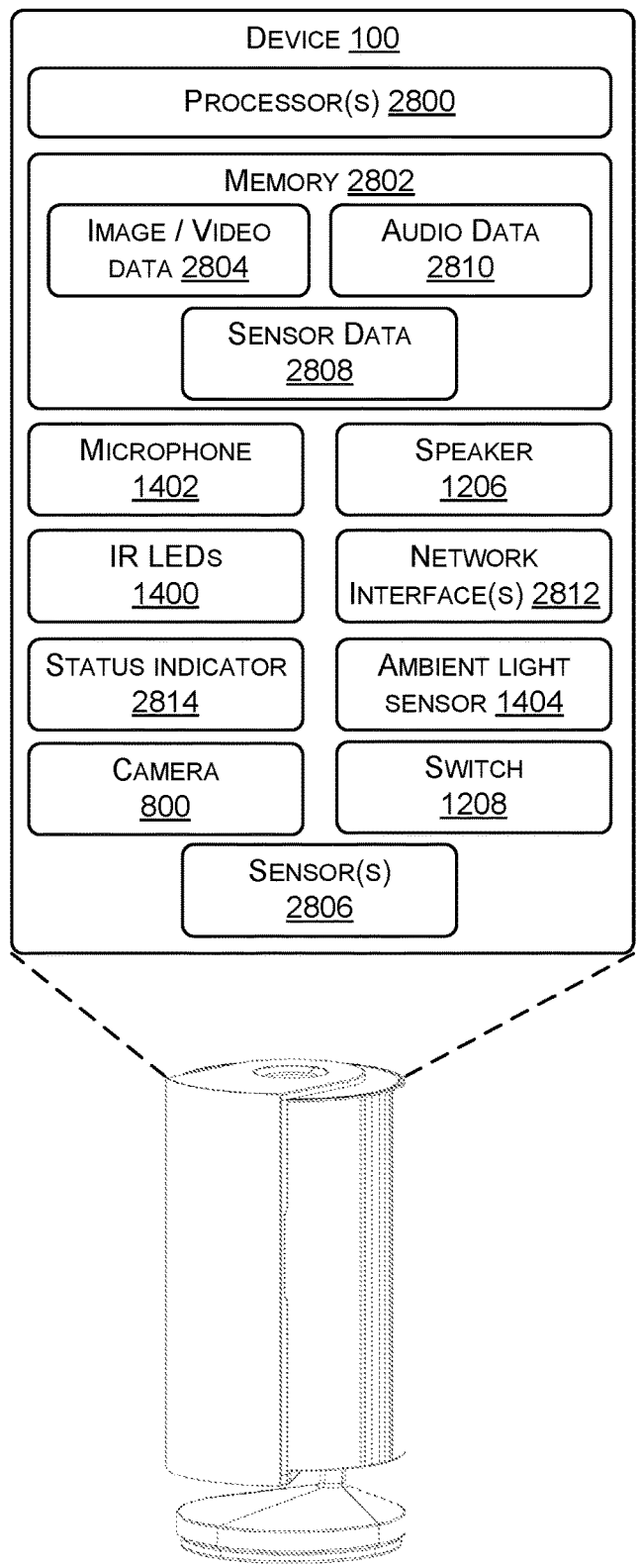
FIG. 28 illustrates select components of the device of FIG. 1, according to an example of the present disclosure.

FIG. 28 illustrates select components of the device 100, according to examples of the present disclosure. The device 100 is shown including processor(s) 2800 and memory 2802, where the processor(s) 2800 may perform various functions associated with controlling an operation of the device 100, and the memory 2802 may store instructions executable by the processor(s) 2800 to perform the operations described herein.

The device 100 includes the camera 800 for capturing image/video data 2804 within an environment of the device 100. In some instances, the camera 800 may include red, green, blue, depth (RGBD) camera(s) and/or three-dimensional (3D) sensors. Additionally, the device 100 may include any other sensor(s) 2806, such as the ambient light sensor 1404 and/or the IR lighting element 1400, that generates sensor data 2808. The device 100 may also include additional sensor(s) other than those described, such as, for example, temperature sensor(s), PIR sensor(s), accelerometer(s), gyroscope(s), and so forth. Additionally, in some instances, the device 100 includes lighting elements, such as LEDs for illuminating and/or emitting light within the environment of the device 100. Any number of IR LEDs and/or white LEDs, for example, may be included, and the IR LEDs and the white LEDs may be arranged about various sides of the device 100 (e.g., front, sides, etc.).

In some instances, the IR lighting element 1400 may detect the motion for activating the camera 800 and/or the microphone 1402 to begin capturing image/video data 2804 and/or audio data 2810, respectively. However, in some instances, the camera 800, in addition to or alternative from the IR lighting element 1400, may be used to detect motion. For example, computer vision techniques may be used to detect objects of interest. In some instances, the camera 800 may include a CMOS image sensor, and a digital processor that may perform embedded processing within the low-power CVM itself, such that the low-power CVM may output post-processed computer vision metadata to the processor(s) 2800. The metadata may include information such as the presence of a particular type of entity (e.g., person, animal, vehicle, parcel, etc.), a direction of movement of the entity, a distance of the entity from the device 100, etc. As a result of including the computer vision, the device 100 may leverage computer vision to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. The device 100 may also include one or more IR cut filter(s).

The device 100 includes the microphone 1402 that generates audio data 2810. The microphone 1402 may include an array of microphones for beamforming audio signals within the environment of the device 100. The speaker 1206 may output sound in a direction away from the device 100.

The sound output by the speaker 1206 may include the audio data 2810, which may be received from one or more communicatively coupled device, or other audio (e.g., siren, alarm, etc.).

Network interface(s) 2812 permit the device 100 to communicate over one or more networks. Example network interface(s) 2812 include, without limitation, Wi-Fi, Bluetooth, ZigBee, Bluetooth Low Energy (BLE), LTE, and so forth. The network interface(s) 2812 permit communication with remote device(s), such as mobile devices (e.g., phone), systems (e.g., cloud), and so forth. The network(s) may be representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

The sensor(s) 2806 may also include the switch 1208, where the sensor data 2808 indicates whether the switch 1208 (or the lever 1710) is in a non-displaced position or state (e.g., hanging, resting, etc.) or in a displaced position or state (e.g., moved, urged, etc.). For example, when the privacy cover 104 is in the first position, the rib 1818 may engage with the lever 1710 such that the lever 1710 transitions to a displaced state. Such movement, or position of the lever 1710, may be sensed by the switch 1208 and the switch 1208 may generate the sensor data 2808 indicative of the position of the lever 1710 (or more generally, the privacy cover 104). In response, the processor(s) 2800 may cause the camera 800 and/or other components of the device 100, such as the microphone 1402 to be deactivated. Conversely, when the rib 1818 does not engage with the lever 1710, the rib 1818 may not displace the lever 1710, and the switch 1208 may generate the sensor data 2808 indicative of the position of the lever 1710 (or more generally, the privacy cover 104). Here, the processor(s) 2800 may permit the camera 800 and/or other components of the device 100, such as the microphone 1402 to be activated (e.g., in response to motion being detected).

In some instances, the switch 1208 may otherwise cause the camera 800 to be deactivated. For example, in response to the switch 1208 being engaged, the switch 1208 may cause power to be terminated from being supplied to the camera 800 and/or the microphone 1402. In this sense, the processor(s) 2800 may not control the camera 800 to be activated or deactivated, but instead, the switch 1208 (or other switches) may terminate power to the camera 800. In some instances, the switch 1208 may represent a binary logic, and when the switch 1208 is engaged by the privacy cover, and may connect a first line to a second line, or disconnect a first line from a second line. In some instances, the switch 1208 may connect a 1.8V line to another line. In some instances, the switch 1208 may disconnect a 1.8V line from another line. In some instances, the switch 1208 may pull 1.8V to 0V. In some instances, the amount of voltage being drawn may pass through a series of logic inversions, voltage level shifting, and/or buffers. In some instances, when the switch 1208 is engaged, the switch 1208 may pull down on an enable pin of the camera's power supply, shutting off power to the camera 800, turns off (or opens) a power load switch to the microphone 1402. In some instances, various other electrical components may be utilized to shut off power to the camera 800 and microphone 1402 based on engagement of the switch 1208 (e.g., based on a change in voltage of a line caused by engagement of the switch 1208). These electrical components may include, for example, switches, resistors, amplifiers, capacitors, diodes, transistors, field effect transistors, etc. One or more of these electrical components may implement logic inversion, voltage level shifting, buffering, etc.

The device 100 also includes a status indicator 2814, which may correspond to the lighting element 1406. The status indicator 2814 may output light indicative of operations being performed by the device 100.

In some instances, inbound data from may be routed through the network interface(s) 2812 before being directed to the processor(s) 2800, and outbound data from the processor(s) 2800 may be routed through the network interface(s) 2812. The network interface(s) 2812 may therefore receive inputs, such as data, from the processor(s) 2800, the camera 800, and so forth. For example, the network interface(s) 2812 may be configured to transmit data to and/or receive data from one or more network devices. The network interface(s) 2812 may act as a conduit for data communicated between various components and the processor(s) 2800.

In some instances, the device 100 may be powered via main power, or may include battery(ies) that power components of the device. Any number of battery(ies) may be included, and the battery(ies) may be rechargeable/replaceable. When the battery(ies) are depleted, the battery(ies) may be recharged by connecting a power source to the battery(ies) (e.g., via the connector 400). Alternatively, the device 100 may be powered via a cable plugged into the connector 400.

Although certain components of the device 100 are illustrated, it is to be understood that the device 100 may include additional or alternative components. For example, the device 100 may include other input/output devices (e.g., display screen), heat dissipating elements, computing components (e.g., PCBs), antennas, ports (e.g., USB), and so forth.

As used herein, a processor, such as the processor(s) 2800 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionality described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 2802 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. An electronic device, comprising:
a housing;
a camera disposed at least partially within the housing;
a microphone disposed at least partially within the housing;
a switch including a lever; and
a privacy cover coupled to the housing, the privacy cover being rotatable between a first position in which the camera is obstructed, and a second position in which the camera is unobstructed, the privacy cover including a protrusion having a rib, wherein:
when the privacy cover is in the first position, the rib is engaged with the lever such that the switch deactivates the camera, and
when the privacy cover is in the second position, the rib is disengaged from the lever such that the camera is activated.

2. The electronic device of claim 1, wherein:
the housing includes a receptacle that receives the protrusion;
the rib includes a first surface and second surface;
in the first position, one of the first surface or the second surface engages with the lever;
the receptacle includes a contoured surface having an edge; and
in the second position, one of the first surface or the second surface engages with the edge.

3. The electronic device of claim 1, further comprising a speaker, wherein:
the housing includes a top and a bottom;
the microphone is disposed closer to the top of the housing than the camera and the speaker; and
the speaker is disposed closer to the bottom of the housing than the camera.

4. The electronic device of claim 1, further comprising a printed circuit board (PCB) including a connector having one or more traces.

5. A device, comprising:
a housing;
a camera disposed at least partially within the housing;
a power supply electrically coupled to the camera;
a switch;
a privacy cover coupled to the housing, the privacy cover including a protrusion, wherein the privacy cover is transitionable between:
a first position in which the camera is obstructed, the protrusion engages the switch, and power from the power supply is ceased to the camera, and
a second position in which the camera is unobstructed, the protrusion disengages the switch, and power from the power supply to the camera is permitted;
a first line electrically coupled to the power supply;
a second line electrically coupled to the switch; and
one or more electrical components electrically coupling the first line to the second line.

6. The device of claim 5, wherein the first line is electrically coupled to a first pin of the power supply.

7. The device of claim 5, wherein the one or more electrical components include at least one of:
a field effect transistor;
a buffer;
one or more first electrical components implementing a logic inversion; or
one or more second electrical components implementing a logic gate.

8. The device of claim 5, wherein:
in the first position of the protrusion the switch causes a change in a voltage level at the second line;
based at least in part on the change in the voltage level at the second line, the one or more electrical components cause a change in a voltage level at the first line; and
based at least in part on the change in voltage at the first line, the power supply ceases supplying power to the camera.

9. The device of claim 5, further comprising:
a microphone;
a third line supplying power to the microphone; and
a power load switch electrically coupled to the third line and the switch.

10. The device of claim 9, wherein:
in the first position of the protrusion the switch causes a change in a voltage level at the second line; and
the change in the voltage level at the second line causes the power load switch to transition from a first state to a second state associated with ceasing power to the microphone.

11. The device of claim 9, wherein:
in the first position of the protrusion the switch causes a change in a voltage level at the second line; and
the change in the voltage level at the second line causes:
based on the one or more electrical components, a change in a voltage level at the first line to cease supplying power to the camera, and
the power load switch to transition from a first state to a second state associated with ceasing power to the microphone.

12. The device of claim 5, wherein a rib of the protrusion engages with a shelf of the housing to secure the privacy cover to the housing.

13. The device of claim 5, further comprising a button, wherein:
- the privacy cover includes:
  - a first end having an opening, and
  - a second end having the protrusion;
- the first end of the privacy cover rotationally couples to a top of the housing;
- the second end of the privacy cover rotationally couples to a bottom of the housing; and
- the button is accessible via the opening in the first end of the privacy cover.

14. The device of claim 5, wherein:
- the switch includes a lever that is transitionable between a displaced position and a non-displaced position;
- in the first position of the privacy cover, the protrusion engages with the lever to transition the lever to the displaced position, and
- in the second position of the privacy cover, the protrusion disengages with the lever such that the lever is permitted to transition to the non-displaced position.

15. The device of claim 5, wherein:
- in the first position of the privacy cover, the switch restricts the camera from being activated; and
- in the second position of the privacy cover, the switch permits the camera to be activated.

16. The device of claim 5, further comprising a printed circuit board (PCB) including a connector having one or more traces, the connector being directly formed within the PCB.

17. A device, comprising:
- a housing;
- a printed circuit board (PCB) disposed at least partially within the housing, the PCB defining a connector portion, the connector portion including one or more traces;
- a camera at least partially disposed within the housing;
- one or more microphones at least partially disposed within the housing;
- a switch; and
- a privacy cover coupled to the housing, the privacy cover including a rib, wherein the privacy cover is transitionable between a first position and a second position, wherein:
  - in the first position the camera is obstructed, the rib is engaged with the switch, and power to the camera and the one or more microphones is restricted, and
  - in the second position the camera is unobstructed, the rib is disengaged with the switch, and power to the camera and the one or more microphones is permitted.

18. The device of claim 17, wherein the privacy cover is configured to transition to a third position in which the camera is unobstructed and the rib is disengaged with the switch.

19. The device of claim 17, further comprising a button, wherein:
- the housing includes a top and a bottom;
- the privacy cover includes:
  - a first end having an opening, and
  - a second end having the rib;
- the first end of the privacy cover rotationally couples to the top of the housing;
- the second end of the privacy cover rotationally couples to the bottom of the housing; and
- the button is accessible via the opening in the first end of the privacy cover.

20. The device of claim 17, wherein:
- the housing includes a receptacle that receives a protrusion having the rib; and
- the protrusion further has a prong configured to engage with a contoured surface of the receptacle.

21. The device of claim 20, wherein:
- the receptacle defines a post; and
- the protrusion includes a slot that receives the post, the post being rotatable within the slot.

22. The device of claim 20, wherein:
- the rib includes a first surface and second surface;
- in the first position, one of the first surface or the second surface engages the switch; and
- in the second position, one of the first surface or the second surface abuts an edge of the contoured surface.

23. The device of claim 17, further comprising a second PCB, wherein:
- the one or more microphones are disposed on the PCB;
- the camera is disposed on the second PCB; and
- the switch is disposed on the second PCB.

24. The device of claim 23, further comprising at least one of:
- an ambient light sensor disposed on the PCB;
- an infrared (IR) lighting element disposed on the PCB;
- a lighting element disposed on the PCB; or
- an antenna disposed on the second PCB.

25. The device of claim 17, further comprising a stand coupled to the housing.

* * * * *